United States Patent [19]
Butterfield et al.

[11] Patent Number: 5,754,750
[45] Date of Patent: *May 19, 1998

[54] METHOD AND APPARATUS FOR DISPLAYING A PAGE WITH GRAPHICS INFORMATION ON A CONTINUOUS SYNCHRONOUS RASTER OUTPUT DEVICE

[75] Inventors: Stephen R. Butterfield, Manhattan Beach; Donald E. Phillips, Garden Grove; Barbara B. Renshaw, Manhattan Beach; Steven K. Nelson, Harbor City; Robert F. Hossley, El Segundo, all of Calif.

[73] Assignee: Peerless Systems Corporation, El Segundo, Calif.

[*] Notice: The term of this patent shall not extend beyond the expiration date of Pat. No. 5,509,115.

[21] Appl. No.: 631,940

[22] Filed: Apr. 15, 1996

Related U.S. Application Data

[63] Continuation of Ser. No. 277,782, Jul. 20, 1994, Pat. No. 5,509,115, which is a continuation of Ser. No. 927,067, Aug. 7, 1992, abandoned, which is a continuation-in-part of Ser. No. 564,417, Aug. 8, 1990, abandoned.

[51] Int. Cl.⁶ .............................. G06T 11/00; G06T 11/60
[52] U.S. Cl. ........................... 395/118; 395/116; 395/507; 395/788
[58] Field of Search ................................... 395/147, 116, 395/164, 103, 105, 107, 112, 115, 162, 118, 507, 788; 345/189

[56] References Cited

U.S. PATENT DOCUMENTS

| | | | |
|---|---|---|---|
| 4,648,045 | 3/1987 | Demetrescu | 364/518 |
| 4,679,038 | 7/1987 | Bantz et al. | 340/721 |
| 4,703,515 | 10/1987 | Baroody, Jr. | 382/48 |
| 4,933,874 | 6/1990 | Asada et al. | 395/107 |
| 4,933,880 | 6/1990 | Borgendale et al. | 395/147 |
| 4,942,541 | 7/1990 | Hoel et al. | 395/115 |
| 5,125,072 | 6/1992 | Ng | 395/112 |
| 5,502,804 | 3/1996 | Butterfield et al. | 395/147 |

Primary Examiner—Joseph H. Feild
Attorney, Agent, or Firm—Blakely Sokoloff Taylor & Zafman

[57] ABSTRACT

An apparatus and method used to perform image rendering is capable of producing complex, high resolution images for a continuous synchronous raster image output device, such as a laser printer or a video display, using a minimum of random access memory. High level graphics instructions defining an image to be displayed or printed are provided by a processor executing an applications program. These instructions are interpreted to generate a set of graphics orders that are subsequently processed to create a bitmap image for output to a display or printer device. The graphics order processing system is independent of the central processor and thereby significantly reduces the central processor's image output overhead.

7 Claims, 30 Drawing Sheets

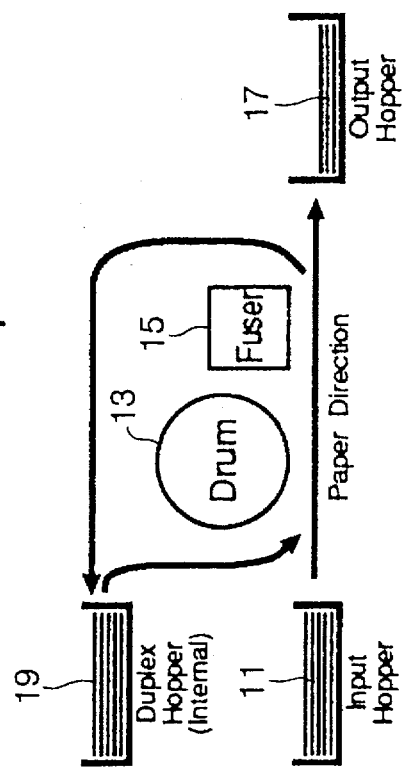
FIG. 6B Double Sided Paper Path
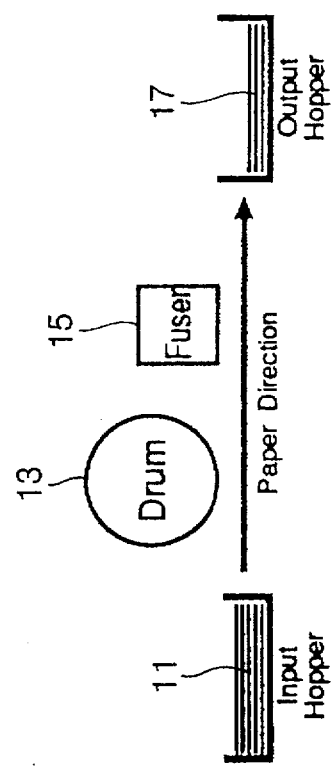
FIG. 6A Single Sided Paper Path

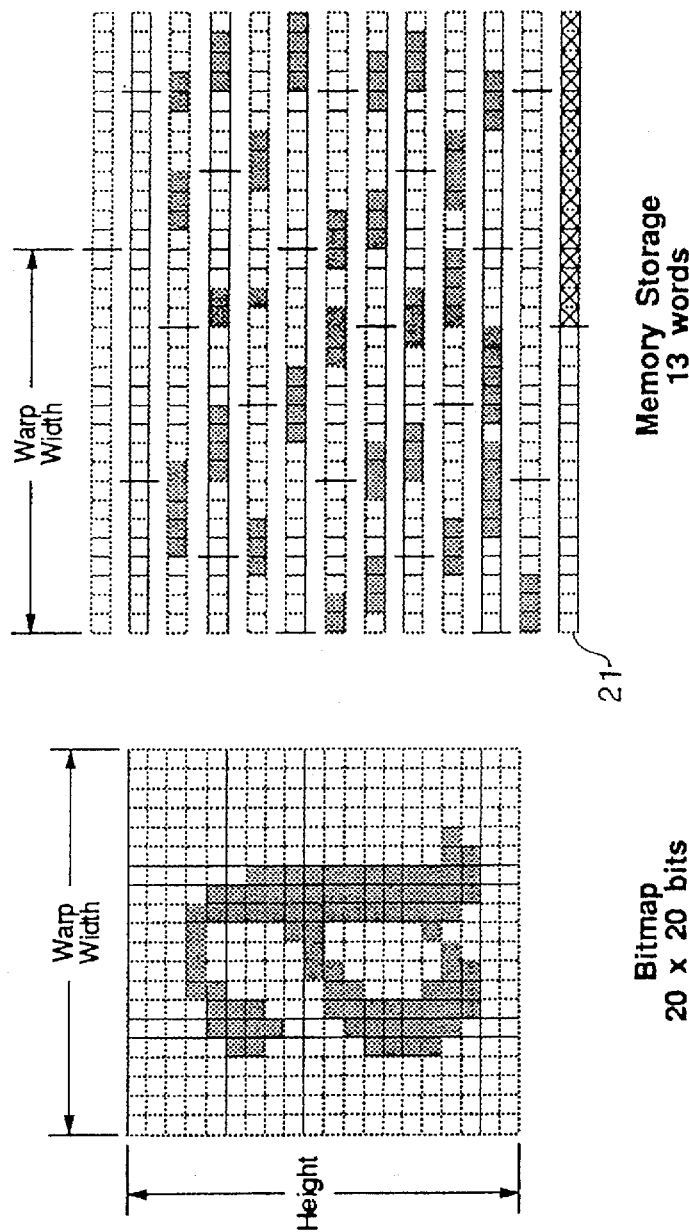
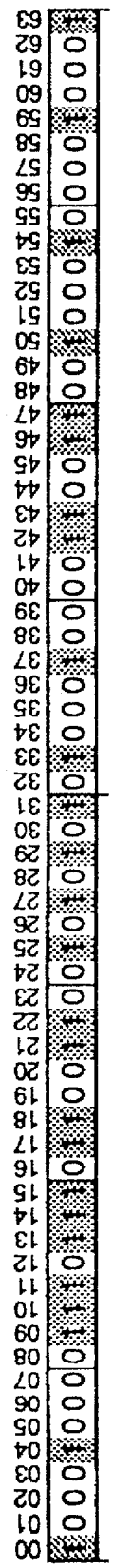
FIG. 8A — Bitmap 20 x 20 bits
FIG. 8B — Memory Storage 13 words
FIG. 9 — Logical Bit Addressing

Display List Address Register

| 31 29 28 | | 00 |
|---|---|---|
| 0 0 0 | DISPLAY LIST ADDRESS | |

Graphic Order Instruction Pointer Register (R/O)

| 31 29 28 | | 00 |
|---|---|---|
| 0 0 0 | GRAPHIC ORDER INSTRUCTION POINTER | |

PCB Address Register

| 31 29 28 | | 00 |
|---|---|---|
| 0 0 0 | PCB ADDRESS | |

PRINT Signal Control Register

| 31 | 01 | 00 |
|---|---|---|
| UNUSED | | ASSERT PRINT |

Interrupt Event Register

| 31 20 | 19 | 18 | 17 | 16 | 15 08 | 07 | 06 | 05 | 04 | 03 | 02 | 01 | 00 |
|---|---|---|---|---|---|---|---|---|---|---|---|---|---|
| UNUSED | BLT ERROR | PRINT ERROR | BAND UNDER | VIDEO UNDER | UNUSED | BLT DONE | BAND BEGIN | PAGE END | CMDREG EMPTY | STSREG FULL | TIME INTERVAL | STATUS CHANGE | BAD ACCESS |

Interrupt Mask Register

| 31 | 08 | 07 06 05 04 03 02 01 00 |
|---|---|---|
| UNUSED | | INTERRUPT MASK |

Blitter/Printer Status Register

| 31 | 04 | 03 | 02 | 01 | 00 |
|---|---|---|---|---|---|
| UNUSED | | BLT BUSY | PRINT BUSY | DLA EMPTY | PCB EMPTY |

Blitter Soft Reset Register

| 31 | 02 | 01 | 00 |
|---|---|---|---|
| UNUSED | | PRINTER RESET | BLITTER RESET |

FIG. 11

PCB Record Structure

| Offset | Field |
|---|---|
| +0x00 | Page Image Bit Address, byte aligned (32 bits) |
| +0x04 | Vertical Margin (16 bits) |
| +0x06 | Horizontal Margin (16 bits) |
| +0x08 | Page Image Warp (16 bits) |
| +0x0A | Page Image Width (16 bits) |
| +0x0C | Page Image Height (16 bits) |
| +0x0E | Control (3 of 16 bits) |
| +0x10 | Video Clocks (16 bits) |
| +0x12 | Video Scanlines (16 bits) |

Control Field Definition

| 15 | 03 | 02 | 01 | 00 |
|---|---|---|---|---|
| UNUSED | | RIGHT TO LEFT | BOTTOM TO TOP | LAST BAND |

SET_UBMAP      Render a full page into an unbanded bitmap

SET_BOOL_D     Set the destination boolean code
BLT2UB_D       to draw in white, and clear the entire page SET_SBMAP      Set up for transfer from a font cartridge of a bitmapped font
SET_BOOL_SD    Draw the characters in black
BLT2UB_SD      Place three characters on the
BLT2UB_SD      page
BLT2UB_SD SET_HTBMAP     Identify a light gray repeating halftone pattern
SET_BOOL_HD    Apply the halftone gray pattern during the transfer
SL2UB_HD       Render the entire scanline table image in light gray
STOP

FIG. 15

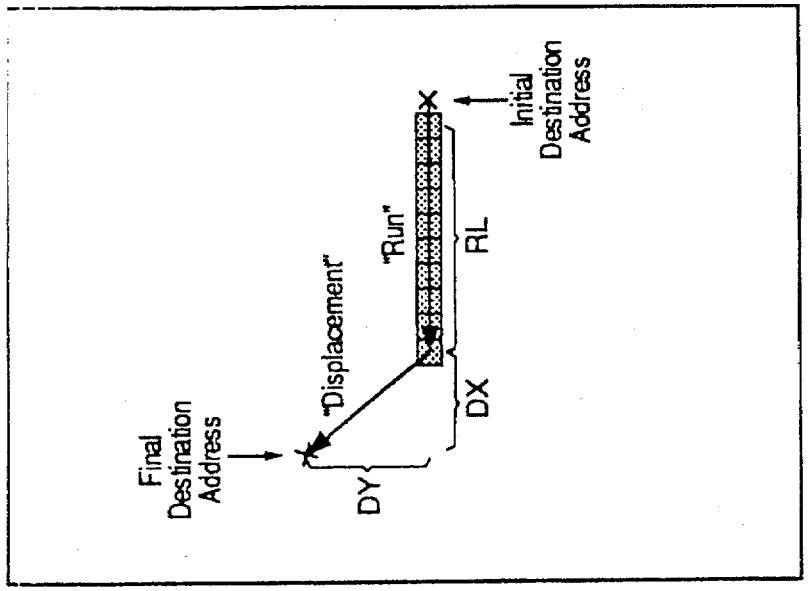
FIG. 16B  Backside Rendering Bottom to Top
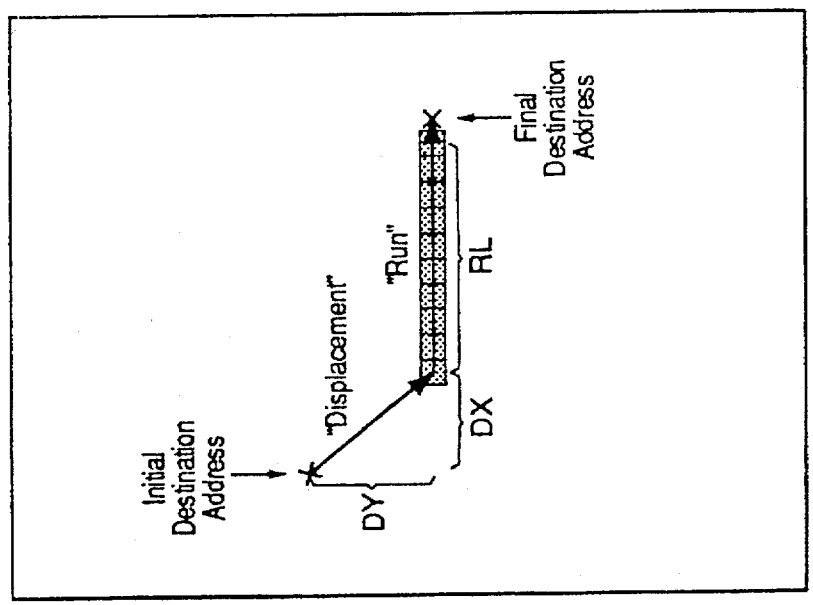
FIG. 16A  Frontside Rendering Top to Bottom

FIG. 17A 16-Bit Specifier
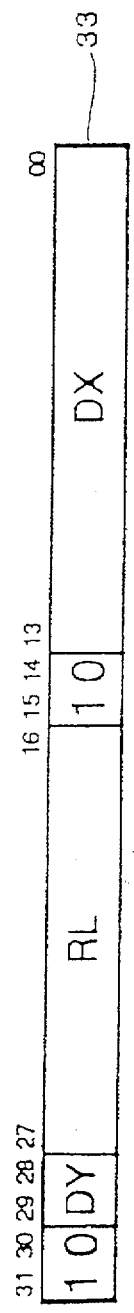
FIG. 17B 32-Bit Specifier
FIG. 17C 48-Bit Specifier
RL  Run length
DX  Horizontal signed displacement
DY  Vertical positive displacement
DZ  Horizontal/vertical signed displacement 32-Bit Companion Halftone Specifier 48-Bit Companion Halftone Specifier HDL   Halftone run length delta
HDX   Halftone horizontal displacement delta
HDY   Halftone vertical displacement delta
HDA   Halftone starting address displacement delta

FIG. 19

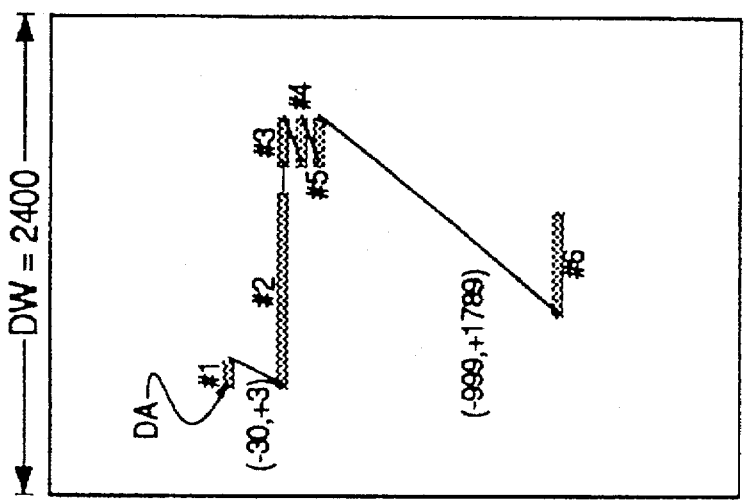
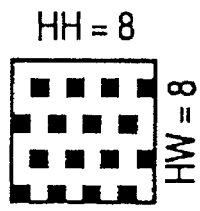
FIG. 20A — Scanline Table
FIG. 20B — Companion Halftone Table
FIG. 20C — Halftone Bitmap
FIG. 20D — Destination Bitmap Bottom to Top Top to Bottom

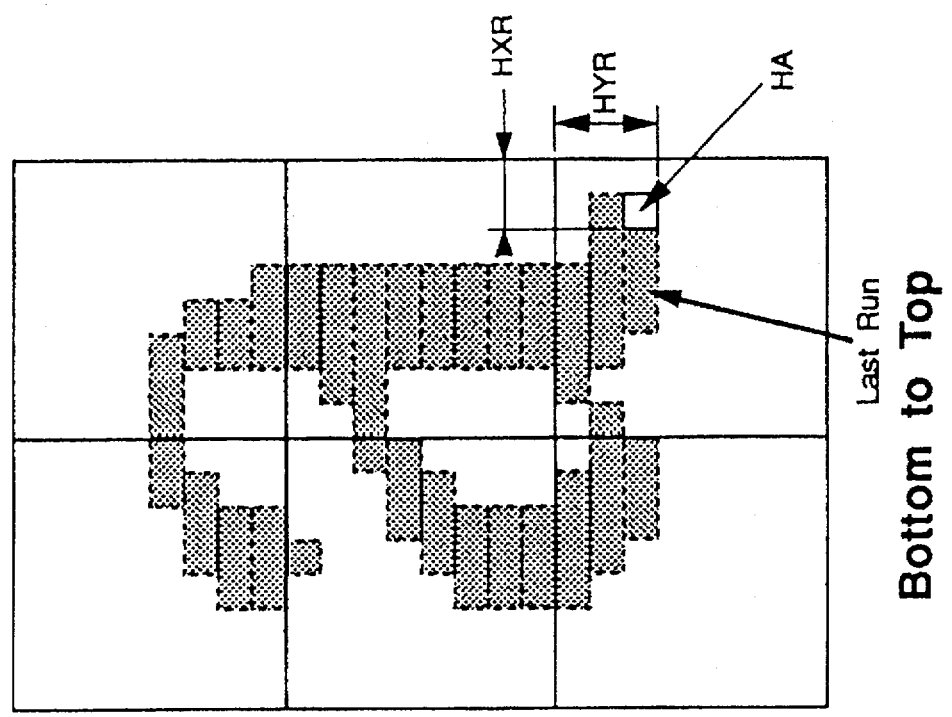
FIG. 23B Bottom to Top
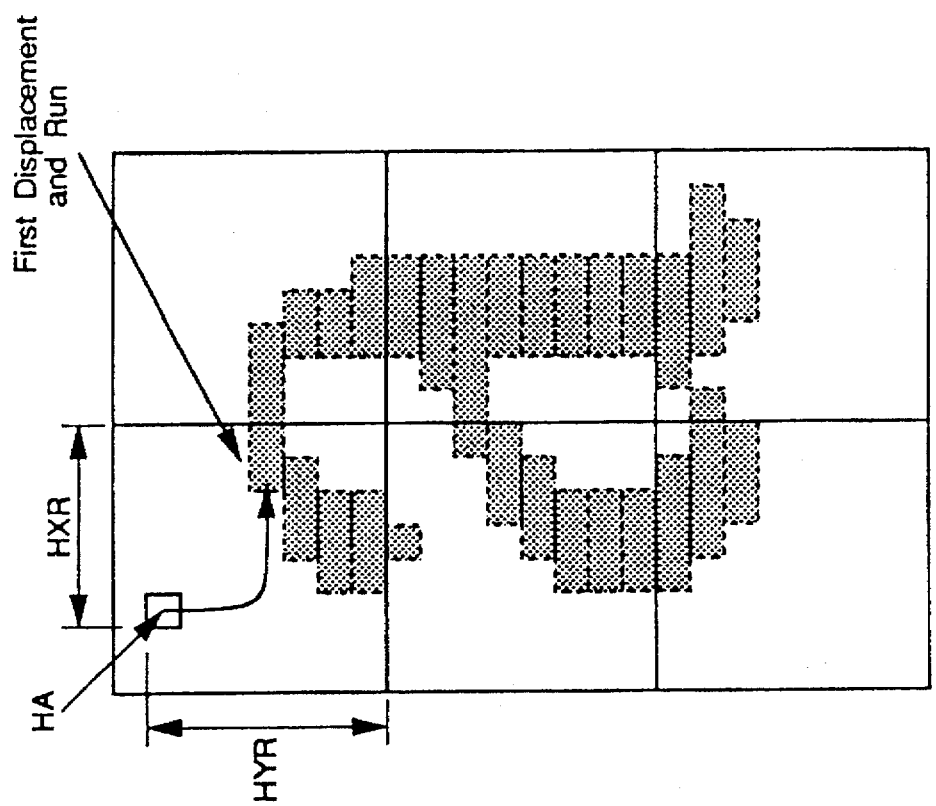
FIG. 23A Top to Bottom

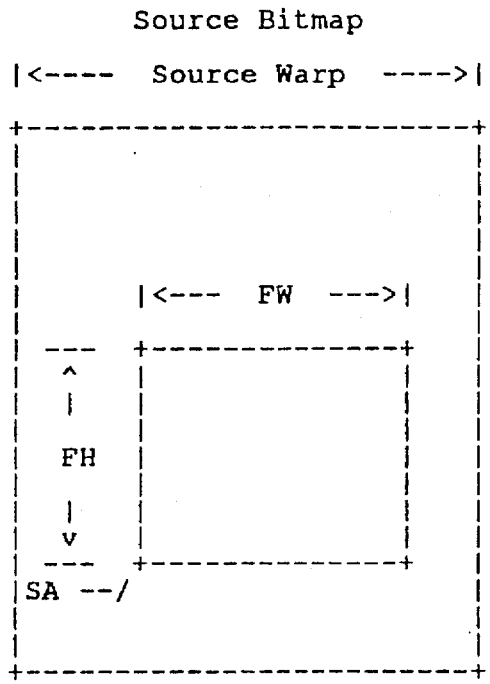
FIG. 29A
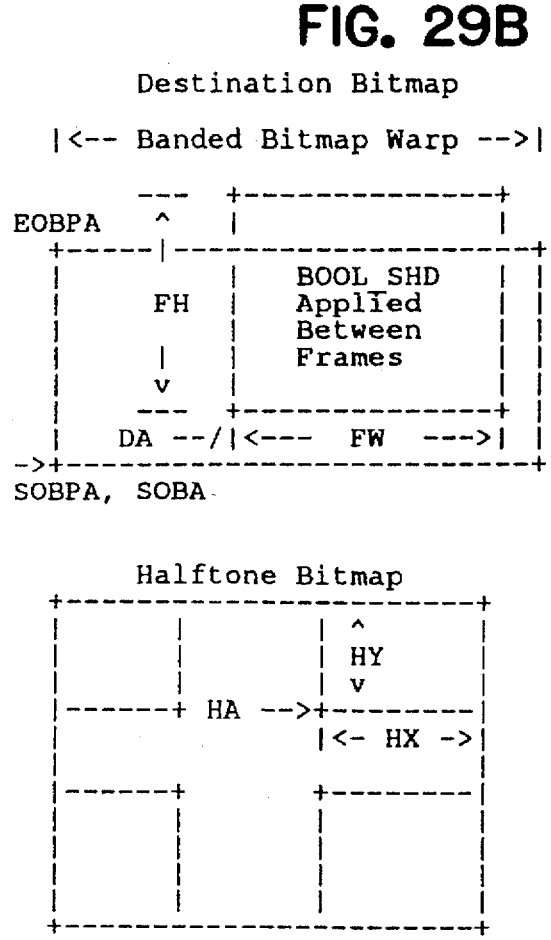
FIG. 29B
FIG. 29C
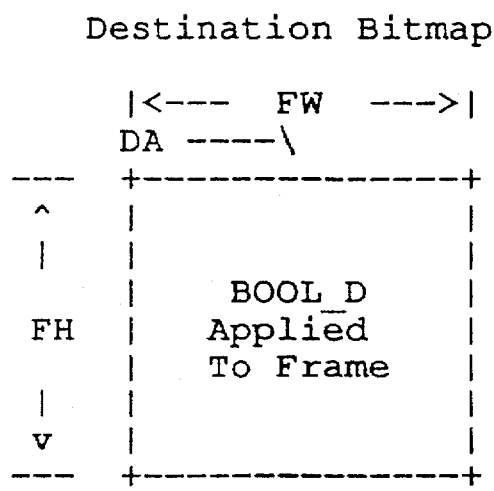
FIG. 30

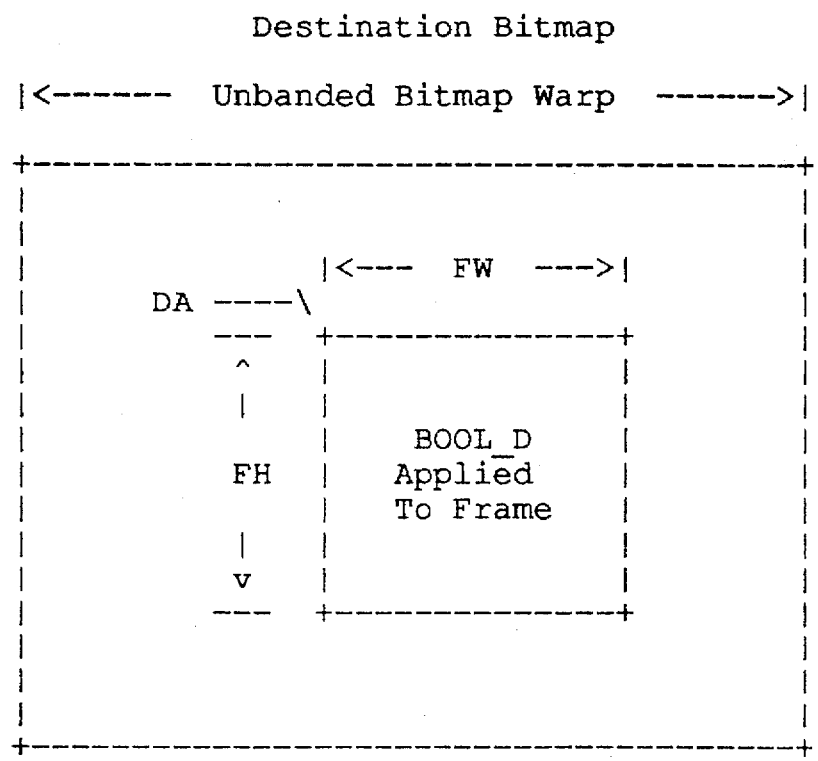
FIG. 33
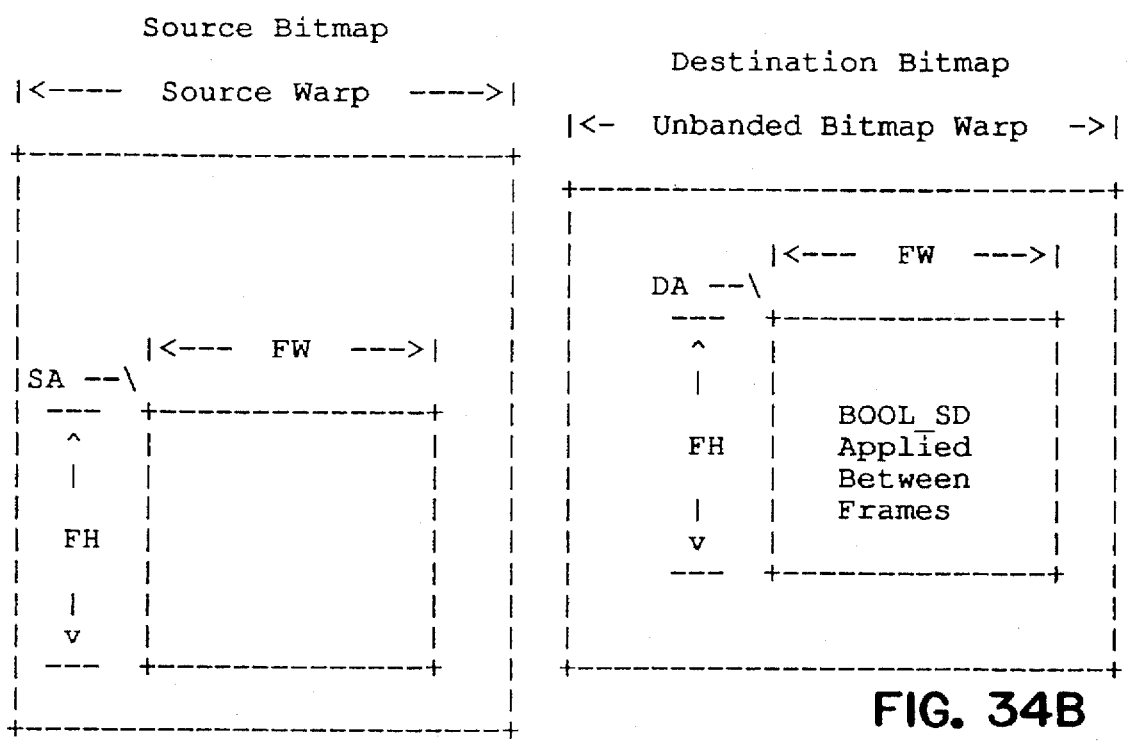
FIG. 34A
FIG. 34B

SET_HTBMAP
Halftone Parameters

BLT2.. or SL2..
Halftone Parameters

METHOD AND APPARATUS FOR DISPLAYING A PAGE WITH GRAPHICS INFORMATION ON A CONTINUOUS SYNCHRONOUS RASTER OUTPUT DEVICE

This is a continuation of application Ser. No. 08/277,782, filed Jul. 20, 1994, U.S. Pat. No. 5,509,115, which is a continuation of application Ser. No. 07/927,067 filed Aug. 1, 1992, abandoned which is a continuation-in-part of application Ser. No. 07/564,417 filed Aug. 8, 1990 abandoned.

SUMMARY OF THE INVENTION

The present invention is an apparatus and method used to perform image rendering in a manner which is capable of producing complex, high resolution images for a continuous synchronous raster image output device, such as a laser printer or a video display, using a minimum of random access memory. This invention yields substantial performance improvements for the processor to which the output device is attached.

A continuous synchronous raster image output device requires delivery of the output data in a fixed period of time. If the data is not delivered within the fixed period of time, the output image is corrupted. The invented method and apparatus decomposes basic graphics functions into a compact series of orders or commands suitable for realtime processing and then generates the output image on the fly. By way of contrast, excepting for applications with limited or no graphics capability, prior art techniques for continuous synchronous raster image output devices require that an entire image be constructed in memory before the image is sent to the output device.

The invented technique defines the graphic content of an image in much less memory than the rendered image would otherwise require, but in a form that can be processed and delivered to an output device at the speed required by the output device. In order to accomplish this, graphics functions are represented as low level primitives, referred to herein as orders, to guarantee that they can be converted to bitmapped images in realtime. Additionally, the quantity of orders or commands is reduced by eliminating redundant or overlapping graphics functions to minimize the memory used by the orders. This approach substantially reduces the output-related processing overhead of the central processor since it is only required to generate a high level language definition of the output image.

For printer applications, the invention uses a realtime output processor which operates on a small section of a page image at a time. Such a section is called a band. A band consists of a predetermined number of scanlines where each scanline is a series of pixels to be delivered to the output device at the speed required by the output device.

After building a first band, a second band is created while the first band is being printed. Using prior art techniques, and given the present speed of processors used to generate bitmaps of the image to be printed which is sent to the output device, it would not be possible to finish creating a bitmap for the second band before the printer finished printing the first band. That is, since continuous synchronous raster image printers print at a fixed speed, to ensure that a page is printed correctly, prior art techniques require the creation of a bitmap image of the entire page to be printed before any part of the image is passed to the printer.

By using a technique for generating bitmap images which are less than the complete page, and sending only that portion to the printer, while the bitmap image for another portion of the page is being created, the present invention results in a great cost savings by using less memory. Additionally, even if there is sufficient memory to build a complete page, by using the banding technique of the present invention, a second page can be constructed in one band while a first page in another band is being printed, thereby increasing the throughput of the printer.

The present invention accomplishes its goal by deferring the execution of application generated commands that draw pixels in the page image. These commands are converted to graphics orders rather than directly to bitmaps. The graphics orders take up much less memory than corresponding bitmaps, but can be converted to bitmaps for sending to a printer at a speed fast enough to keep up with the printer.

Since a single graphics command may affect more than one band, an order may be processed multiple times. In this connection, order command blocks, which are represented as tabular structures in memory, include information to allow selection of those graphics commands needed for a given band.

More particularly, image rendering according to the present invention uses an order construction step and two image drawing steps. The order construction step is used to build orders for deferred execution. Applications commands for pixel drawing in memory other than the page image result in bitmaps stored in user memory and do not result in stored orders because these commands are processed immediately. The bitmaps produced by immediate memory block transfers (blits) later may be used by a PDL interpreter as source bitmaps for blits into the page image.

Inputs to the order construction step are presented through a graphics subsystem interface such that each graphics call delivers arguments which the order construction step reduces to a compact command block which may include a "band" number to be used by the image drawing steps to select a subset of commands for each band of the page to be drawn.

The order construction step attempts to eliminate redundant orders by combining multiple inputs into single command blocks thus reducing the number of command blocks and the memory required to contain them.

The first (immediate) image drawing step proceeds in parallel with the generation of orders that draw objects in the page image. Objects drawn in this step are stored in the above-mentioned user memory for use as source data for the second drawing step, but the order command blocks for them are released for reuse.

The second (deferred) image drawing step starts when all orders for the page image have been generated. This step may process order commands multiple times, once for each image band affected. Orders that do not affect the current band are skipped.

The first band affected by an order command is identified by the band number included in the command. When an order command is processed, the band number is updated to the next band number if the order command affects multiple bands.

The invented technique is applicable not only to printers, but to raster scanned displays as well. The ever increasing x-y resolution of computer displays, in combination with the even more rapidly increasing color (z) resolution, has resulted in video memory requirements that are comparable to those of high resolution graphics printers. For example, a 600 dpi laser printer requires approximately 4MB of RAM, whereas high resolution displays now on the market require approximately 3MB of RAM. However, there have not been corresponding improvements in the CPU to video controller interface. Consequently, CPU performance suffers due to the large number of CPU cycles required to update the video RAM. Even though CPU throughput has increased dramatically, such increased performance is not realized during video transfer since the CPU must wait to carry out each memory transaction to the video memory across a relatively slow interface.

The video display update bottleneck is being addressed through two implementations: execution of higher level drawing operations within the display adapter itself and placement of the video adapter memory on a bus more tightly coupled to the microprocessor.

The execution of higher level drawing operations within the display adapter are embodied in a class of adapters typified by IBM's XGA display architecture. These higher level operations consist of straight line drawing and screen-to-screen movement of data. In reality, neither of these operations occur frequently in typical display applications, minimizing the benefits these controllers provide.

The move to place the display adapter closer to the microprocessor on its "local" bus requires a significant change to current PC motherboard architecture. Two proposals to modify this architecture are underway by the Video Equipment Standards Association (VESA) and Intel Corporation through the Peripheral Component Interconnection (PCI) bus. Should either of these standards be adopted, video screen updates will significantly improve due to the removal of the current interface bottleneck present in current architectures. However, overall system performance will be less than optimal as the processor must still carry out all operations to the display memory. The proposed local bus standards simply increase the efficiencies of accessing this memory.

The present invention converts application generated display commands to graphics orders rather than directly to a bitmap image. Conversion of the graphics orders to a bitmap image is performed in a co-processor external to the CPU, thereby substantially relieving the CPU of display transfer overhead. For a typical high resolution display, a 40:1 reduction in CPU display activity can be achieved.

BRIEF DESCRIPTION OF THE DRAWINGS

FIGS. 6A and 6B show typical Laser Printer Paper Paths.

FIG. 8A shows general bitmap structure.

FIG. 8B shows memory storage.

FIG. 9 shows logical bit addressing.

FIG. 11 shows blitter and printer register set.

FIG. 15 shows display list example.

FIGS. 16A and 16B show bitstring specifier internal address positions.

FIGS. 17A, 17B and 17C show bitstring specifier formats.

FIG. 19 shows bitstring specifier table example.

FIGS. 20A and 20B show Halftone specifier table examples.

FIG. 20C shows a halftone bitstring.

FIG. 20D shows a destination bitstring.

FIGS. 23A and 23B show halftone specification for scan-line operations.

FIGS. 29A, 29B and 29C show Source/Halftone/Destination BLT to banded bitmap, back side of a page.

FIG. 30 shows Destination BLT to frame.

FIG. 33 shows Destination BLT to unbanded bitmap.

FIGS. 34A and 34B show Source/Destination BLT to unbanded bitmap.

DETAILED DESCRIPTION OF THE INVENTION

Figure 1:
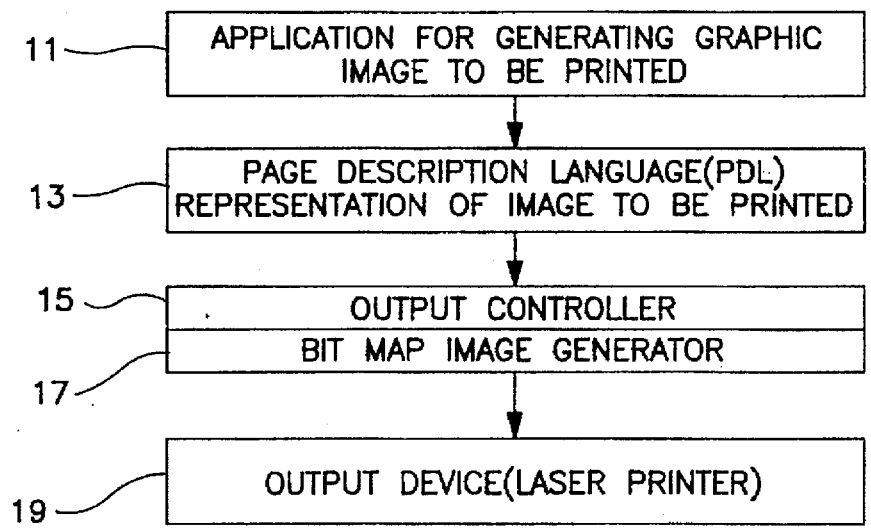
FIG. 1 is block overview diagram of a process for generating a printed page based upon an application which generates graphic images which are to be printed.

The present invention handles rendering of an image and delivery of the image to a continuous synchronous raster image output device. The invention will first be described in the context of outputting a page image to the print engine of a laser printer or other raster printing device. Referring to FIG. 1, an application 11 according to instructions from a user through an application service interface generates a representation of an image to be printed in a page description language (PDL) 13 such as Postscript which is available from Adobe Corporation. A PDL defines commands which allow complete and precise control of bitmap and halftone images as well as all of the attributes of character fonts including point size, orientation, shade and slant. Although the present invention is described for use with a PDL, it will be recognized that any high level graphics language may be employed. The application service interface which generates PDL instructions representing the image is the same regardless of underlying hardware and/or software support. For example, assume a user instructs an application program to draw a line from point A corresponding to a bitmap image coordinate of x1,y1 to point B corresponding to a bitmap image coordinate of x1,y2. Such an instruction would generate a series of Postscript instructions (excluding page and line setup instructions) as follows:

newpath
x1 y1 moveto
x2 y2 lineto stroke

In the simplest case where there is no special hardware and no banding according to the present invention, the PDL instructions are, in effect, directions to a PDL interpreter in output controller 15 which produces the page image. The PDL interpreter interprets the PDL instructions, producing graphics objects and character bitmaps as directed. Only a few of the PDL instructions result in drawing. The remaining instructions control the use and positioning of objects in the page image.

For example, in the Postscript instructions above, the newpath operator causes the PDL interpreter to initialize internal information to control subsequent operations. The moveto operator establishes an initial position within the coordinate system. The lineto operator establishes a new position with an unexpressed or "uninked" line between the initial position and the new position. When the interpreter processes the stroke operator, it will generate one or more graphics commands to underlying pixel drawing routines which draw the line in the page image memory.

In this case, the graphics calls are handled by the output controller synchronously. That is, a particular graphics call generates a portion of an image which is to be printed which is stored in a page buffer after which control is returned to the PDL interpreter. The interpretation and drawing steps continue work on the same page image until a page termination operator is found. Then the page image memory is copied to the output device by the hardware. The output copying step may operate asynchronously to the interpreter and graphics functions if there is enough memory to allow the interpreter to produce an image for the next page while the hardware delivers output from the previous page via DMA or other means.

Output controller 15 utilizes a graphics interface which includes graphics support routines which operate in the coordinate system of the output device 19 wherein the origin of the image coordinate system of the output device corresponds to the first pixel written to the output device. The x-axis of the image coordinate system is parallel to the output device scan (raster) lines. Thus, in left to right printing, pixels are output in increasing x-coordinate order, but in top to bottom printing, scan lines are output in increasing y-coordinate order.

The PDL interpreter part of the output controller specifies the size of the page image by giving its width and length. The PDL interpreter part of the output controller also specifies the placement of the image within the physical page by supplying top and left margin parameters. These parameters are expressed in pixels.

The graphics interface of output controller 15 creates two types of calls as follows:
1) calls relating to pages; and
2) calls which draw bit images.

Calls relating to pages are as follows:
1) New Page—performs initialization for a new page image.
2) End Page—starts the realtime printing process if the output device is idle or queues the image orders if the output device is busy. 3) Abort Page—if the printing phase has not started, throws away the orders for the page. 4) Abort All—throws away all pages waiting to be printed.

There are six classes of bit image drawing calls as follows:
1) Two Operand Blit—performs a two dimensional bit block transfer between two bitmaps, a source and a destination.
2) Three Operand Blit—performs a two dimensional bit block transfer using three bitmaps, a source, a halftone, and a destination.
3) Draw Scanline—writes pixel groups on a contiguous block of scanlines within the destination bitmap. The input includes a table defining pixel groups to be written.
4) Draw Scanline Halftone—writes pixel groups to the destination bitmap according to the contents of a halftone source bitmap and a table defining pixel groups to be written.
5) Draw Pixels—draws individual pixels in the destination bitmap according to a pixel table.
6) Draw Pixels Halftone—draws individual pixels in the destination bitmap according to the contents of a halftone source bitmap and a pixel table.

Generally each of the six classes has at least two calls, one for writing to the page image bitmap which the graphics subsystem interface manages; the other for a PDL interpreter managed destination, typically, a RAM user memory.

Interface to Bit Image Drawing Calls

Generally, bitmap image drawing calls expect user and halftone bitmap descriptors as input. A user bitmap descriptor contains bitmap origin byte address, i.e., the memory address of the upper left corner of the bitmap, bitmap width in pixels, i.e., the number of pixels per scanline, and bitmap height in pixels, i.e., the number of scanlines. Bitmap width and height may be arbitrary pixel values. Clipping occurs to the specified bitmap width and height for destination bitmaps; no source bitmap clipping is performed.

While user bitmap dimensions have no boundary constraints, a halftone bitmap width is constrained to be 0 mod 32 pixels (32-bit word multiple). In addition to bitmap origin, width, and height, a halftone bitmap descriptor has three additional fields. Two of the additional fields are x,y origin parameters specifying the point in the halftone bitmap that corresponds to the destination bitmap origin. The third additional field provides halftone bitmap size in bytes. Halftone bitmap usage wraps instead of clipping. This causes the halftone bitmap to appear to repeat in the destination bitmap in both the x and y dimensions.

Normally the contents of a source bitmap do not change except by means of subsequent calls to the graphics service routines performed by output controller 15. However, occasionally the PDL interpreter needs to directly change the contents of a source bitmap after using it in a graphics service call. Since graphics services are not necessarily performed synchronous to the requests (that is, completed prior to the service requests return), a direct change may change the bitmap contents prior to its use by the output controller. In such a case, the bitmap must be declared "volatile," for example, by the PDL interpreter passing a "volatile" flag as an argument to the graphics interface of output controller 15.

This feature must be used sparingly and only where truly needed due to the expense in memory and processor time. It is not intended as a substitute for PDL interpreter management of required memory. When the PDL interpreter and the other portions of output controller 15 operate synchronously, no problem arises. If the two processes run asynchronously as they do when the controller includes hardware assistance or when double buffering is in effect, the output controller must make a copy of a "volatile" bitmap so that the bitmap does not change before it can be used. The caller, i.e., the PDL interpreter can flag a bitmap as volatile in its descriptor.

Figure 2:
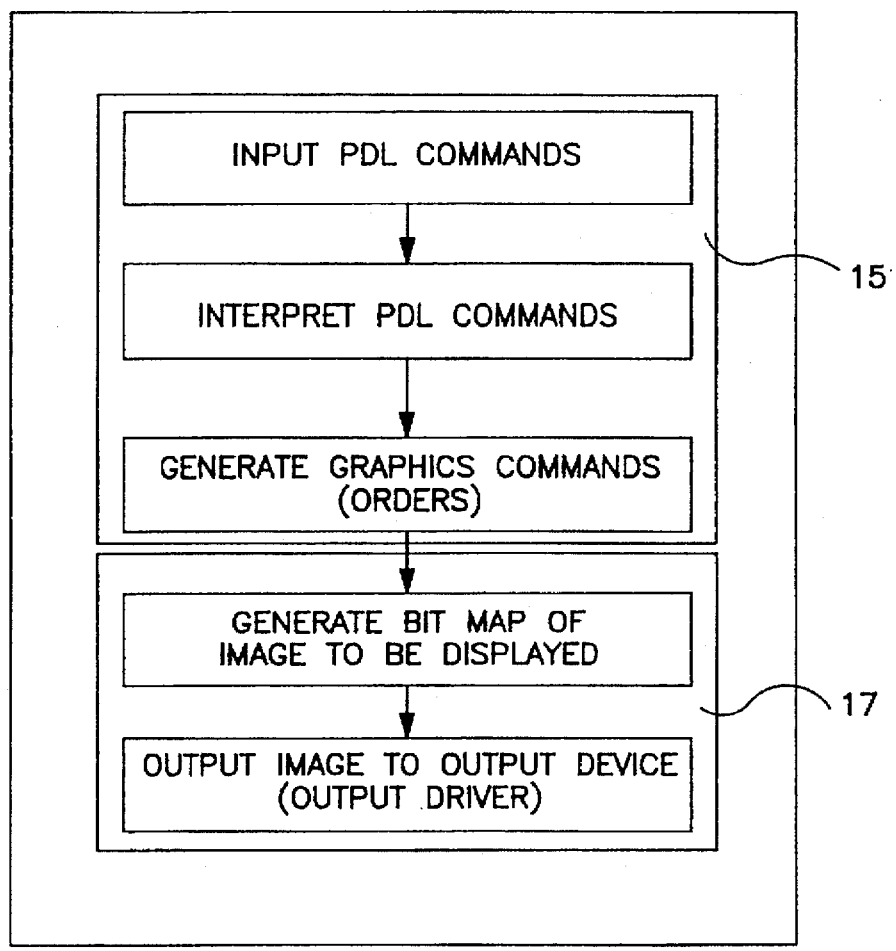
FIG. 2 is a functional block overview diagram of output controller 15 and bit map image generator 17.

FIG. 2 shows the functions according to the present invention performed by output controller 15 which inputs PDL commands, interprets the PDL commands and generates graphics commands or orders, and by bitmap image generator 17 which generates a bitmap of the image to be printed from the graphics orders and outputs the image to the printer.

Figure 3:
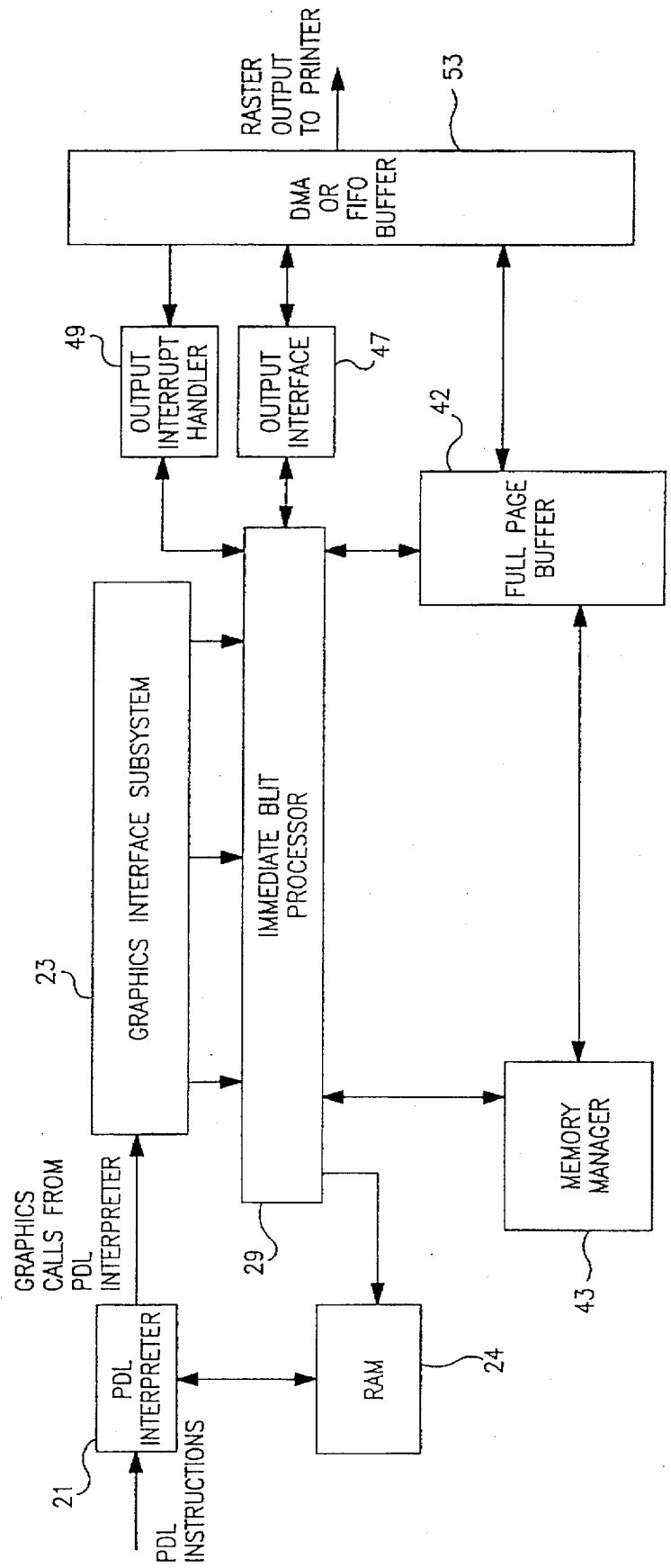
FIG. 3 is a functional diagram of an implementation of output controller 15 and bit map image generator 17 according to the prior art.

A functional block diagram of output controller 15 and bit map image generator 17 as implemented in the prior art will now be described with reference to FIG. 3. Specifically, output controller 15 and bitmap image generator 17 comprise a graphics interface subsystem 23 which receives the graphics calls generated by PDL interpreter 21 based upon the PDL instructions 13 generated by application 11. The graphics interface subsystem passes the graphics calls to immediate blit processor 29. User memory 24 is a random access memory used by PDL interpreter 21 as a temporary storage of source bitmaps which will be passed to graphics interface subsystem 23 as source arguments to graphics calls. Memory manager 43 allocates and deallocates RAM memory blocks as requested by graphics interface subsystem 23. When an End Page instruction is called by the PDL interpreter, the actual bitmap images to be printed are transferred from page buffer 42 to DMA hardware or a FIFO buffer 53 for transfer to a printer by operation of output interface 47, output interrupt handler 49, and graphics interface subsystem 23.

The specific manner in which the elements shown in FIG. 3 operate to produce a raster output suitable to be sent to a printer is as follows.

PDL interpreter 21 processes the incoming PDL source statements, calling the graphics interface subsystem 23 as necessary using calls relating to pages and bit image drawing.

When the PDL interpreter calls the graphics interface subsystem 23 to start a new page, the graphics interface subsystem calls memory manager 43 to allocate memory for the page image.

Subsequently, the graphics interface subsystem 23 calls immediate blit processor 29 for each blit command from the PDL interpreter 21 after checking the command for errors and adjusting the parameters as necessary to perform destination clipping, i.e., assuring that a blit cannot extend beyond the boundaries of the destination as defined in the blit command arguments or the extent of the page image.

PDL interpreter 21 calls the graphics interface subsystem 23 when it has completed processing for the page. The graphics interface subsystem then calls output interface 47 to deliver the image for output.

The output interface checks to see if output is in progress and if not starts the printer hardware and delivers the first data to the DMA or FIFO device 53.

If output is in progress, output interface 47 places the new output image on its internal queue to be started when current activity completes.

Interrupt handler 49 operates by continuing the delivery of data to the DMA or FIFO 53 and by starting a queued image, if any, when the output for the current image is complete. When the output of a page image is completed, interrupt handler 49 calls a completion routine in graphics interface subsystem 23 to announce this completion. At this time graphics interface subsystem 23 can return the page image buffer 42 to memory manager 43 or re-use it for another page.

Figure 4:
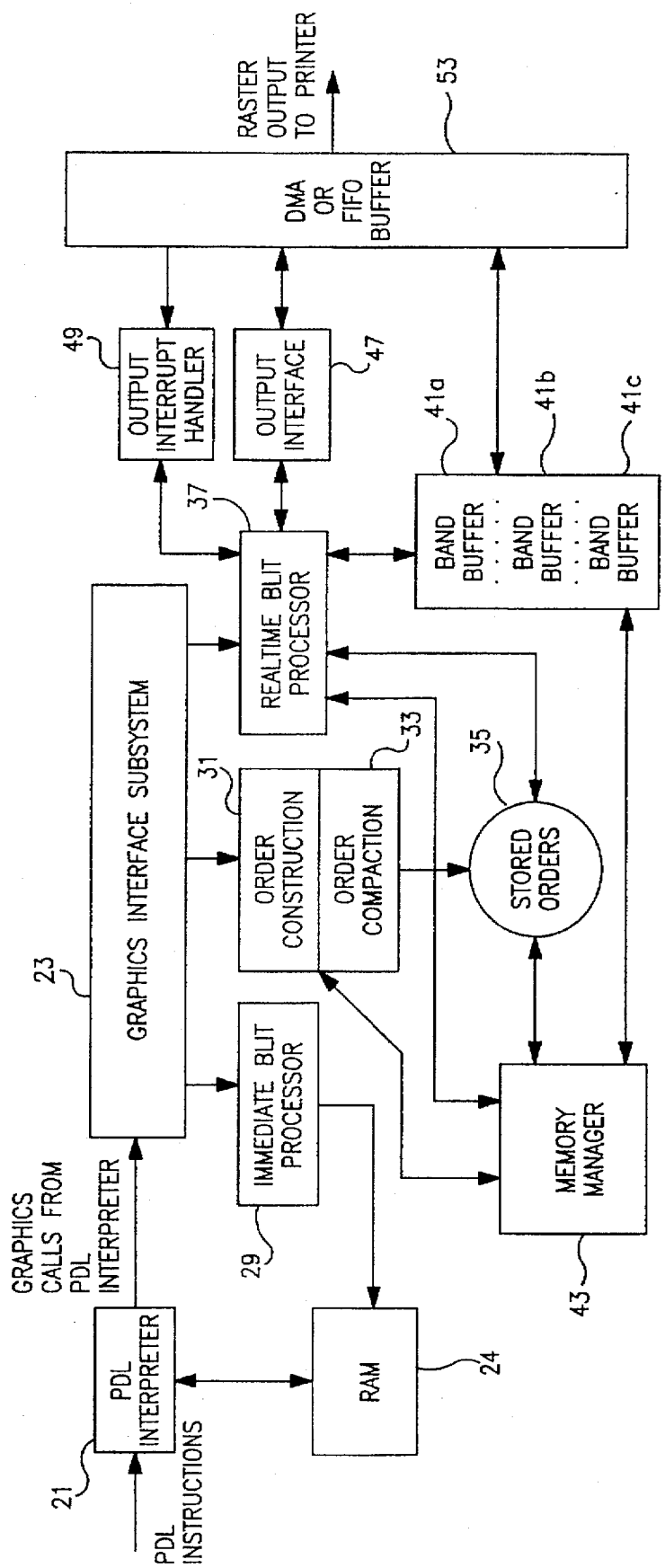
FIG. 4 is a functional diagram of an implementation of output controller 15 and bit map image generator 17 according to the present invention.

FIG. 4 is a functional block diagram showing the functions of output controller 15 and bitmap image generator 17 when implemented according to the teachings of the present invention. Before describing the elements of FIG. 4 in detail, it will be helpful to explain the major differences between the technique for rendering the output image in small bands according to the present invention and rendering it in a full page image buffer according to the prior art. These differences are as follows:

1. When using a full page buffer, graphics interface subsystem 23 uses the immediate blit processor for every pixel drawing call the PDL interpreter makes. That is order construction 31, order compaction 33, realtime blit processor 37, and the stored graphics orders 35 shown in FIG. 4 are not used in the prior art.

2. Additionally, in the prior art, output interface 47 and output interrupt handler 49 do not need to coordinate processing with a realtime blit processor which does not exist using prior art techniques, eliminating the need for what may be called an "extended interrupt processing thread."

The invented banding technique includes the following requirements:

1. An ability to differentiate between graphics requests which can be performed immediately by immediate blit processor 29 and those which must be converted to stored orders for subsequent handling by realtime blit processor 37.

2. Design of the stored order formats.

3. An order compaction function.

4. A capability for updating the stored orders by the realtime blit processor to eliminate those that it completes or mark those that it must reprocess in a way so it can efficiently reprocess an order that spans multiple bands.

While the invented technique may be implemented in software, when implemented using co-processor hardware, the hardware replaces both the immediate blit processor and the realtime blit processor. In addition, in the preferred embodiment, a hardware implementation incorporates the output FIFO or DMA device 53. A hardware implementation of the realtime blit processor does the same type of order updating as that performed by a software implementation. However, since a hardware implementation runs much faster than a software implementation, the hardware implementation can band much more complex pages and keep up with much faster output devices. It also may employ a separate hardware bus for access to the band buffers 41a, 41b and 41c.

However, in a hardware implementation, software will still normally be used to construct the stored orders since the order information must be represented in a manner suitable for processing by a state machine which can be implemented in a cost effective manner.

The following is a brief description of each of the functional elements comprising the invention as shown in FIG. 4.

Graphics Interface Subsystem 23

PDL interpreter 21 calls graphics interface subsystem 23 which is a set of standard interface routines for graphics services. The graphics interface determines whether it can perform an immediate blit based on whether or not the destination is user memory 24 or band buffers 41. If it cannot do an immediate blit, it calls order construction function 31 to create stored orders 35.

After either the immediate blit is done or the orders have been constructed, the graphics interface subsystem returns to PDL interpreter 21.

Immediate Blit Processor 29

This function draws pixels in user memory 24 as requested and returns. This function is known in the prior art and is performed whenever pixel drawing commands affect a user memory destination.

Order Construction 31

Order construction processing 31 generates orders 35 which are stored in a memory for subsequent use during realtime blit processing performed by realtime blit processor 37. As more fully described in Appendix 1, the orders include initialization, program flow control, bit-block transfer (for rectangular regions of bitmaps) and scanline transfers (for arbitrarily-shaped regions of bitmaps). Blit processor 37 executes both bit-block and scanline transfers.

For certain types of orders where it may be possible to combine subsequent orders with ones already known, the order compaction function 33 is called to keep track of the orders. In the preferred embodiment, at least scanline blit orders are subject to compaction. Other types of orders can be compacted in accordance with the teachings of this invention.

Order Compaction 33

This function keeps records of the orders that may be compressed until informed by the order construction processing function that it must wrap up a set of orders. Then it reinitializes its internal information to start collecting information about the next set. This function is very important in cases where many small scanline blit orders operate on a small region of the page image. Such compaction provides major reductions in the amount of memory required in cases because the blits overlap.

Stored Orders 35

Stored orders 35 is an internal representation of commands to create the images the application requested.

Realtime Blit Processor 37

When the PDL interpreter issues a call to say it has completed all the requests for a page, graphics interface subsystem 23 starts the realtime processing phase. It traverses stored orders 35 once for each band to be output. When all orders that effect a band have been processed, it calls output interface 47 to queue the band for output or start it immediately if the DMA or FIFO buffer output hardware 53 is available. If another band buffer 41a, 41b or 41c is available, it will construct the next band. When no more buffers are available, it returns to the graphics interface subsystem 23 which returns to PDL interpreter 21. The PDL interpreter may continue interpreting input and working on the next page. From this point on, realtime blit processor 37 is driven by interrupts initiated by output hardware 53. Realtime blit processor 37 converts the stored orders into a bitmap image corresponding to a band or section of the page to be printed which is stored in band buffers 41a, 41b or 41c.

Specifically, interrupt handler 49 is notified by output hardware 53 when a band has been delivered to the printer. Realtime blit processor 37 is then called as an "extended interrupt thread" to continue its processing.

A "band fault" is declared when a stored order pertains to a bitmap image that crosses a band boundary. In such event, the stored order is marked and updated so that the order will be more efficiently processed in the next band. For example, if a character image straddles the boundary between band n and band n+1, the stored order for creating the bitmap image of the character is first processed in band n. When the band boundary is reached, the order is marked and updated with a modified source address, destination address and height for the character image so that only the remaining portion of the image is retrieved from memory when the order is processed in band n+1.

Band Buffers 41a, 41b, 41c

Band buffers 41a, 41b and 41c is a random access memory used to hold the bitmapped page image. If banding is not used, a single band buffer is used to hold a complete page. Otherwise there may be 2 or 3 band buffers of a size much smaller than the complete page.

Memory Manager 43

Memory manager 43 allocates and deallocates blocks of memory in response to calls from graphics interface subsystem 23, order construction 31, order compaction 33 or realtime blit processor 37. Memory manager 43 is a software function that manages the memory containing the stored orders and the band buffers according to well known memory management techniques which need to be employed when the other software components need to acquire or free blocks of memory. The actual bitmap images to be printed are transferred from the band buffers 41 to DMA hardware or a FIFO buffer 53 for transfer to a printer by operation of output interface 47, output interrupt handler 49, realtime Blit processing 37 and memory manager 43. In this connection, although three band buffers are shown in FIG. 4, in practice, there may be two, three or more band buffers, although in most cases two or three band buffers is sufficient.

Output Interface 47

Output interface 47 receives completed bands from the realtime blit processor and either passes them on to the output hardware 53 or queues them for output interrupt handler 49 to pass to the output hardware when it is no longer busy. With the help of output interrupt handler 49, output interface 47 monitors synchronization signals from the printer engine to determine when it can deliver a band for output. Print engines send a "frame sync" signal to indicate top of page. The output interface cannot deliver any data until the "frame sync" signal is true.

When a FIFO buffer is used as the output hardware, the software moves data from the band buffer to the FIFO a scanline at a time. A DMA controller can be used the same way. Top and left margins are created by delivering zeroes for an output device that writes black or by delivering ones for an output device that writes white.

Output Interrupt Handler 49

As the output hardware finishes delivering a band to a video interface of the print engine, it generates an input. The output interrupt handler gets the next band from its queue and passes it to the output hardware. It then returns the previously completed band buffer so the realtime blit processor may reuse it.

When the output interrupt handler returns, realtime blit processor 37 runs again until it has rendered another band before the graphics interface system returns to the PDL interpreter. This "extended interrupt thread" is implemented differently on different CPUs depending on their architectures. The "extended interrupt thread" runs on a separate stack with CPU priority lowered so that it can be interrupted.

Output Hardware 53

When banding according to the present invention is implemented in software, a FIFO or DMA controller is used to handle video output to the print engine. If the banding implementation is done hardware, it may incorporate a FIFO or DMA controller output hardware.

In the preferred embodiment, the functional elements shown in FIG. 4 are implemented in hardware, although if one or more of such elements are implemented in software, the function performed by each such element is actually performed by operation of a microprocessor executing a set of instructions in a memory such that the microprocessor generates control signals appropriate to the function being performed. In this connection, just as the specific hardware implementation details are not needed for a person skilled in the field of the invention to make and use the same, the particulars of a microprocessor, memory, data and address bus, clock and the like needed to implement the invention in software would be readily apparent to a person skilled in the art based upon the description provided herein. The following is a complete software specification for implementing the invention.

DEFINITION OF TERMS
1.1 PRINTER "LANGUAGES"

PCL: Printer Control Language. PCL is a term coined by HP upon introduction of the Laserjet laser printer. It embodies a relatively simple set of escape sequences reminiscent of ANSI 3.64. PCL is considered to be of moderate complexity.

PDL: Page Description Language. PDL's, such as Adobe PostScript and Microsoft TrueImage, are actual "document" programming languages, much like BASIC, FORTRAN, and C. PDLs are interpreted languages rather than compiled languages.

The instructions for how the page is to be formed are described in lexical verbs such as FINDFONT and MOVETO. This means that the parsing and interpretation of these languages must be done in the printer engine itself. Generally, PDLs describe one page at a time, where each page is a separate PDL program. PDLs are considered to be of difficult complexity.

DDL Document Description Language. DDLs, such as Xerox Interpress, are similar to PDLs in that they are programming languages with lexical verbs. The difference between DDLs and PDLs are that DDIs generally describe an entire document consisting of multiple pages. This adds to the storage requirements in that the entire document must be parsed and interpreted before any printing can begin. DDLs are considered to be of difficult complexity.

1.2 DUPLEX PRINTING

Duplex printing is the operation of placing an image on both sides of a page before it leaves the printer.

In a single sided laser printer, shown in FIG. 6a, paper travels from the input hopper 11, under the drum 13 to receive a toner image, through the fuser 15 to set the toner into the paper, and to the output hopper 17.

In a duplex laser printer as shown in FIG. 6b, paper travels from the input hopper 11, under the drum 13 to receive a toner image, through the fuser 15 to set the toner into the paper, and either to the output hopper 17 or to an internal duplex hopper 19. To print on both sides of a page, the paper moves from the input hopper to the duplex hopper, and then from the duplex hopper to the output hopper, passing under the drum and fuser twice.

Figure 7:
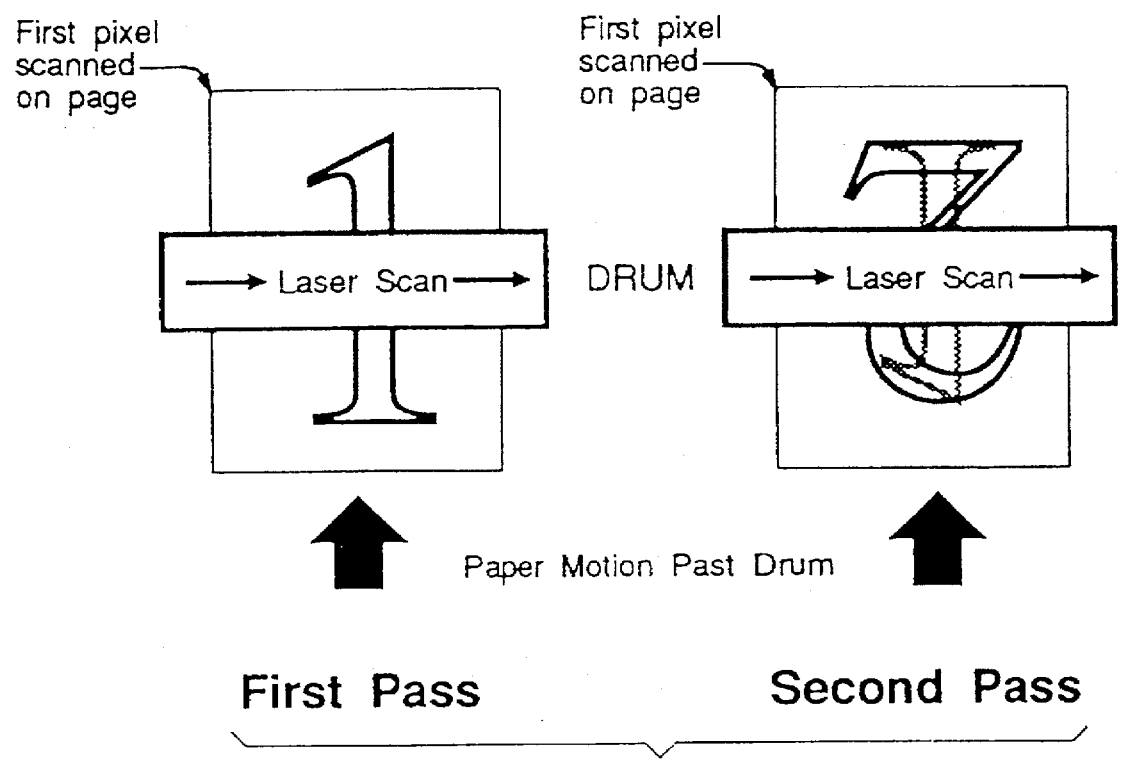
FIG. 7 shows pass 1 and pass 2 image placement.

This is further illustrated in FIG. 7. During the first pass, paper travels from the input hopper and under the drum, where a "1" is placed. After fusing, this page is placed face down in the duplex hopper. During the second pass, paper travels from the duplex hopper and under the drum, where a "2" is placed. After fusing, this page is placed in the output hopper with the second pass image facing up. Note that in order to properly orient the two images on the page the second pass data must be sent to the printer in right to left and bottom to top order.

1.3 BANDING

Banding involves building an image to be output in strips or "bands". Generally, strip n+1 is being composed while strip n is being output to the print engine.

Banding is a process in which the page to be printed is represented in an intermediate form which describes the graphics operations necessary to construct the bit mapped image for the page. This intermediate form is commonly referred to as a 'display list'. The PDL or PCL emulator firmware running on the main processor generates this display list before the print engine begins the actual printing process. The Graphics Execution Unit in PBC executes the display list to form the bit mapped image in bands after the print engine is started.

Banding is desirable in printer controllers due to its potential memory savings and system performance improvements. For banding to be viable, the intermediate representation must meet two requirements: it must fit in considerably less memory than the full image would require, and the commands to generate a band must be executable within the time it takes to print the previous band.

The graphics orders of PBC are designed to be an extremely compact representation of the printed page. RLL compression of graphics data and the elimination of redundant information in the display list enables the intermediate form of the printed page to be significantly smaller than the actual bit mapped image.

The PBC graphics coprocessor is a very high performance bit image processor. The pixel drawing rate of PBC can approach 50 million pixels per second. This level of performance enables PBC to be used effectively in banding applications or in other high speed or high density bit mapped graphics products.

1.3.1 PCL IV And PCL V (HP Laserjet Series II and Laserjet III)

The simple command set and relatively limited image generation capabilities of PCL based printers allows printer directives to be easily represented in the intermediate form required for banding. Even the additional page complexities enabled by PCL V, poses no problems for PBC. All of HP's PCL laser printers use the banding technique.

1.3.2 PostScript And Other PDLs/DDLs

PostScript and other PDLs/DDLs support a robust set of commands. These commands allow complete control of the image generation. They permit control of all of the attributes of character fonts including point size, orientation, shade, and slant.

Banding has not been possible in PDL laser printer applications due to the potential complexity of the images which can be constructed by these languages. An acceptable intermediate representation had not been developed until the introduction of the PBC graphic orders. Using the compact PBC orders, all PostScript pages, except the most complex, can be represented in less than 250 Kbytes of memory. All pages can be represented with additional memory.

1.4 BITMAP

A bitmap is a two dimensional array of memory bits, generally referred to as pixels or dots, as shown in FIGS. 8a and 8b. When stored in memory, this two dimensional array is represented in a contiguous run of bits with no gaps or holes.

Each row 21 of the array is referred to as a scanline or line. There is no special reference for each column of the array.

The X dimension of the bitmap array is referred to as pitch, width, or warp. Width is commonly used to describe smaller arrays, such as character bitmaps. Warp is typically used when describing page image bitmaps. The warp of a bitmap is a particularly useful parameter in that it is the value that, when added to the position in memory of a particular pixel of a scanline, results in a position in the same pixel column in the next lower scanline; warp is the amount to move to result in a Y-only movement within the bitmap.

The Y dimension of the bitmap array is referred to as height.

In addition to the physical size of the bitmap, there are two other attributes associated with it: a physical base address for the upper left pixel of the array and, optionally, a logical Y coordinate for the first line of the array. The physical base address is a bit address. The logical Y coordinate is required for banding.

1.5 HALFTONING

Halftoning involves applying a "halftone screen" or pattern to a data transfer in order to modify its appearance. Halftone screens are used to produce shades of gray in a monochrome printing environment such as printing presses, dot matrix printers, or laser printers.

Halftone screens are repetitive in both the X and Y dimensions. For example, to achieve a 50% gray level, an alternating 10101010 01010101 pattern is used, where the 10101010 pattern is repeatedly applied to the even scanlines and the 01010101 pattern is applied to the odd scanlines.

Halftone screens are commonly seen in a newspaper where a photograph with levels of gray must be represented with a medium which only allows black and white. The graininess of halftoning is an accepted side-effect for monochrome printing, although this side-effect can be relieved by increasing the resolution of the output device to the point where the human eye cannot distinguish the individual dots which make up the gray pattern.

1.6 MEMORY ADDRESSING

All address fields are 32 bits wide. The granularity of the address fields, however, depends on the type of data being referenced: Bitmap structures are always pointed to by 32-bit bit addresses, while all other data structures are referenced with 29-bit byte addresses.

In a 32-bit address field, a bit address occupies the entire width. A byte address, however, occupies only the least significant 29-bits. This provides 4 Gbits or 512 Mbytes of addressability.

When specifying a bit address in a bitmap, the traditional numbering of the bits in a word is abandoned for a more logical sequence. The most significant bit in a word corresponds to the left-most pixel in that word. Thus, the bit addresses increase as one moves from most significant bit to least significant bit. This is further illustrated in FIG. 9, which shows eight bytes 0x88, 0x77, 0x66, 0x55, 0x44, 0x33, 0x22, and 0x11 stored in two words of a bitmap.

The following sections describe the data structures used by the PBC to control its operation and render graphical images.

GRAPHICS EXECUTION UNIT & PRINT ENGINE VIDEO CONTROLLER

The PBC contains two independent subsystems to simultaneously render and print page images: the Graphics Execution Unit (GEU) and the Print Engine Video Controller (PVC). The Graphics Execution Unit is used to execute a display list of graphic orders and render a page image, while the Print Engine Video Controller is used to transfer the rendered page image data to the laser print engine. This section describes the software interfaces to PBC for controlling the Graphics Execution Unit and Print Engine Video Controller.

The software interfaces to the Graphics Execution Unit and Print Engine Video Controller employ a combination of resources: PBC registers, memory-resident command blocks, and microprocessor interrupts. The following is a brief overview of the operation of the Graphics Execution Unit and Print Engine Video Controller.

2.1 BASIC OPERATION

Figure 10:
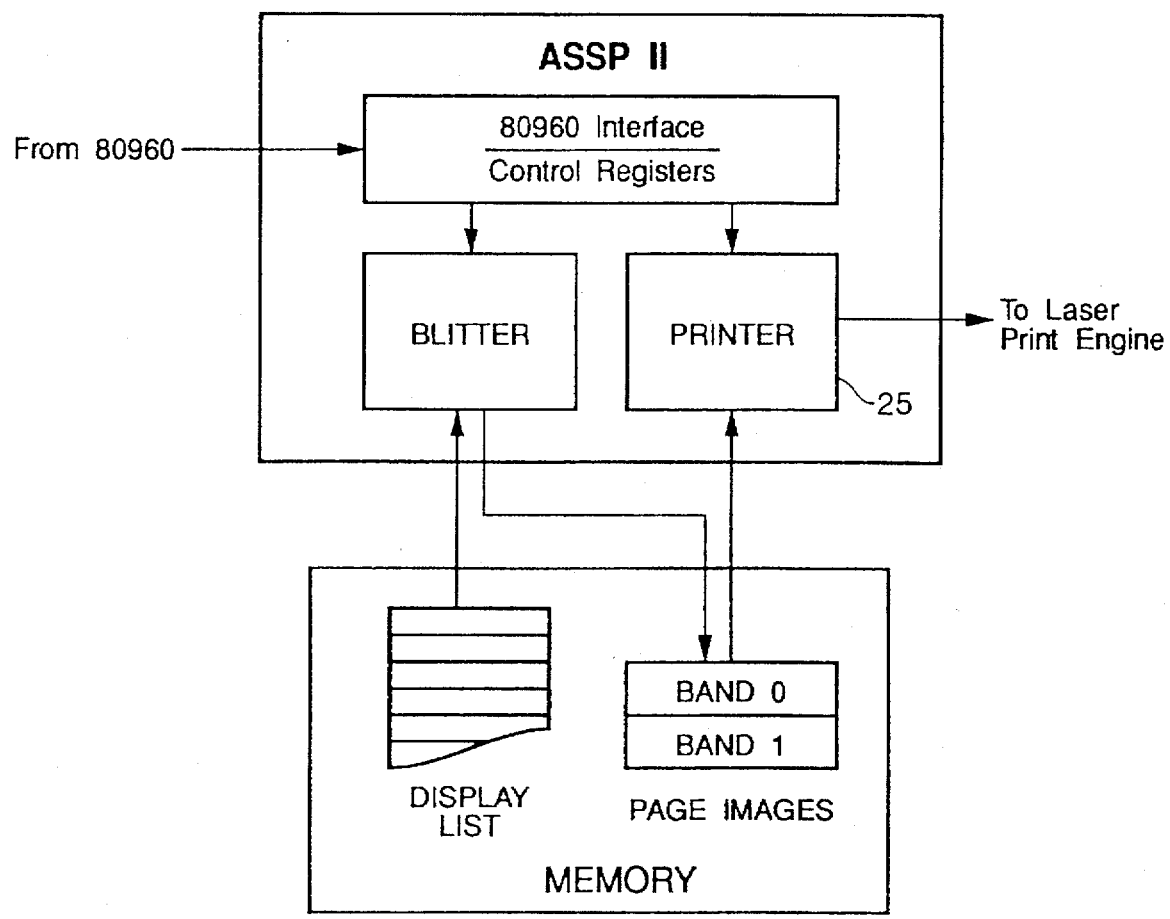
FIG. 10 shows blitter/printer functional block diagram.

A functional block diagram of the PBC's Graphics Execution Unit and Print Engine Video Controller is shown in FIG. 10. The Graphics Execution Unit is started by writing the beginning address of a display list to an PBC register. The Graphics Execution Unit executes the display list and renders a page or band image. When the end of the display list is reached, the Graphics Execution Unit generates an interrupt to the microprocessor, and waits for another display list address. A second display list address can be loaded while the Graphics Execution Unit is working on the first display list. In this case, upon completion of the first display list, an interrupt is generated and the second display begins executing immediately. A second interrupt is generated upon completion of the second display list.

The Graphics Execution Unit can render an entire page from a display list, or multiple bands from a single "banded" display list. A banded display list contains band information near the beginning of the list. This band information includes the address and size of the band as well as the band number that is to be processed. The Graphics Execution Unit uses this information to determine which orders from the display list to process and where in memory to create the bit map image for this specific band. Thus after one band is fully rendered and the Graphics Execution Unit generates an interrupt, software simply adjusts the display list to reflect the next band information and then restarts the Graphics Execution Unit.

This interface between the processor and the Graphics Execution Unit allows complete freedom in the design of the banded memory system. The quantity, size, and location of band buffers is determined by the main processor's software. These band parameters can be dynamically altered to suit a particular application or page complexity. The desired band number is included to allow for non-sequential band processing applications such as duplex printing.

After a page image (or band image) is created by the Graphics Execution Unit, the Print Engine Video Controller is used to transmit the page image to the print engine. The Print Engine Video Controller is started by writing an address of a print command block, or PCB to an PBC register. Upon activation, the Print Engine Video Controller reads the parameters from the PCB, fetches the first page image data from memory, and then waits for the beginning of page signal (Frame sync, FSYNC) from the print engine. When FSYNC is detected, the Print Engine Video Controller generates a "band begin" interrupt, and starts transmitting the page image video data to the print engine. When the entire page or band image has been transmitted, a "page end" interrupt is generated, allowing software to reuse the page image memory space.

When banding, the Print Engine Video Controller must be given several PCB addresses throughout the course of one page. After each "band begin" interrupt is generated, software may load another PCB address to the next band's page image. It may reuse the band image memory and the PCB structure used in the previous band at this time.

The Print Engine Video Controller automatically manages all parameters associated with the video image. Top margins and left margins are automatically inserted by the Video Controller. The Page Width parameters are used to calculate the beginning address of each scanline. The page or band height parameters are used to determine the end of the page or band.

This type of print engine video interface eliminates all software overhead associated with the transfer of the bit mapped image to the print engine. Software merely starts the transfer and waits for the end of page or band interrupt. This frees the software to start processing the next page.

This type of print engine interface also saves a significant amount of hardware cost. Static RAM's or FIFO's are not necessary as the bit mapped image is DMA'ed directly from the DRAM memory. The Print Engine Video Controller uses an efficient page mode access to DRAM to maximize memory bandwidth and contains an internal 4 word queue for printer video data.

2.2 REGISTER SET

There are eight PBC registers that provide control of, and status from, the Graphics Execution Unit and Print Engine Video Controller. These registers are shown in FIG. 11.

2.2.1 Display List Address Register

The Display List Address Register is used to start the Graphics Execution Unit. When the Display List Address Register is initially loaded, the specified display list address is immediately copied into the Graphic Order Instruction Pointer, and the first graphic order is fetched. At this time, BLT BUSY is set in the GEU/PVC Status register to indicate that the Graphics Execution Unit is running.

The Display List Address Register in PBC is "double buffered" to maximize Graphics Order execution. A second operation may be started prior to the completion of the first operation. The second operation will be automatically started upon completion of the first operation. The Status bit DLA EMPTY indicates when a subsequent display list starting address may be loaded. Refer to Section 2.2.7 for a detailed discussion of the function of this status bit.

2.2.2 Graphic Order Instruction Pointer Register

The Graphic Order Instruction Pointer Register contains the address of the second byte of the graphic order currently being executed. This register can be read at any time. When the Graphics Order Execution Unit detects an error, BLT ERROR is set in the Interrupt Event register and the Graphic Order Instruction Pointer is frozen until a soft reset of the Graphics Execution Unit is issued.

2.2.3 PCB Address Register

The PCB Address Register is loaded with an address of a Printer Control Block. Loading this register starts a Print Engine Video Controller operation. When the PCB Address Register is loaded, the Print Engine Video Controller reads the PCB parameters from memory. The PCB contains the starting address of the page image, its warp, width, and height, and other parameters and settings. The exact structure of the PCB is discussed below in section 2.3.

The PCB Address Register is "doubled buffered" to maximize Print Engine Video Controller operation. A second PCB operation to be started prior to the completion of a previous operation. The second PCB operation will automatically be started upon the completion of the first operation. The status of a PCB is indicated by the PCB EMPTY bit in the GEU/PVC Status register. The PCB Address Register cab only be loaded when the PCB EMPTY bit is set. Refer to Section 2.2.7 for a detailed discussion of the function of this status bit.

2.2.4 Print Signal Control Register

The PRINT Signal Control register is a 1 bit register that is used to start and control the operation of the print engine. The PRINT bit is a direct connection to the print engine via the PBC's PRINT output signal.

2.2.5 Interrupt Event Register

The Interrupt Event and Interrupt Mask registers are discussed in detail below, section 2.4. They indicate the source of an interrupt, and allow masking of each interrupt source. There is a total of eight interrupt sources.

2.2.6 Interrupt Mask Register

2.2.7 GEU/PVC Status Register

The Graphics Execution Unit and Print Engine Video Controller Status Register (GEU/PVC) is a 4 bit register that indicates the state of the Graphics Execution Unit and Print Engine Video Controller. These bits indicate when the respective controllers are operating and their memory control structures are available for use.

The PCB EMPTY bit when true, indicates that PCB Address Register and the PCB pointed to by the PCB Address Register are available for use by a new operation. This bit when false, indicates that neither the PCB Address Register nor the PCB pointed to by the PCB Address Registers may be altered. The PCB EMPTY bit will be reset when the PCB Address Register is loaded. The PCB EMPTY bit will be set by the Print Engine Video Controller when both the PCB and the PCB Address Register are available for the next PCB. If a PCB address is loaded when PCB EMPTY bit is reset, then the address is ignored and lost.

The DLA EMPTY status bit indicates the state The second load of the Display List Address Register will cause DLA EMPTY to be reset, and this bit will stay reset until the Graphics Execution Unit has finished executing the first display list and started on the second. If a display list address is loaded when DLA EMPTY is not set, the address is ignored and lost.

The PRINT BUSY bit indicates that the Print Engine Video Controller is in operation. The Print Engine Video Controller sets PRINT BUSY true when the PCB Address Register is loaded. This bit will be reset upon the completion of a PCB operation. A PCB operation is complete when the last video data word is fetched from memory and loaded into the internal PBC video FIFO. The PRINT BUSY bit will not be reset upon the completion of a PCB operation if a subsequent PCB address has been loaded into the PCB Address Register prior to the completion of the previous PCB operation.

2.2.8 GEU/PVC Soft Reset Registers

The Graphics Execution Unit and Print Engine Video Controller Soft Reset registers allow software to independently initialize each subsystem to a known state. When the Graphics Execution Unit detects an error and sets BLT ERROR, it must be reset by writing a one into the GEU RESET bit. The Graphics Execution Unit is disabled from further operation when the BLT ERROR is set. Similarly, when PRINT ERROR is detected, the Print Engine Video Controller must be reset by writing a one to PRINTER RESET. Writing a zero to either soft reset bit has no effect.

2.3 PRINT COMMAND BLOCK STRUCTURE

Figure 12:
FIG. 12 shows PCB record structure.

The Print Engine Video Controller makes use of a print command block, or PCB. This address is loaded to start Print Engine Video Controller operations. The PCB is a 20 byte, 9 record structure, as shown in FIG. 12.

The Page Image Bit Address is a pointer to the starting address of the page image or band. It is interpreted as bit address, and must be byte aligned (the PBC zeroes the three least significant bits).

PBC has the capability to interface to a variety of print engines. The address written into the Page Image Address Register will depend on the scanning direction of the print engine. Table 1 indicates the proper starting address for each of the 4 scanning options supported by PBC.

The Vertical Margin parameter specifies the number of non-printable scanlines from the FSYNC signal to the first printable scanline. and Horizontal Margin PCB parameters define the printable area of the printed page. These parameters specify the number of scanlines or pixels between the FSYNC or LSYNC to amount of time number of indicate the number of white-filled scanlines and white bits, respectively, that are to be automatically shifted out to the print engine before page image data is sent. The BOTTOM TO TOP and RIGHT TO LEFT bits in the PCB Control Field affect the interpretation of Top Margin and Left Margin parameters. When printing bottom to top, the Vertical Margin parameter specifies the number of white scanlines to be transmitted before any page image scanlines, thus providing a bottom margin instead of a top margin. When printing right to left, white bits are shipped before any bit of any scanline, resulting in a right margin instead of a left. This reversal of meaning comes about because white padding is always shipped before any page image video data.

The Page Height and Page Width PCB parameters describe the dimensions of the page image. The scan direction bits have no effect on these parameters. The Page Warp parameter allows the page image bitmap to be unpacked, and must always be greater than the Page Width to insure proper operation. The Page Warp value is used to calculate Y movement when either BOTTOM TO TOP or RIGHT TO LEFT is exclusively set.

The Video Clocks and Video Scanlines PCB parameters are used for specifying print engine parameters for those print engines that don't provide an FSYNC and/or LSYNC signals. The Video Clock parameter specifies the number of clocks the print engine will generate per scanline. The Video Scanlines parameter specifies the number of scanlines that must be transmitted per page.

When the Video Clocks parameter value equals zero, the Engine Video Controller will wait for the assertion of LSYNC before transmitting each scanline.

When the Video Scanlines parameter value equals zero, the Print Engine Video Controller will wait for the assertion of FSYNC at the beginning of each new page.

The Video parameter values are sampled at the top of every page. In banding applications, the parameters are read on the first band of the page, and ignored for successive bands in the page.

Note that the Vertical and Horizontal Margin values have no effect on other Video parameters.

The Control field of the PCB contains three control bits. LAST BAND is used by software to indicate the final band of the page; LAST BAND must also be set for unbanded page images. The Print Engine Video Controller returns an "page end" interrupt when the last word of the last scanline of the page image has been read from memory. Software can then reclaim page image memory space.

LAST BAND also determines the print engine signals used for video synchronization for the next band to be printed. When LAST BAND is reset, the Print Engine Video Controller will start the transfer of video data for the next band on the first assertion of LSYNC. When LAST BAND is set, the Video Controller will wait for the assertion of FSYNC and then will start the data transfer for the next band on the next LSYNC.

The last two control bits in the Control field are the BOTTOM TO TOP and RIGHT TO LEFT. These bits are used to indicate to the Print Engine Video Controller the scanning direction of the laser engine.

Table 1 shows how BOTTOM TO TOP and RIGHT TO LEFT affect the PCB's Page Image Address parameter. The Page Image Address must always point to the first pixel to be transferred to the print engine. These bits also affect interpretation of the Top Margin and Left Margin parameters.

TABLE 1

Page Image Address for Duplex Printing Applications

| Bottom To | Top | Right To Left | Page Image Address Required |
|---|---|---|---|
| 0 | 0 | | Top leftmost pixel in page image |
| 0 | 1 | | Top rightmost pixel in page image |
| 1 | 0 | | Bottom leftmost pixel in page image |
| 1 | 1 | | Bottom rightmost pixel in page image. |

2.4 INTERRUPTS

PBC contains 8 possible sources of interrupts. The least significant 8 bits of the Interrupt Event Register indicate the specific source of the interrupt. The Interrupt Event Register when read, will indicate the PBC interrupt source. Reading this register will reset all bits in the Interrupt Event Register and will also deassert the microprocessor interrupt. The upper half of the Event register contains status bits that provide greater detail on the actual source of the interrupt.

PBC incorporates an Interrupt Mask Register. This 8 bit register contains a mask bit for each of the 8 possible interrupt sources in PBC. The mask bits in this register directly correspond to the least significant 8 bits in the Interrupt Event Register. Setting a bit in the Interrupt Mask Register will prevent the corresponding interrupt event from generating an interrupt. The mask bits only prevent the assertion of their respective interrupts. The interrupt event will be recorded in the Interrupt Event Register regardless of the state of the bit in the Interrupt Mask Register.

The Graphics Execution Unit generates an interrupt when it becomes idle upon completion of the execution of a display list and the Display List Address register is empty. If the Graphics Execution Unit detected an error during the execution of a display list, both BLT DONE and BLT ERROR are set. The Graphics Execution Unit must be reset after a BLT ERROR is returned (see section 2.5, below).

The Print Engine Video Controller has two sources for interrupts: BAND BEGIN and PAGE END. BAND BEGIN is generated at the start of a page or band. The exact timing of the BAND BEGIN interrupt is dependent on the position within the printed page. If the Print Engine Video Controller is waiting for an FSYNC at the top of a page, then BAND BEGIN is generated immediately after FSYNC is received from the print engine. If the page is being rendered in bands and the Print Engine Video Controller is on a band further down the page, then BAND BEGIN is generated immediately after the last parameter of the PCB is read from memory.

PAGE END is generated in response to a PCB with LAST BAND set immediately after the last word of the last scanline is read from memory.

Three additional bits are present in the upper half of the Interrupt Event register: VIDEO UNDER, BAND UNDER, and PRINT ERROR. These bits are status bits, not interrupt sources. These bits are valid when the BAND BEGIN or PAGE END bits are asserted. A full explanation of these bits is provided in the following section.

2.5 ERROR RESPONSES

The Graphics Execution Unit can detect errors in graphic orders or during the execution of a display list. Upon detection of an error, the Graphics Execution Unit immediately stops executing the display list and sets both BLT DONE and BLT ERROR in the Interrupt Event register. The Graphic Order Instruction Pointer will be pointing to the second byte of the graphic order in error.

The Graphics Execution Unit must be soft reset after the detection of an error to enable further operation.

The Print Engine Video Controller can detect three types of errors. The Print Engine Video Controller does not stop when an error is detected, it simply sets the error status bits in the Interrupt Event Register and continues.

The three types of errors that can be detected by the Print Engine Video Controller are VIDEO UNDER, BAND UNDER, and PRINT ERROR.

VIDEO UNDER indicates that a video underrun occurred during the previous band (or page). This error occurs if the print engine requests video data faster than the Video Controller can access memory.

BAND UNDER indicates a banding error. This error occurs when the Print Engine Video Controller is between bands, and an LSYNC was received from the print engine (1) before another PCB address was received, or (2) while the Print Engine Video Controller is busy reading the PCB parameters or the first words of the page image. Band underruns usually point to a page description that is too complicated for the given banding environment.

PRINT ERROR indicates that a miscellaneous error occurred during the print process; the Print Engine Video Controller should be reset after a PRINT ERROR is returned.

GRAPHIC ORDER OVERVIEW

The PBC's Graphics Execution Unit operates on lists of commands, termed a display list, which consists of a sequence of graphic orders. A graphic order directs the PBC to perform a discrete function, from setting internal environment registers, to executing bit-block or scanline transfers. The PBC's graphic order instruction set is shown in Table 2.

to a scanline table, which is a compressed run-length encoding of an image, such as a font character. Both the graphic orders and scanline tables normally reside in DRAM.

The source operands of bitBLT or scanline graphic orders can reside in DRAM or I/O space (e.g., a font cartridge), but not EPROM space (EPROM data does not pass through the PBC). The destination of the transfer is always a bitmap that lives in DRAM.

3.1 BITBLT OPERATION

A bit-block transfer (bitBLT) involves operating on a specified rectangle on one or more specified bitmaps. The specified rectangle, termed a "frame", is generally a subset of the destination bitmap. It may or may not be a subset of the source bitmap.

When the destination bitmap is a banded bitmap, the transfer terminates prematurely if the frame extends below the bottom of the band. This is considered a band fault. (The transfer will resume when the display list is rerun to render the next band of page image.)

3.2 SCANLINE OPERATION

A scanline transfer involves operating on a specified set of scanline runs on one or more specified bitmaps. The set of scanline runs is defined by a scanline table, which contains a series of bitstring specifiers. Each bitstring specifier is a compressed run-length encoding of scanline run. The compressed format of scanline tables not only save memory, but also improve performance since less memory fetches have to be performed.

Since the set of scanline runs determines what portions of the specified bitmaps are modified, the scanline transfer allows non-rectangular regions to be specified. This is accomplished by describing the non-rectangular region to be modified as a set of scanline runs. The scanline runs themselves specify the "frame".

TABLE 2

| | PBC Graphic Order Instruction Set | |
|---|---|---|
| INITIALIZATION ORDERS | SET_BBMAP | Set banded destination bitmap parameters |
| | SET_UBMAP | Set unbanded destination bitmap parameters |
| | SET_SBMAP | Set source bitmap parameters |
| | SET_HTBMAP | Set halftone bitmap parameters |
| | SET_BOOL_D | Set boolean code for "one op" graphic orders |
| | SET_BOOL_HD | Set boolean code for "two op" halftone / destination orders |
| | SET_BOOL_SD | Set boolean code for "two op" source / destination orders |
| | SET_BOOL_SHD | Set boolean code for "three op" graphic orders |
| FLOW CONTROL ORDERS | JUMP | Jump to specified graphic order in display list |
| | STOP | Stop execution of display list |
| BITBLT ORDERS | BLT2F_D | "One op" bitBLT to frame |
| | BLT2F_SD | "Two op" bitBLT to frame |
| | BLT2F_SHD | "Three op" bitBLT to frame |
| | BLT2UB_D | "One op" bitBLT to unbanded bitmap |
| | BLT2UB_SD | "Two op" bitBLT to unbanded bitmap |
| | BLT2UB_SHD | "Three op" bitBLT to unbanded bitmap |
| | BLT2BB_D | "One op" bitBLT to banded bitmap |
| | BLT2BB_SD | "Two op" bitBLT to banded bitmap |
| | BLT2BB_SHD | "Three op" bitBLT to banded bitmap |
| SCANLINE ORDERS | SL2F_D | Scanline transfer to frame |
| | SL2F_HD | Scanline transfer to frame with halftone |
| | SL2UB_D | Scanline transfer to unbanded bitmap |
| | SL2UB_HD | Scanline transfer to unbanded bitmap with halftone |
| | SL2BB_D | Scanline transfer to banded bitmap |
| | SL2BB_HD | Scanline transfer to banded bitmap with halftone |

There are four types of graphic orders: initialization, program flow control, bitBLT (bit-block transfer), and scanline transfer. The initialization graphic orders and the bitBLT graphic orders are processed as a stream of instructions from the display list. The scanline graphic orders include a pointer When the destination bitmap is a banded bitmap, the transfer terminates prematurely if the scanline frame extends below the bottom of the band. This is considered a band fault. (Execution of the scanline table will resume when the display list is rerun to render the next band of page image.)

3.3 INITIALIZATION ORDERS

Initialization graphic orders define bitmap parameters and boolean codes to be used during bitBLT and scanline transfers. The PBC allows four different bitmaps to be defined simultaneously: a banded bitmap, an unbanded bitmap, a source bitmap, and a halftone bitmap. There is a SET_BMAP order for each type of bitmap. Bitmap parameters thus set are used by all subsequent graphic orders that operate on the given bitmap. Since several transfers typically operate on the same bitmap, compaction of the display list is achieved by specifying a bitmap's parameters only once per set of graphic orders.

The same practice is used for defining boolean codes. Four boolean codes may be defined simultaneously, one each for (1) destination only transfers, (2) halftone and destination transfers, (3) source and destination transfers, and (4) source, halftone, and destination transfers. There is a SET_BOOL order for each combination. Since several transfers typically apply the same boolean function, compaction of the display list is achieved by specifying a boolean code only once per set of graphic orders.

3.4 FLOW CONTROL ORDERS

There are two graphic orders that control the execution order of the display list: JUMP and STOP. JUMP allows execution to transfer to a different point in the display list. STOP signals the end of the display list (and normally results in an interrupt to the microprocessor).

3.5 BITBLT ORDERS

There are nine different bitBLT graphic orders that provide nine permutations of destination bitmap (frame, unbanded bitmap, or banded bitmap) and operand type (destination; source and destination; or source, halftone and destination).

These graphic orders rely on parameters being previously set with certain initialization orders. Removing parameters that are typically common to several bitBLT operations makes each bitBLT graphic order smaller and results in a display list which occupies less memory space.

3.6 SCANLINE ORDERS

There are six different scanline graphic orders that provide the six permutations of destination bitmap (frame, unbanded bitmap, or banded bitmap) and operand type (destination, or halftone and destination).

As with the bitBLT orders, the scanline graphic orders rely on parameters being previously set with certain initialization orders. Removing parameters that are typically common to several scanline operations makes each scanline graphic order smaller and results in a display list which occupies less memory space.

3.7 TYPICAL DISPLAY LIST SEQUENCE

FIG. 15 shows a trivial example of what a typical display list of graphic orders might look like. More importantly, it provides insight on how the initialization graphic orders work with the bitBLT and scanline graphic orders.

3.8 BITMAP TYPES

There are four distinct types of bitmaps used by the graphic orders: a frame, an unbanded bitmap, a banded bitmap, and a halftone bitmap.

3.8.1 Frame

A frame is a two dimensional array of pixels that is generally a subset of a larger bitmap array. Typically, a frame describes the bounding box of a character.

Frames are subtly different than bitmaps in that width and warp are identical in a frame. When transferring a rectangle to a bitmap, both the warp of the bitmap and the width of the rectangle being transferred must be specified. When transferring a rectangle to a frame, the warp is the width of the rectangle being specified.

Operations which involve transferring pixels to frames are particularly useful when a small rectangle of a larger image must be cut and saved for future reference. The frame is the smallest possible storage means for the small rectangle because the scanlines are completely compacted in memory; the end of one scanline and the beginning of the next have no unused bits between them.

3.8.2 Unbanded Bitmap

An unbanded bitmap is simply a bitmap which has no logical coordinate associated with its Y axis. When specifying an unbanded bitmap in a transfer of data, it is assumed that the bitmap is of sufficient size to complete the transfer. This requires that sufficient memory be allocated to contain the transfer. Another way of thinking about it is that no bounds checks are made for unbanded bitmaps.

3.8.3 Banded Bitmap

A banded bitmap is simply a bitmap which has a logical coordinate associated with its Y axis. When specifying a banded bitmap in a transfer of data, the transfer of data is checked against the Y bounds of the bitmap. If the data would fall beyond the Y bounds of the bitmap, a band fault occurs, and the transfer of data is prematurely terminated.

Upon termination of a graphic order, all parameters necessary to resume execution at the point where the band fault occurred are written back to the original graphic order, and the graphic order's band number is incremented (or decremented) to reflect the band where execution of the graphic order should resume.

By automatically updating graphic orders which generate band faults, graphic orders which span multiple bands can be executed without the need for software intervention.

3.8.4 Halftone Bitmap

A halftone bitmap is a special type of bitmap in that it is automatically replicated in both the horizontal and vertical direction. It is intended to hold a pattern which is repetitively applied to data being transferred from a source bitmap to a destination bitmap, causing a change in the appearance of the data (e.g., shading).

3.8.5 Source, Destination, Halftone Bitmaps

Up to three elements are needed when composing an image: a source image, a halftone image to be applied to the source image, and a (larger) destination image to which the final source is to be copied.

Each of these elements is located in a bitmap. The source element is typically located in a "frame" bitmap and the destination element is typically located in a "banded" or "unbanded" bitmap. The halftone is always located in a "halftone" bitmap.

3.9 GRAPHIC ORDER OPERANDS

The PBC graphic order set supports one, two, and three operand transfers. A one operand transfer only affects the destination bitmap; a two operand transfer involves the destination bitmap and either a source bitmap or a halftone bitmap; a three operand transfer combines a source bitmap, a halftone, and a destination bitmap.

Figure 13:
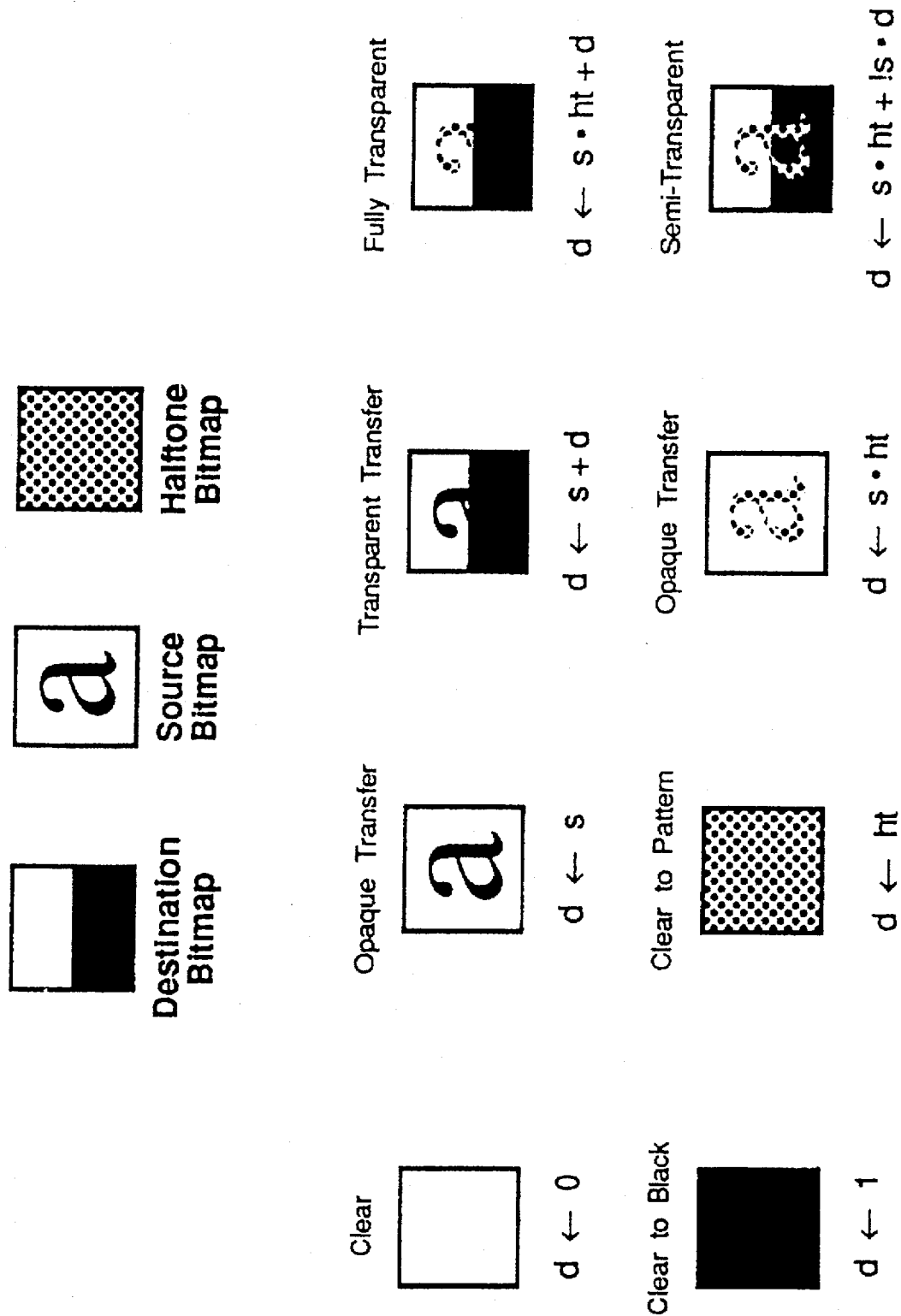
FIG. 13 shows common boolean transfer functions.

The PBC supports all boolean combinations of one, two, and three operand transfers. A total of 256 unique boolean combinations can be created with three operand transfers. Eight common boolean transfer functions are shown in FIG. 13.

3.9.1 One Operand Transfer

One operand transfers specify the destination bitmap on which the given boolean function will be applied. There are four one operand transfers. These are:

| | |
|---|---|
| d ← 0 | Zero fill the destination region. |
| d ← 1 | One fill the destination region. |
| d ← d | Refresh the destination region. No operation. |
| d ← NOT d | Invert the destination region. |

3.9.2 Two Operand Transfers

Two operand transfers specify the destination bitmap where the transfer is to take place (operand 1), and either a source bitmap where the data is to come from, or a halftone bitmap to be applied to the specified bitmap region (operand 2).

There are sixteen two operand transfers of which four are degenerate cases of the one operand transfers. These are:

| | |
|---|---|
| d ← 0 | Zero fill the operand 1 region. |
| d ← 1 | One fill the operand 1 region. |
| d ← d | Refresh the operand 1 region. |
| d ← NOT d | Invert the operand 1 region. |
| d ← NOT op2 | Replace the operand 1 region with the operand 2 region. |
| d ← op2 | Replace the operand 1 region with the inverted operand 2 region. |
| d ← d AND op2 | Replace the operand 1 region with the logical AND of the operand 1 and operand 2 regions. |
| d ← d AND NOT op2 | Replace the operand 1 region with the logical AND of the operand 1 and inverted operand 2 regions. |
| d ← NOT d AND op2 | Replace the operand 1 region with the logical AND of the inverted operand 1 and operand 2 regions. |
| d ← NOT (d AND op2) | Replace the operand 1 region with the inversion of the logical AND of the operand 1 and operand 2 regions. |
| d ← d OR op2 | Replace the operand 1 region with the logical OR of the operand 1 and operand 2 regions. |
| d ← d OR NOT op2 | Replace the operand 1 region with the logical OR of the operand 1 and inverted operand 2 regions. |
| d ← NOT OR op2 | Replace the operand 1 region with the logical OR of the inverted operand 1 and operand 2 regions. |
| d ← NOT (d OR op2) | Replace the operand 1 region with the inversion of the logical OR of the operand 1 and operand 2 regions. |
| d ← d XOR op2 | Replace the operand 1 region with the logical XOR of the operand 1 and operand 2 regions. |
| d ← d XNOR op2 | Replace the operand 1 region with the logical XNOR of the operand 1 and operand 2 regions. |

3.9.3 Three Operand Transfers

Three operand transfers specify the destination bitmap (operand 1) where the transfer is to take place, a source bitmap where the data is to come from (operand 2), and a halftone bitmap to be applied to the specified source and destination bitmap regions (operand 3).

Figure 14:
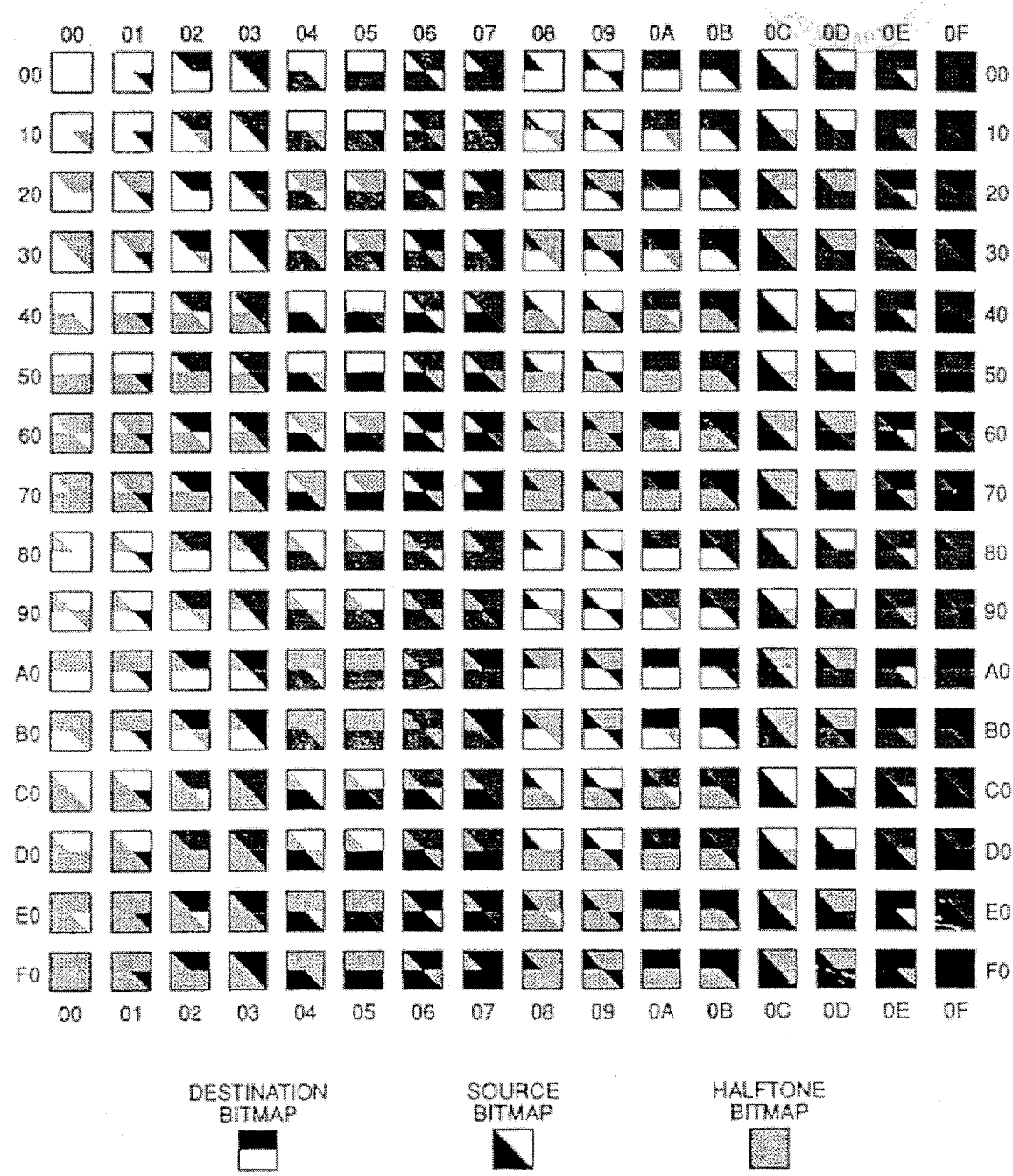
FIG. 14 shows three operand boolean functions.

There are 256 three operand transfers of which four are degenerate cases of the one operand transfers, sixteen are degenerate cases of the two operand transfers involving source and destination bitmaps, and sixteen are degenerate cases of the two operand transfers involving halftone and destination bitmaps. All 256 boolean combinations are represented in FIG. 14. They involve all possible logical combinations (AND, OR, XOR, and XNOR) between the true and inverted versions of the three operands.

3.9.4 Determining Boolean Code

The PBC supports a unique transfer mode for each of the one, two, and three operand transfers. The desired transfer method is specified by means of a boolean code. The boolean code directs the PBC to logically combine the given destination, source, and/or halftone images during the graphic operation.

The boolean code can be easily determined by combining specific constants, or keys, that represent the destination, source, and/or halftone images of a graphic order. The keys are listed in Table 3. When used in boolean arithmetic computations, the one-byte keys yield a one-byte boolean code that corresponds to specific transfer effect.

TABLE 3

| Keys Used To Determine Boolean Codes | |
|---|---|
| Zero | 00000000 |
| One | 11111111 |
| Destination | 10101010 |
| Source | 11001100 |
| Halftone | 11110000 |

For example, the boolean code for $$dest \leftarrow dest\ OR\ source$$

is calculated by logically ORing the destination and source boolean keys:

$$11101110 = 10101010\ OR\ 11001100$$

By setting the boolean code to 0xEE, the PBC will OR the source and destination bitmaps to produce a transparent combination of the two. This combination is shown in FIG. 14, row E0, column 0E, and is clearly the OR of the source and destination bitmaps.

A more complicated transfer function can just as easily be calculated in the same manner. For instance, the boolean code for a semi-transparent source transfer onto the destination bitmap involving halftoning (used by PostScript) is determined as follows:

$$dest \leftarrow (NOT\ source\ AND\ dest)\ OR\ (source\ AND\ halftone)$$

is equivalent to $$code = ((NOT\ 11001100)\ AND\ 10101010)\ OR\ (11001100\ AND\ 11110000)$$

which yields $$code = 11100010 = 0xE2$$

FIG. 14 shows the result of using 0xE2 as the boolean code; the destination image appears to lie below the halftoned source image.

Care must be taken when calculating a boolean code to insure that only keys that are contained in the transfer are used. For example, the halftone key should not be used when specifying the boolean code for a transfer involving only a source and destination bitmap.

If the above constraint is violated, the PBC treats the extra parameter(s) as zero. Thus, if the boolean code for $$dest \leftarrow (source\ AND\ halftone)\ OR\ dest$$

is used to specify a transfer involving only a source and destination bitmap, the PBC treats the halftone parameter as zero. The resulting operation becomes $$dest \leftarrow (source\ AND\ 0)\ OR\ dest$$

or simply, $$dest \leftarrow dest$$

SCANLINE GRAPHIC ORDERS

The scanline graphic orders are used to operate on non-rectangular regions of bitmaps. In their simplest form, they are used to fill arbitrary polygons and to draw vectors.

Scanline graphic orders differ from bitBLT graphic orders in that bitBLT graphic orders specify a rectangular frame. In scanline graphic orders, the individual runs of scanlines describe the frame, and can effectively generate a non-rectangular (and unconnected) frame. Additionally, the bitBLT graphic orders allow a halftone bitmap to be specified. Scanline graphic orders do not allow a source bitmap.

Scanline operations arise quite often from two sources. The first occurs from outline fonts, which describe the outline of a set of characters via splines or lines and arcs. The outlines are scaled for the desired point size through software algorithms. The result is a set of scanline endpoints which must be filled to create a solid character. The second occurs from vector images such as wire-frame diagrams, which are entered as either a series of line drawing graphic orders or as a previously generated bitmap. Since these vector images contain a high percentage of white space, they typically require less storage space when described as a series of scanline operations.

4.1 SCANLINE TABLES

Each scanline graphic order specifies a pointer to a scanline table. The scanline table contains a list of bitstring specifiers that specify the individual scanline runs of an image. Each scanline table starts and ends with a 0x0000 short word terminators. Note that the null terminators can be shared between scanline tables placed adjacent in memory. That is, the ending 0x0000 of one scanline table can serve as the starting 0x0000 for a subsequent scanline table. The dual termination of the scanline table structure is required for duplex printing, when the PBC reads the scanline table in both forward and reverse directions.

4.2 BITSTRING SPECIFIERS

A scanline table contains a list of bitstring specifiers. Each bitstring specifier is made up of two parts: a displacement and a "run length", as shown in FIGS. 16a and 16b. The displacement indicates the number of horizontal and vertical pixels to skip before beginning a run, and the run length indicates the number of pixels to be drawn horizontally during the run.

One of the major benefits of images represented as a series of scanlines is a reduction in the memory storage required to represent the image. This is further augmented by supporting different sized bitstring specifier formats that can economize on short displacements and runs, or allow any pixel in a bitmap to be reached with a single specifier.

PBC supports three bitstring specifiers: a 16-bit specifier for small displacements and runs, a 32-bit specifier for medium displacements and runs, and a 48-bit specifier for large displacements and runs. The specifiers are designed to be recognizable whether the scanline table is read from memory in a forward or backward direction (more precisely, the ID bits in the 32- and 48-bit specifiers are duplicated to allow parsing of the scanline table in either direction). This is required to properly handle scanline graphic orders in a duplex printing environment.

Each bitstring specifier consists of a signed displacement field and an unsigned run length field. When rendering to the banded bitmaps comprising the front side of a duplex page or the only side of a single sided page, or to frames and unbanded bitmaps, the displacement is added to a current destination address before drawing the run. The run is then carried out in a left to right direction. When rendering to the banded bitmaps comprising the back side of a duplex page, the run length is first subtracted from the current destination address and saved, the run is carried out in a left to right direction, and then the displacement is subtracted from the saved destination address.

The PBC maintains a current destination address, and updates it after each bitstring specifier is executed. When the scanline graphic order is begun, the current destination address is loaded with the initial destination address specified in the graphic order. For front side rendering, the current destination address is left pointing to the pixel immediately following the last pixel in the run. For backside rendering, the current destination address stays where the subtraction of the last specifier's X and Y displacements left it.

All of the bitstring specifiers are multiples of 16-bits and must always be located on short word memory boundaries (0 mod 2 byte addresses).

4.2.1 16-Bit Format

The 16-bit bitstring specifier format 31 is used for small displacements and runs. As shown in FIG. 17a, it begins with a "0" ID bit to identify it as a 16-bit specifier, followed by a flag DY to indicate a downward Y movement of the base position, a run length RL of 0 to 63 pixels, and a signed X movement DX of +127/−128 pixels. The X and Y displacements, DX and DY, are resolved before executing the run for the front side of a page, and after executing the run for the back side of a page.

As described above, a 16-bit code of 0x0000 is placed at the beginning and end of every scanline table. Note that the all-zero short word is actually a 16-bit bitstring specifier: the most significant bit is zero, and the remaining 15 bits specify no movement of the base pointer and a run of zero pixels.

4.2.1.1 32-Bit Format

The 32-bit bitstring specifier format 33 is used for medium displacements and runs. As shown in FIG. 17b, it begins with a two-bit "10" ID field to identify it as a 32-bit specifier, followed by a downward Y movement DY from the base position (from zero to three scanlines), a run length RL of 0 to 4095 pixels, a second "10" ID field (required for duplex scanline parsing), and a signed X movement DX of +8191/−8192 pixels. The X and Y displacements, DX and DY, are resolved before executing the run for the front side of a page, and after executing the run for the back side of a page.

4.2.1.2 48-Bit Format

The 48-bit bitstring specifier format 35 is used for large displacements and runs. As shown in FIG. 17c, it begins with a two-bit "11" ID field to identify it as a 48-bit specifier, followed by an signed aggregate X and Y movement value DZ, a second "11" ID field (required for duplex scanline parsing), and a run length RL of 0 to 16383 pixels.

The aggregate displacement, DZ, is the result of the following calculation based on desired X and Y movements, DX and DY. It is also based on the destination warp, and thus, the warp of the target bitmap must be known before a scanline table is built which includes 48-bit specifiers.

$$DZ = DY \times DW + DX$$

where

DX is the desired horizontal movement (signed)

DY is the desired vertical movement (signed)

DW is the warp of the target destination bitmap (unsigned)

Care must be taken when using the 48-bit format in that the aggregate displacement. The 30-bit DZ field can move the current position +536,870,911/−536,870,912 pixel locations (±64 MB), sufficient to reach the farthest ends of most any size page, and if not used carefully, beyond.

The aggregate displacement is resolved before executing the run for the front side of a page, and after executing the run for the back side of a page.

4.2.2 Halftoning Scanline Graphic Orders

As previously stated, a halftone bitmap is automatically replicated in both the horizontal and vertical directions. This is fairly easy to automate for the bitBLT graphic orders since the area to be operated on is a rectangle. For scanline graphic orders, however, the task is rather complex since each scanline run describes an individual area to be operated on. For the 16-bit bitstring specifier, the task is relatively straight forward and can be carried out with a minimal number of overhead cycles. For the 32- and 48-bit specifiers, the task is considerably more complex because of the much larger displacement values associated with them. The task can be carried out, but at significant number of overhead cycles. To reduce the overhead cycle penalty for the larger bitstring specifier formats, a companion halftone table is employed. This eliminates virtually all overhead cycles in return for slightly higher memory storage requirements for most typical scanline tables.

4.2.3 Halftone Companion Table

The halftone companion table consists of a list of corresponding halftone specifiers for each 32- and 48-bit bitstring specifier in the scanline table. There is no companion specifier for 16-bit specifiers (they are handled without the assistance of a companion specifier). In keeping with the relocatable nature of the bitstring specifiers, the companion halftone table use displacements instead of absolute values. This minimizes the number of halftone tables to one table per halftone screen per character to be halftoned. Thus, if only a few characters of a particular font must be halftoned with one particular halftone screen, only one halftone table must be constructed for each character to be halftoned, regardless of the number of times each character is used and, therefore, placed within the halftone screen.

While the companion halftone specifiers reduce the amount of modulo arithmetic that the PBC must perform, a minimal amount of modulo arithmetic is still required after the halftone specifier's displacements are applied to the current halftone position to guarantee that the new position remains inside the boundary of the bitmap. With 16-bit specifiers, their displacement and run length are used directly and added to the current halftone position, and the result is passed through the same modulo logic.

The halftone specifiers for scanline tables makes the following restriction necessary. The horizontal displacements in any of the 16-, 32-, or 48-bit bitstring specifier cannot extend beyond either side of the destination frame, since the halftoning operation will not track the Y movement caused by wrapping around the sides of a bitmap. Of course, the same is true for the run lengths since no horizontal clipping is performed at the left or right edges of the destination bitmap for any graphic order, bitBLT or scanline.

Unlike the scanline table, the companion halftone table requires no 0x0000 terminators (and note the halftone specifiers themselves do not specify ID fields). The parsing of the halftone table tracks that of the scanline table; both tables are read in parallel. For 32- and 48-bit specifiers, the PBC reads a specifier from each table.

For 16-bit specifiers, only the scanline table is read; as stated above, halftone tables do not contain companion specifiers for 16-bit bitstring specifiers.

The halftone specifiers, like their bitstring counterparts, must be located on 16-bit boundaries, and consequently the halftone table address pointer specified in the scanline graphic order must be short word aligned.

4.2.3.1 32-Bit Companion Halftone Specifier

Figure 18A:
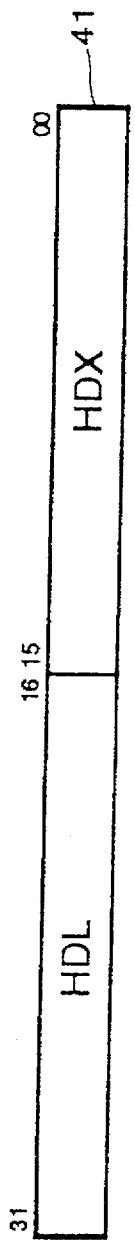
FIGS. 18A and 18B show companion halftone specifier formats.

The 32-bit halftone specifier 41, as shown in FIG. 18a, contains two fields: a halftone horizontal movement delta, HDX, and a halftone run length delta, HDL. HDX and HDL are simply the bitstring specifier's X displacement and run length values modulo the target halftone bitmap width:

$$HDL = RL \bmod HW$$

$$HDX = DX \bmod HW$$

where

RL is the corresponding 32-bit specifier's run length value

DX is the corresponding 32-bit specifier's signed X displacement

HW is the target halftone bitmap width

Both HDX and HDL are unsigned values (note that HDX must be given as a nonnegative modulo value). The Y displacement found in the 32-bit bitstring specifier is handled automatically by the PBC, and has no corresponding field in the halftone specifier.

4.2.3.2 48-Bit Companion Halftone Specifier

Figure 18B:
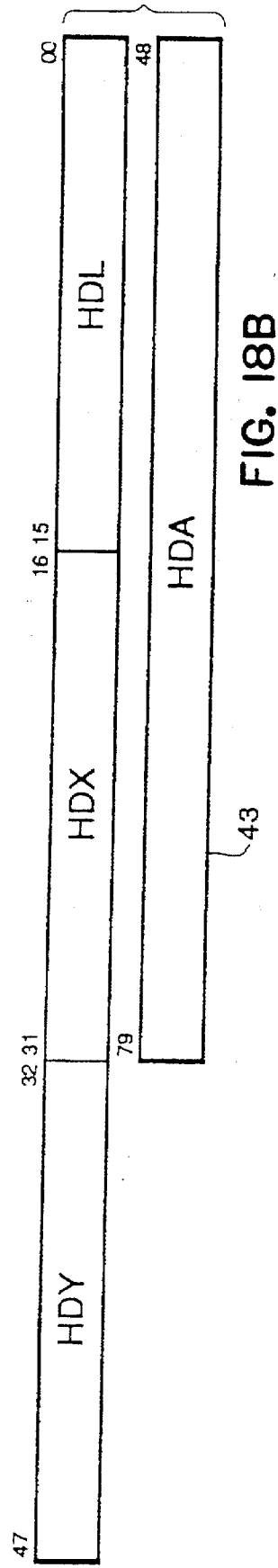

The corresponding halftone specifier for the 48-bit bitstring specifier 43, as shown in FIG. 18b, is 80 bits long and contains four fields: a halftone vertical movement delta, HDY, a halftone horizontal movement delta, HDX, a halftone run length delta, HDL, and a halftone physical starting address delta, HDA. The four parameters are simply the result of modulo arithmetic based on the 48-bit specifier parameters and the target halftone bitmap:

$$HDL = RL \bmod HW$$

$$HDX = DX \bmod HW$$

$$HDY = DY \bmod HH$$

$$HDA = HDY \times HW + HDX$$

where

DX is the X displacement value used in the calculation of DZ

DY is the Y displacement value used in the calculation of DZ

HH is the target halftone bitmap height

HW is the target halftone bitmap width

RL is the corresponding 48-bit specifier's run length value

The 30-bit DZ value of the 48-bit bitstring specifier is defined as the sum of horizontal and vertical displacements. The desired horizontal and vertical displacements, DX and DY, used in the original calculation of DZ are required to generate the parameters of the companion halftone specifier. The HDX, HDX, and HDA values are used by the PBC to modify the HXR, HYR, and HA halftone parameters in correspondence with the DZ displacement of the 48-bit specifier, and HDL is used to modify HXR and HA in correspondence with the RL run length. HDL, HDX, HDY, and HDA are all unsigned values (the HDX, HDY, and HDA parameters must be given as non-negative modulo values).

4.2.4 Scanline and Halftone Table Examples

Figure 19:
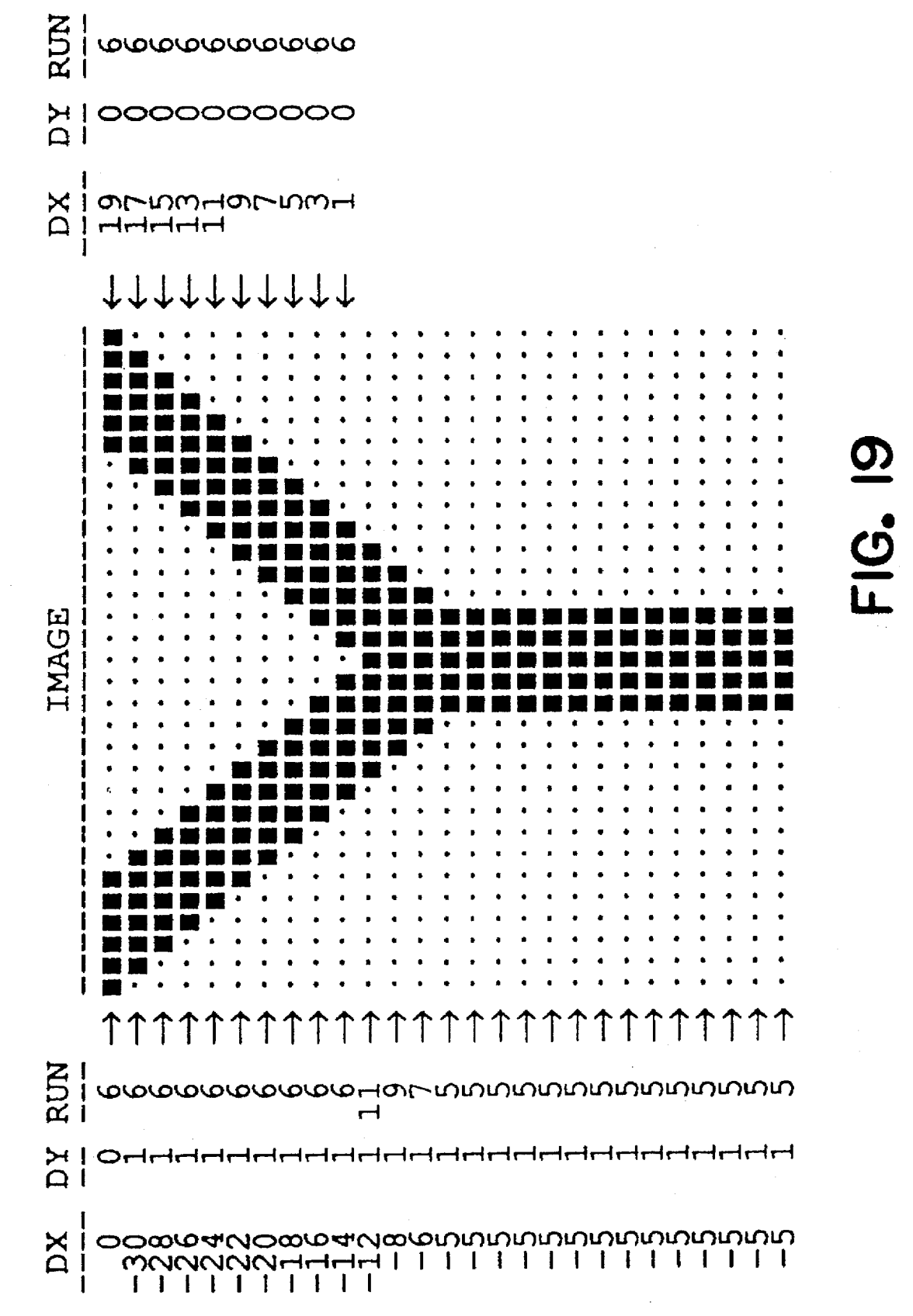

FIG. 19 illustrates a typical character represented as delta X, delta Y, and run lengths. Due to the small sizes of the delta values and run lengths, the 16-bit bitstring specifier can be used for the entire image. The figure also shows the compaction achieved from the bitstring specifiers. The image requires 27 words if stored as a bitmap and 19 words if stored in 16-bit bitstring specifiers.

FIGS. 20a, 20b, 20c and 20d provide an example scanline table with its companion halftone table, and the resulting image. Note that the companion halftone table contains only two specifiers, since the scanline table is mostly made of 16-bit specifiers, and that the halftone table is not terminated with 0x0000 null specifiers, while the scanline table is.

4.2.5 Illegal Usage Of Bitstring Specifiers

When executing scanline graphic orders to a banded bitmap, PBC performs boundary checking to detect a band fault before executing each bitstring specifier. It does not, however, check for a band fault while processing the run length of pixels. There are two usages of the bitstring specifiers during banding applications which can cause unwanted destruction of data. The destruction arises when the specifier causes processing to occur outside of the banded bitmap.

Figure 21:
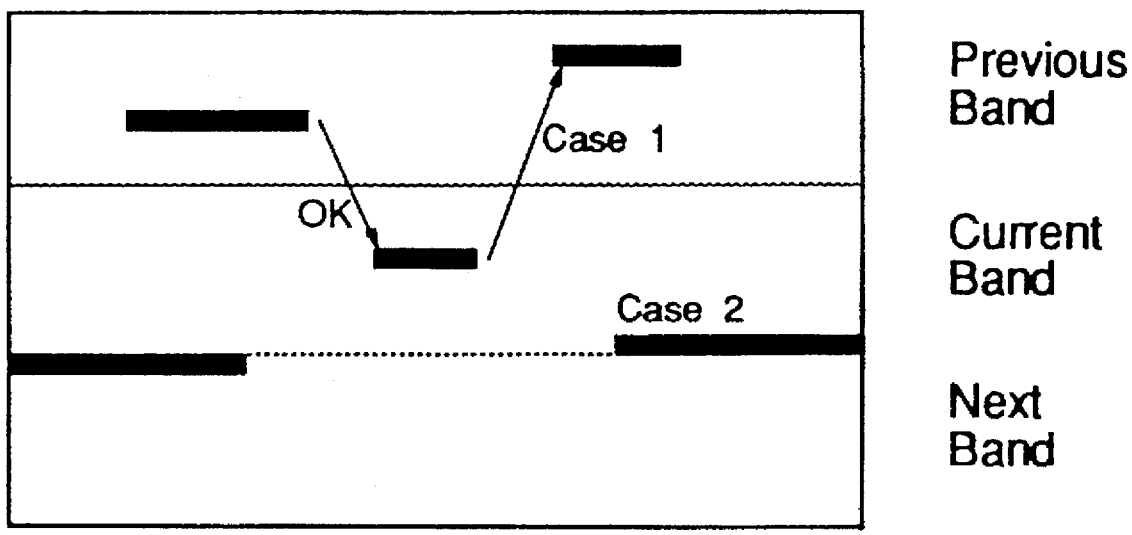
FIG. 21 shows illegal usage of bitstring specifiers.

The first case occurs when a bitstring specifier contains a signed offset which references a previous band (refer to FIG. 21). The PBC checks only the lower bound of the banded bitmap, so the violation is undetected. The PBC will process the bitstring specifier run at a memory location which is not contained within the target bitmap.

The second case occurs when a bitstring specifier contains a run length which wraps from one scanline to another and the new scanline is beyond the banded bitmap. The PBC does not check horizontal bounds and does not check vertical bounds while processing the bitstring specifier run.

GRAPHIC ORDER DEFINITIONS

This section presents each of the PBC's 25 graphic orders in alphabetical order. For each graphic order, a functional description, opcode, operand format, and definitions of its operands are given. In addition, at the end of this section, two summary reference tables (Tables 26 and 27) are presented.

5.1 GRAPHIC ORDER ADDRESSING CONVENTIONS

5.1.1 Granularity

The addressing conventions discussed in section 1.6 above also apply to graphic order address parameters. All address fields are equally 32 bits wide. Address parameters that reference bitmaps specify 32-bit bit addresses, while all other others require conventional 29-bit byte addresses.

In the description of graphic orders that follow, the operand lengths for addresses may be given as a pair of numbers, for example: (29 of 32). This indicates that the address, in this case a byte address, occupies the least significant 29 bits of the word operand (and that the PBC will force the three most significant bits to zero).

5.1.2 Alignment

Certain graphic orders specify address parameters that must be aligned to byte (8-bit) or short word (16-bit) boundaries. When a byte address is required to be aligned on as short word address, its least significant bit should be zero, since the PBC will force the bit to be zero internally. Some bit addresses are specified to be byte aligned; this means that the least three significant bits should be zero, since inside the PBC they will be forced zero.

There are four combinations of address granularity and alignment used by PBC graphic orders. In the descriptions of graphic orders and definitions of their parameters, the following four phrases will be used exclusively:

1. Bit address: A 32-bit bit address which can point to any bit location in memory; used to specify bitmap locations and bitmap pixels.

2. Bit address, byte aligned: A 32-bit bit address with its least three significant bits set to zero; points to a bit location in memory that is the first bit in a byte. Used to specify bitmap locations.

3. Byte address: A 29-bit byte address which can point to any byte location in memory; used for referencing graphic order instructions.

4. Byte address, short word aligned: A 29-bit byte address with its least significant bit set to zero; points to a byte in memory that is the first byte in a short word. Used to address scanline tables and halftone companion tables.

5.1.3 Physical Address vs. Logical Address

For graphic orders that render images to a frame or unbanded bitmaps, address parameters are interpreted as physical addresses, and the PBC uses them directly to access memory. In the case of banded bitmaps, where only a portion of the physical page's image is present in memory, address parameters are interpreted as logical addresses.

Logical addresses must be translated by the PBC to physical space before execution of the graphic order begins. Translation information is provided to the PBC at the same time the banded bitmap dimensions are defined (via the SET_BBMAP order). Physical addresses are translated back to logical addresses when band faults occur and require parameters to be written back to the graphic order.

5.1.4 Duplex Frame Addresses

The PBC fully supports banding applications on duplex printers by rendering backside images in a bottom to top fashion. Only banded bitmap operations are affected (unbanded bitmaps are always rendered top to bottom by the Graphics Execution Unit; the Print Engine Video Controller then ships the entire page image in bottom to top order).

Figure 22B:
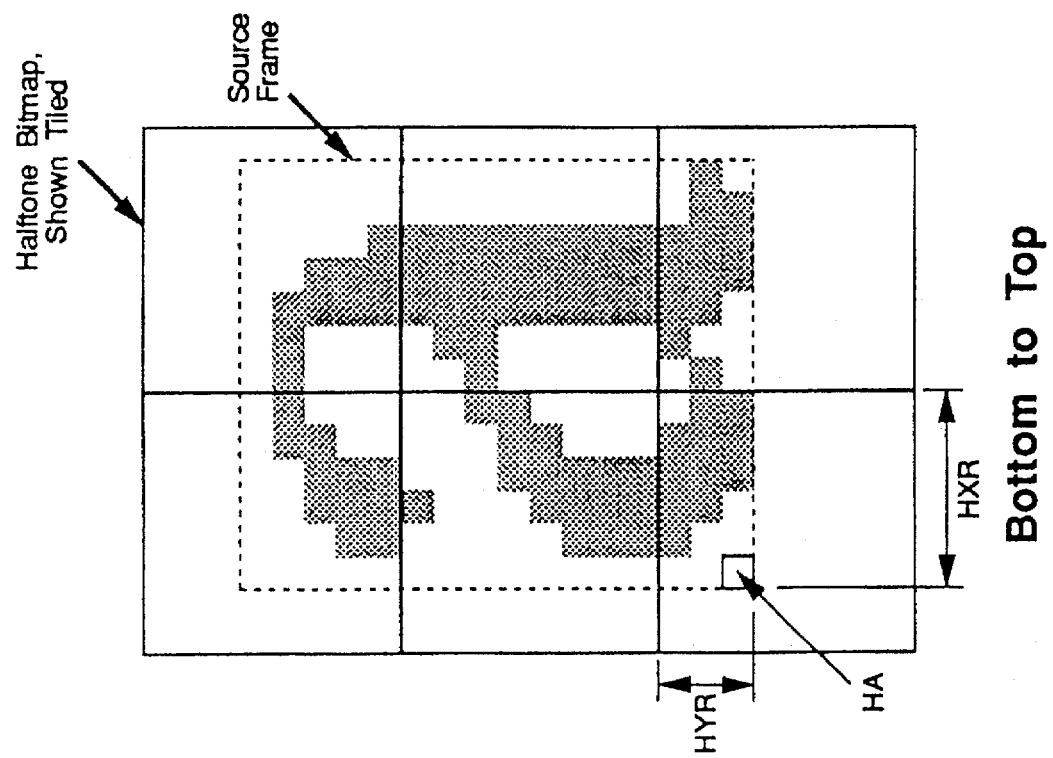
FIGS. 22A and 22B show halftone specification for Bit-BLT operations.
Figure 22A:
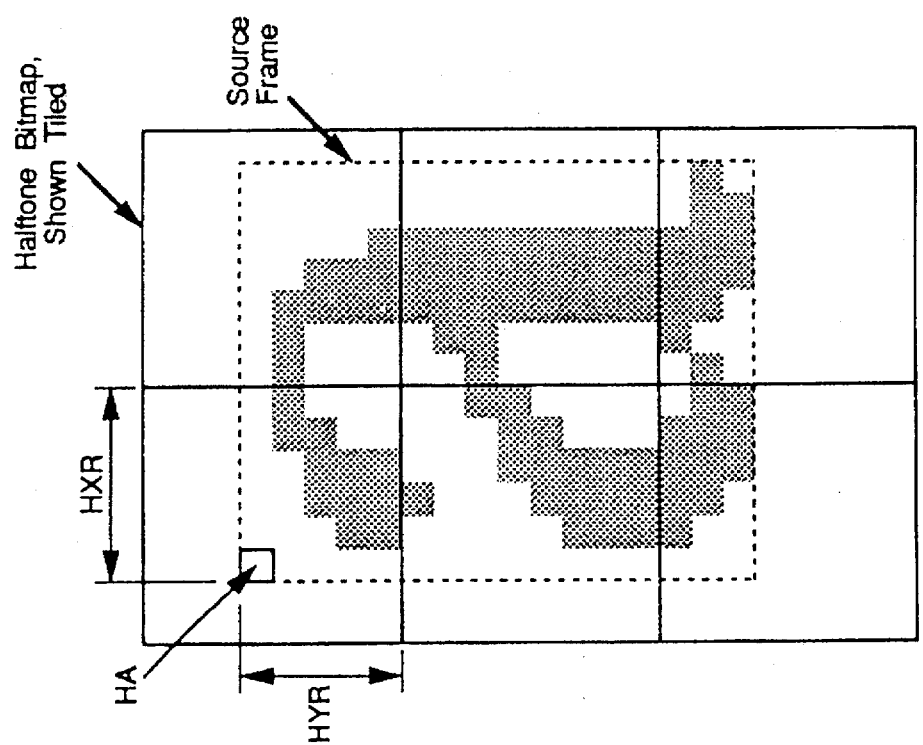

When bitBLTing to a banded bitmap for the backside of a page, the definition of certain graphic order parameters change. Namely, the frame address parameters DA, SA, and HA must be given pointing to the bottom left corners of their respective frames (instead of the upper left) and the HYR halftone parameter must give the number of scanlines remaining to the top of the bitmap (instead of the bottom). FIGS. 22a and 22b use the halftone bitmap parameters to illustrate this requirement.

The parameters of scanline operations are also affected, since scanline tables are executed in reverse order for backside rendering. DA, which normally gives the starting position for the scanline table, must instead give the address of the pixel just beyond the last run in the scanline table. In addition, if a halftone is involved, HA, HXR, and HYR must also be given with respect to the same pixel at the end of the image, as shown in FIGS. 23a and 23b.

5.2 BAND NUMBERS

Each of the PBC graphic orders which affect the bands of the image contain a band number. The band number is used by the PBC to determine when to execute the order. Band numbers increase in value from the top band to the bottom band of the image.

The band number for a graphic order must be determined by software. It must be the value of the band where the first scanline of a graphic order resides when printing the front side of a page, or the value of the band where the last scanline of a graphic order resides when printing the back side of a page (duplex printing).

The PBC automatically adjusts the band number when the graphic order spans multiple bands. It increments the band number when printing the front side of a page and decrements the band number when printing the back side of a page.

5.3 GRAPHIC ORDERS

The following pages describe the PBC graphic order set. The graphic orders are presented in alphabetical order.

TABLE 4

| BLT2BB_D |  |
| --- | --- |
| Destination Only BitBLT to Banded Bitmap | |
| 0 × 30 | BLT2BB_D opcode (8 bits) |
| * BAND | Band number when graphic order is executed |
| * DA | Destination logical bit address (29 bits) |
| FW | Frame width in bits (16 bits) |
| * FH | Frame height in scanlines (16 bits) |

(*) These operands are updated by the PBC when the frame crosses a band boundary.

The BLT2BB_D graphic order causes the PBC to modify a frame of a destination banded bitmap. The destination pixels are manipulated as specified by the current BOOL_D boolean code. The destination bitmap parameters must have been previously defined by the SET_BBMAP graphic order.

Figure 24:
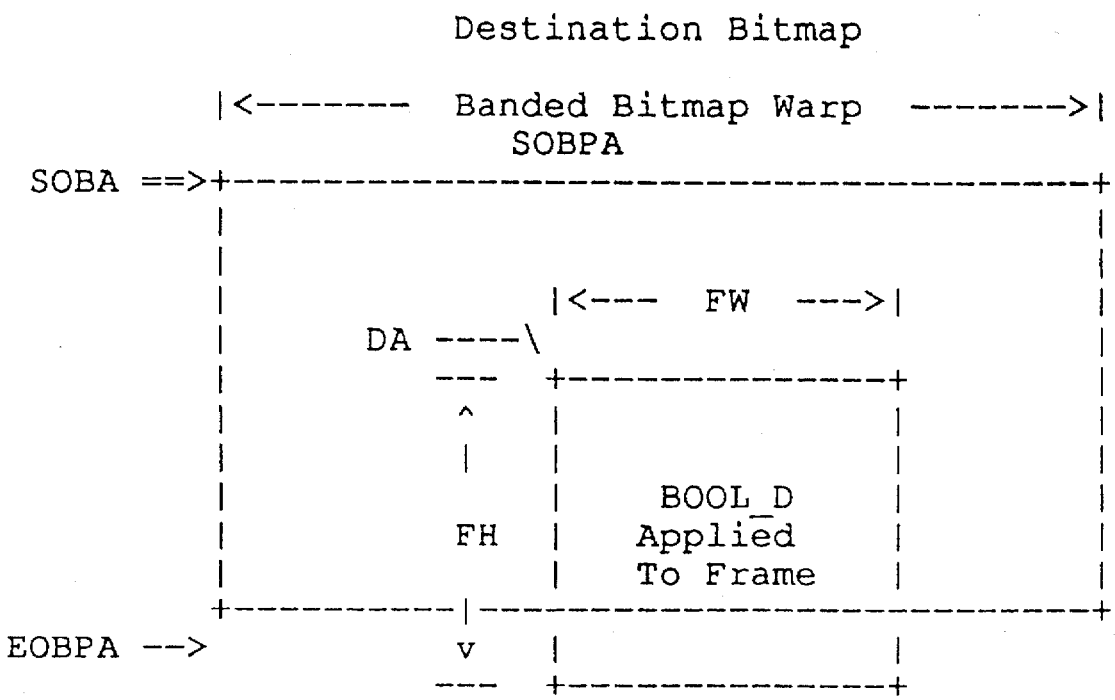
FIG. 24 shows destination BLT to Banded Bitmap, front side of a page.
Figure 25:
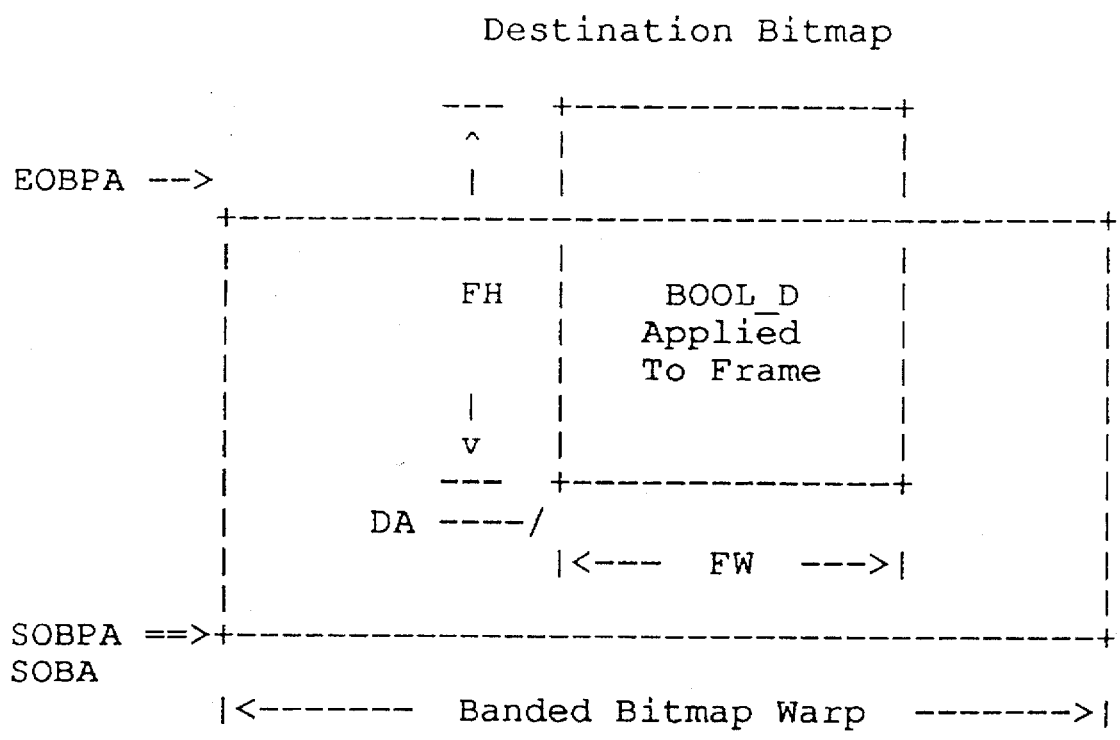
FIG. 25 shows destination BLT to Banded Bitmap, back side of a page.

As shown by FIGS. 24 and 25, the destination physical bit address (DA) must point to the upper left corner of the frame when printing the front side of a page, or to the lower left corner of the frame when printing the back side of a page.

When a band fault is detected, the PBC rewrites the graphic order to update some of its parameters. The BAND number is incremented (or decremented, for backside printing). DA is repositioned to the starting pixel of each respective frame to be processed in the next band. Last, FH and HYR are written back with the number of remaining scanlines in their respective frames to be transferred.

TABLE 5

| BLT2BB_SD |  |
| --- | --- |
| Source/Destination BitBLT to Banded Bitmap | |
| 0 × 32 | BLT2BB_SD opcode (8 bits) |
| * BAND | Band number when graphic order is executed |
| * DA | Destination logical bit address (32 bits) |
| FW | Frame width in bits (16 bits) |
| * FH | Frame height in scanlines (16 bits) |
| * SA | Source physical bit address (32 bits) |

(*) These operands are updated by the PBC when the frame crosses a band boundary.

The BLT2BB_SD graphic order causes the PBC to bitBLT a source bitmap frame to a destination banded bitmap. The source and destination pixels are combined as specified by the current BOOL_SD boolean code.

The destination bitmap parameters must have been previously defined by the SET_BBMAP graphic order. The source frame warp is assumed to be the FW frame width specified in the BLT2BB_SD graphic order unless a non-zero source bitmap warp was previously defined by the SET_SBMAP graphic order, in which case the source bitmap warp is used.

Figure 26A:
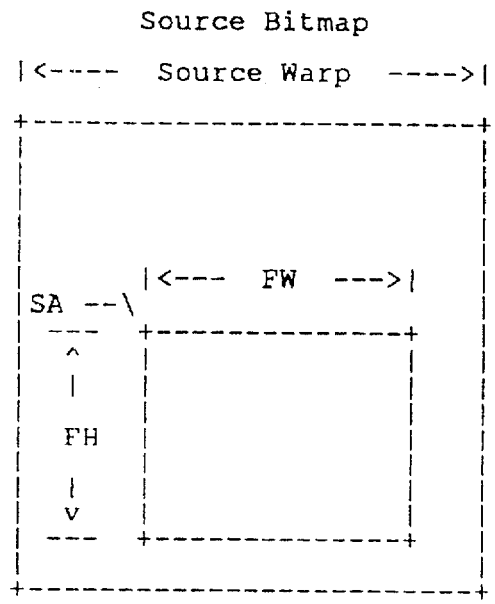
FIGS. 26A and 26B show Source/Destination BLT to banded bitmap, front side of a page.
Figure 26B:
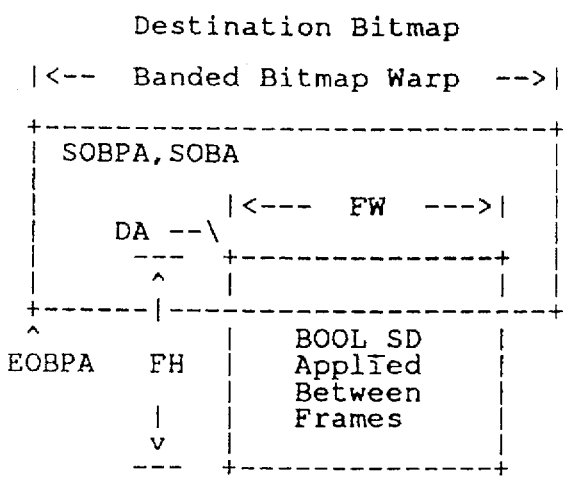
Figure 27A:
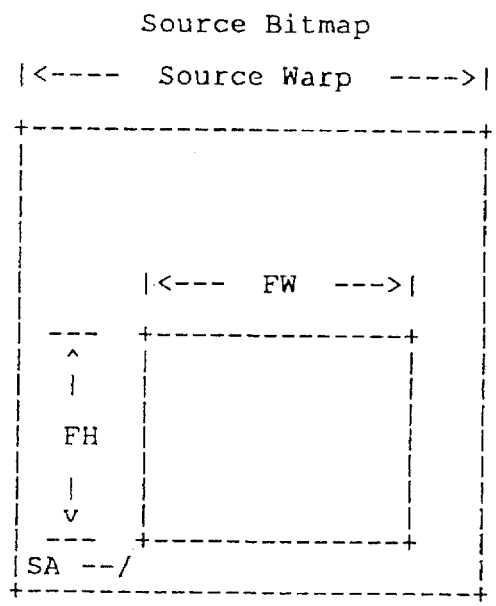
FIGS. 27A and 27B show Source/Destination BLT to Banded Bitmap, back side of a page.
Figure 27B:
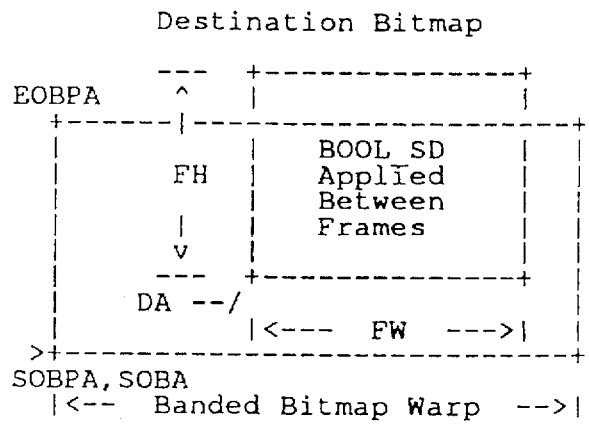

The destination and source physical bit addresses (DA and SA) must point to the upper left corners of their respective frames when printing the front side of a page (as shown in FIGS. 26a and 26b), or to the lower left corners of their respective frames when printing the back side of a page (as shown in FIGS. 27a and 27b).

When a band fault is detected, the PBC rewrites the graphic order to update some of its parameters. The BAND number is incremented (or decremented, for backside printing). DA and SA are repositioned to the starting pixel of each respective frame to be processed in the next band. Last, FH is written back with the number of remaining scanlines in the bitBLT frame to be transferred.

TABLE 6

| BLTBB_SHD |  |
| --- | --- |
| Source/Halftone/Destination BitBLT to Banded Bitmap | |
| 0 × 33 | BLT2BB_SHD opcode (8 bits) |
| * BAND | Band number when graphic order is executed |
| * DA | Destination logical bit address (32 bits) |
| FW | Frame width in bits (16 bits) |
| * FH | Frame height in scanlines (16 bits) |
| * SA | Source physical bit address (32 bits) |
| HXR | Halftone X remainder (16 bits) |
| * HYR | Halftone Y remainder (16 bits) |
| * HA | Halftone physical bit address of the starting pixel (32 bits) |

(*) These operands are updated by the PBC when the frame crosses a band boundary.

The BLT2BB_SHD graphic order causes the PBC to bitBLT a source bitmap frame to a destination banded bitmap, and apply a halftone bitmap in the process. The source, halftone, and destination pixels are combined as specified by the current BOOL_SHD boolean code.

The destination bitmap parameters must have been previously defined by the SET_BBMAP graphic order. The source frame warp is assumed to be the FW frame width specified in the BLT2BB_SHD graphic order unless a non-zero source bitmap warp was previously defined by the SET_SBMAP graphic order, in which case the source bitmap warp is used.

The halftone bitmap dimensions must have been previously defined by the SET_HTBMAP graphic order. As discussed above, during the processing of halftones, wrapping occurs at the edges of the bitmap; this results in horizontal and vertical replication, or "tiling", of the bitmap to cover the entire bitBLT frame area.

Figure 28A:
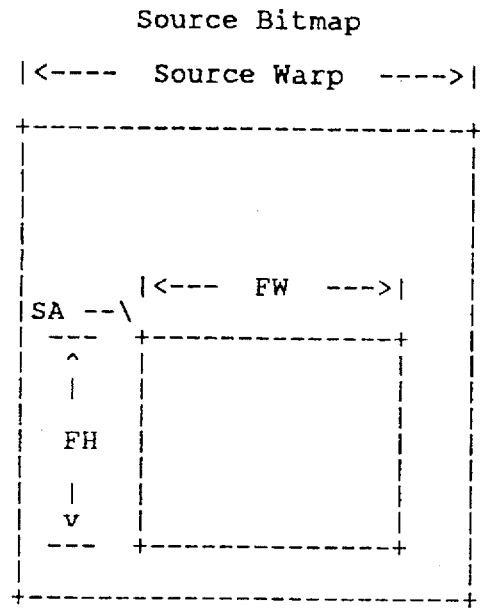
FIGS. 28A, 28B and 28C show Source/Halftone/Destination BLT to banded bitmap, front side of a page.
Figure 28B:
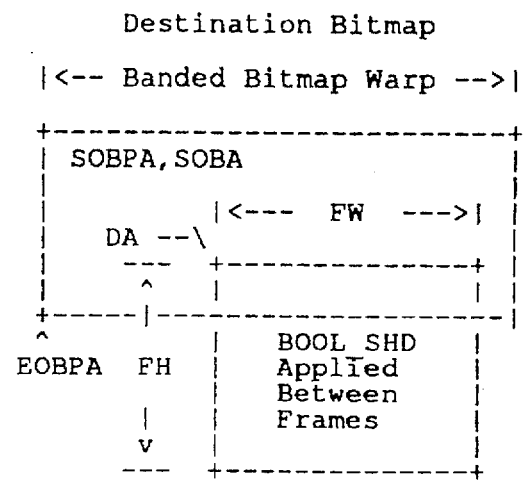
Figure 28C:
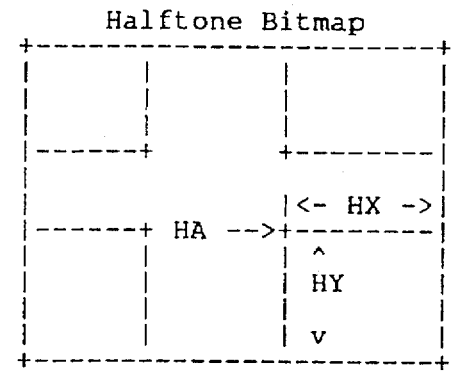

Halftone tiled patterns are typically anchored to the page. Thus, a bitBLT may need to take on the halftone pattern starting at various points in the halftone bitmap depending on where it is being positioned on the page. The halftone parameters HXR, HYR, and HA define the precise halftone pixel that corresponds to the upper left (or lower left, for backside bitBLTs) corners of the source and destination frames. HXR specifies the number of pixels remaining to the left edge of the bitmap, and HYR defines the number of pixels remaining to the bottom edge (or top edge, for backside bitBLTs). For example, for the front side of a page, if the starting pixel in the halftone bitmap is determined to be at the upper left, HXR must be set to HW, and HYR to HH (as shown in FIGS. 28a to 28c); if instead the backside of the page is being rendered, HXR must still be set to HW, but HYR must be set to one (as shown in FIGS. 29a to 29c).

The destination, source, and halftone physical bit addresses (DA, SA, and HA) must point to the upper left corners of their respective frames when printing the front side of a page, or to the lower left corners of their respective frames when printing the back side of a page.

When a band fault is detected, the PBC rewrites the graphic order to update some of its parameters. The BAND number is incremented (or decremented, for backside printing). DA, SA, and HA are repositioned to the starting pixel of each respective frame to be processed in the next band. Last, FH and HYR are written back with the number of remaining scanlines in their respective frames to be transferred.

TABLE 7

BLT2F_D
Destination Only BitBLT to Frame

| | |
|---|---|
| 0 × 10 | BLT2F_D opcode (8 bits) |
| DA | Destination physical bit address (32 bits) |
| FW | Frame width in bits (16 bits) |
| FH | Frame height in scanlines (16 bits) |

The BLT2F_D graphic order causes the PBC to modify a frame of a destination bitmap. The destination pixels are manipulated as specified by the current BOOL_D boolean code. As illustrated in FIG. 30, the destination bitmap warp is assumed to be the FW frame width specified by the BLT2F_D graphic order itself.

The destination physical bit addresses (DA) must point to the upper left corner of the frame when printing the front side of a page, or to the lower left corner of the frame when printing the back side of a page.

TABLE 8

BLT2F_SD
Source/Destination BitBLT to Frame

| | |
|---|---|
| 0 × 12 | BLT2F_SD opcode (8 bits) |
| DA | Destination physical bit address (32 bits) |
| FW | Frame width in bits (16 bits) |
| FH | Frame height in scanlines (16 bits) |
| SA | Source physical bit address (32 bits) |

The BLT2F_SD graphic order causes the PBC to bitBLT a source bitmap frame to a destination frame bitmap. The source and destination pixels are combined as specified by the current BOOL_SD boolean code.

The destination bitmap warp is assumed to be the FW frame width specified by the BLT2F_SD graphic order itself. FW is also assumed to be the source frame warp, unless a non-zero source bitmap warp was previously defined by the SET_SBMAP graphic order, in which case the non-zero source bitmap warp is used.

Figure 31B:
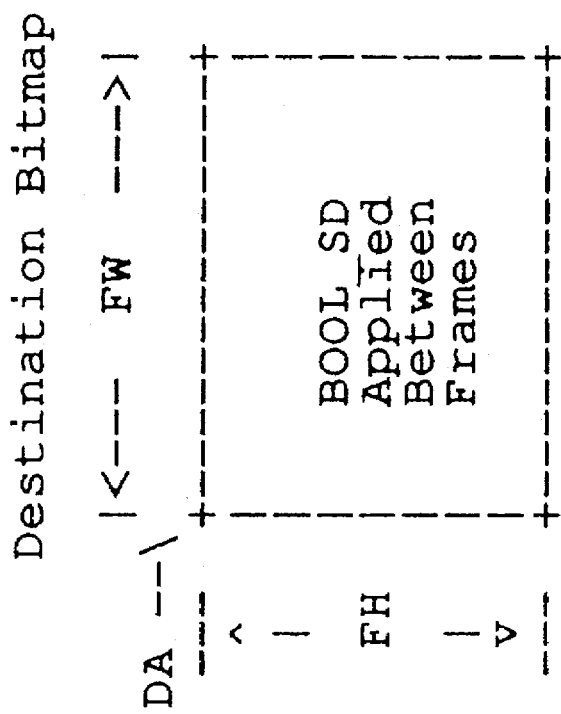
FIGS. 31A–31B show Source/Destination BLT to frame.
Figure 31A:
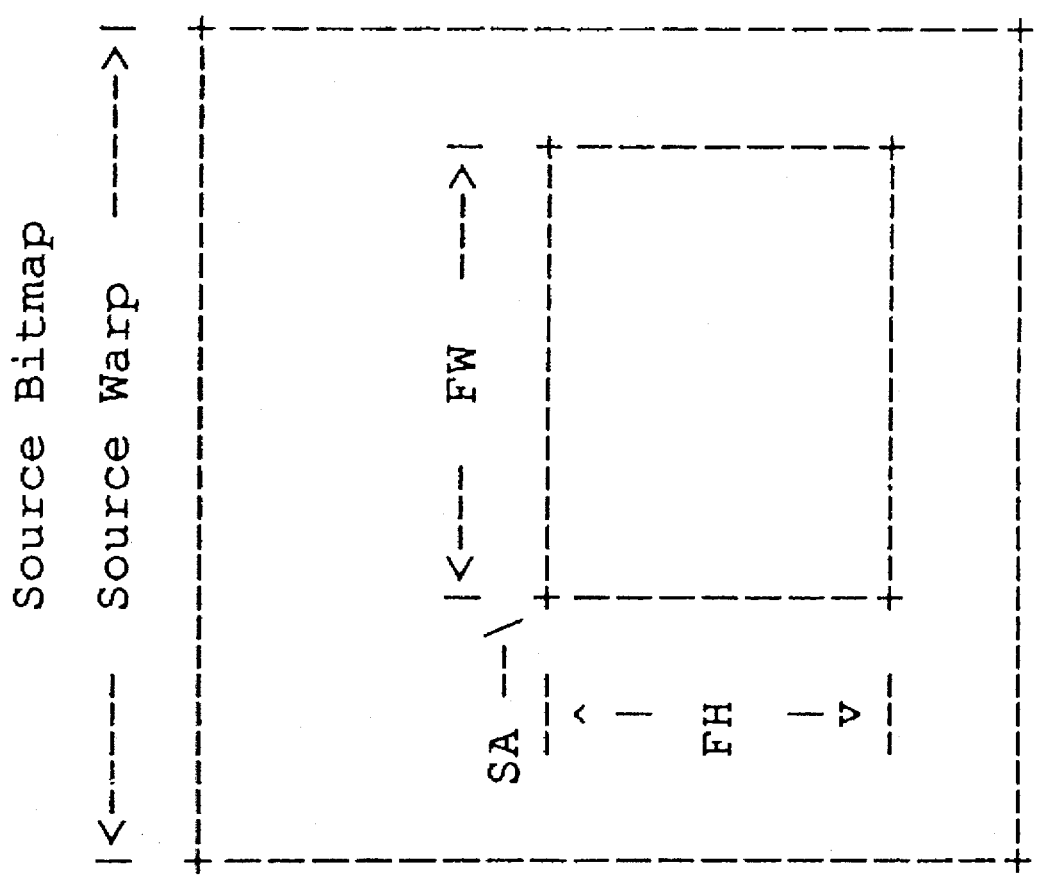

As illustrated in FIGS. 31A–31B, the destination and source physical bit addresses (DA and SA) must point to the upper left corners of their respective frames when printing the front side of a page, or to the lower left corners of their respective frames when printing the back side of a page.

TABLE 9

BLT2F_SHD
Source/Halftone/Destination BitBLT to Frame

| | |
|---|---|
| 0 × 13 | BLT2_SHD opcode (8 bits) |
| DA | Destination physical bit address (32 bits) |
| FW | Frame width in bits (46 bits) |
| FH | Frame height in scanlines (16 bits) |
| SA | Source physical bit address (32 bits) |
| HXR | Halftone X remainder (16 bits) |
| HYR | Halftone Y remainder (16 bits) |
| HA | Halftone physical bit address of the starting pixel (32 bits) |

The BLT2F_SHD graphic order causes the PBC to bitBLT a source bitmap frame to a destination banded bitmap, and apply a halftone bitmap in the process. The source, halftone, and destination pixels are combined as specified by the current BOOL_SHD boolean code.

The destination bitmap warp is assumed to be the FW frame width specified by the BLT2F_SHD graphic order itself. FW is also assumed to be the source frame warp, unless a non-zero source bitmap warp was previously defined by the SET_SBMAP graphic order, in which case the non-zero source bitmap warp is used.

The halftone bitmap dimensions must have been previously defined by the SET_HTBMAP graphic order. As discussed above, during the processing of halftones, wrapping occurs at the edges of the bitmap; this results in horizontal and vertical replication, or "tiling", of the bitmap to cover the entire bitBLT frame area.

Figure 32A:
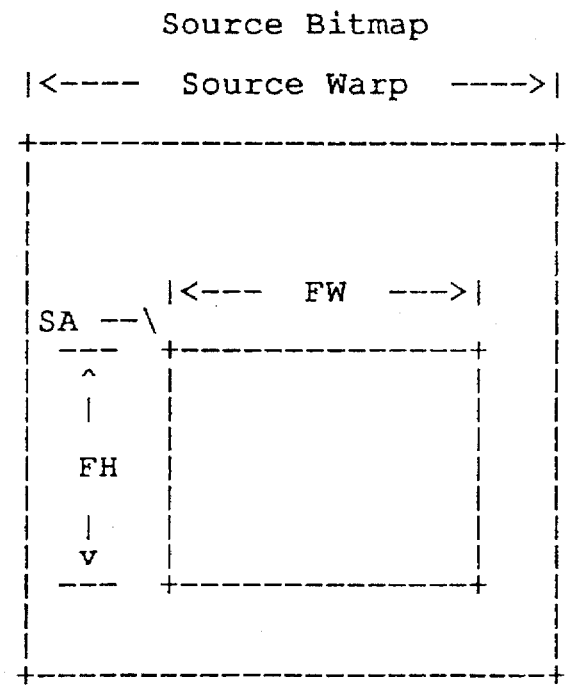
FIGS. 32A, 32B and 32C show Source/Halftone/Destination BLT to frame.
Figure 32B:
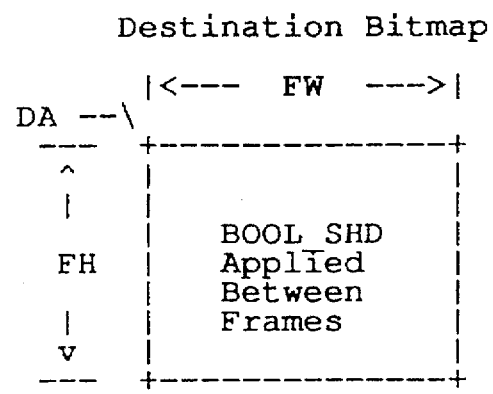
Figure 32C:
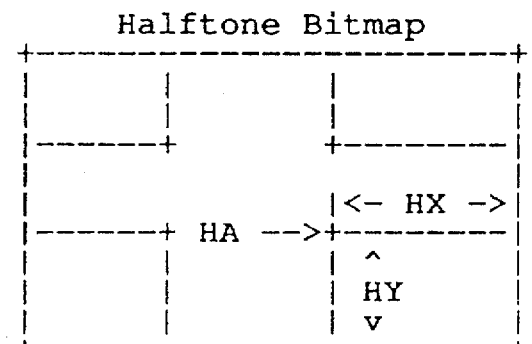

Halftone tiled patterns are typically anchored to the page. Thus, a bitBLT may need to take on the halftone pattern starting at various points in the halftone bitmap depending on where it is being positioned on the page. The halftone parameters HXR, HYR, and HA define the precise halftone pixel that corresponds to the upper left (or lower left, for backside bitBLTs) corners of the source and destination frames. HXR specifies the number of pixels remaining to the left edge of the bitmap, and HYR defines the number of pixels remaining to the bottom edge (or top edge, for backside bitBLTs). For example, for the front side of a page, if the starting pixel in the halftone bitmap is determined to be at the upper left, HXR must be set to HW, and HYR to HH; if instead the backside of the page is being rendered, HXR must still be set to HW, but HYR must be set to one (please refer to FIGS. 32a to 32c).

The destination, source, and halftone physical bit addresses (DA, SA, and HA) must point to the upper left corners of their respective frames when printing the front side of a page, or to the lower left corners of their respective frames when printing the back side of a page.

TABLE 10

BLT2UB_D
Destination Only BitBLT to Unbanded Bitmap

| | |
|---|---|
| 0 × 20 | BLT2UB_D opcode (8 bits) |
| DA | Destination physical bit address (32 bits) |
| FW | Frame width in bits (16 bits) |
| FH | Frame height in scanlines (16 bits) |

The BLT2UB_D graphic order causes the PBC to modify a frame of a destination unbanded bitmap. The destination pixels are manipulated as specified by the current BOOL_D boolean code. The destination bitmap warp must have been previously defined by the SET_UBMAP graphic order.

The destination physical bit addresses (DA) must point to the upper left corner of the frame when printing the front side of a page, or to the lower left corner of the frame when printing the back side of a page (please refer to FIG. 33).

TABLE 11

BLT2UB_SD
Source/Destination BitBLT to Unbanded Bitmap

| | |
|---|---|
| 0 × 22 | BLT2UB_SD opcode (8 bits) |
| DA | Destination physical bit address (32 bits) |
| FW | Frame width in bits (16 bits) |
| FH | Frame height in scanlines (16 bits) |
| SA | Source physical bit address (32 bits) |

The BLT2UB_SD graphic order causes the PBC to bitBLT a source bitmap frame to a destination unbanded bitmap. The source and destination pixels are combined as specified by the current BOOL_SD boolean code.

The destination bitmap warp must have been previously defined by the SET_UBMAP graphic order. As illustrated in FIGS. 34a and 34b, the source frame warp is assumed to be the FW frame width specified by the BLT2UB_SD graphic order unless a non-zero source bitmap warp was previously defined by the SET_SBMAP graphic order, in which case the source bitmap warp is used.

The destination and source physical bit addresses (DA and SA) must point to the upper left corners of their respective frames when printing the front side of a page, or to the lower left corners of their respective frames when printing the back side of a page.

TABLE 12

BLT2UP_SHD
Source/Halftone/Destination BitBLT to Unbanded Bitmap

| | |
|---|---|
| 0 × 23 | BLT2UB_SHD opcode (8 bits) |
| DA | Destination physical bit address (32 bits) |
| FW | Frame width in bits (16 bits) |
| FH | Frame height in scanlines (16 bits) |
| SA | Source physical bit address (32 bits) |
| HXR | Halftone X remainder (16 bits) |
| HYR | Halftone Y remainder (16 bits) |
| HA | Halftone physical bit address of the starting pixel (32 bits) |

The BLT2UB_SHD graphic order causes the PBC to bitBLT a source bitmap frame to a destination banded bitmap, and apply a halftone bitmap in the process. The source, halftone, and destination pixels are combined as specified by the current BOOL_SHD boolean code.

Figure 35A:
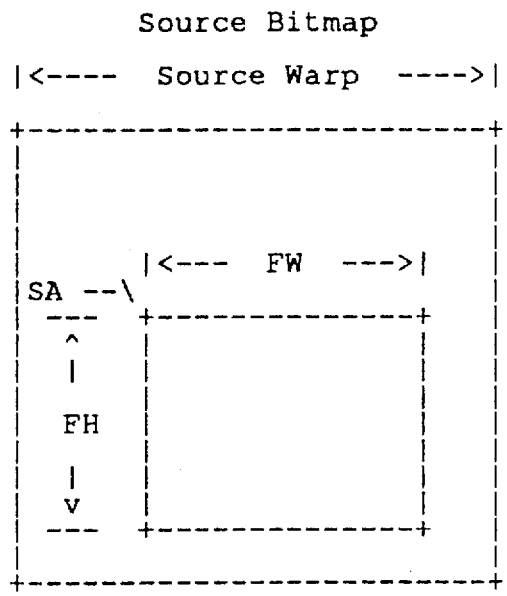
FIGS. 35A, 35B and 35C show Source/Halftone/Destination BLT to unbanded Bitmap.
Figure 35B:
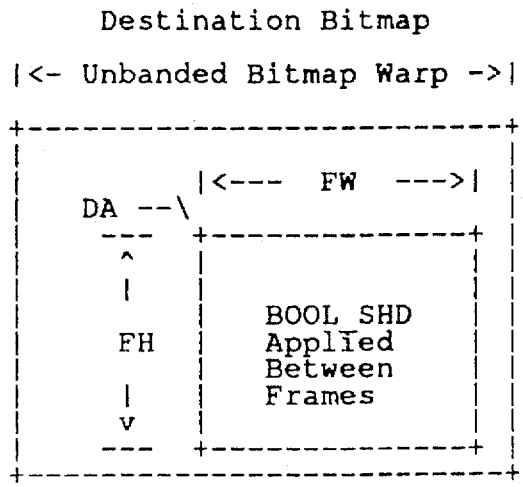
Figure 35C:
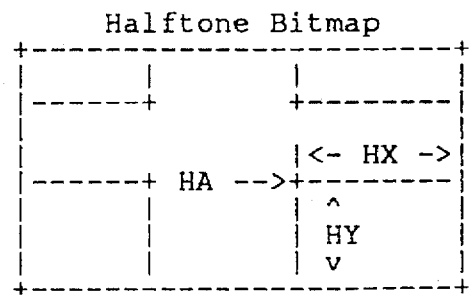

The destination bitmap warp must have been previously defined by the SET_UBMAP graphic order. As shown in FIGS. 35a to 35c, the source frame warp is assumed to be the FW frame width specified by the BLT2UB_SHD graphic order unless a non-zero source bitmap warp was previously defined by the SET_SBMAP graphic order, in which case the source bitmap warp is used.

The halftone bitmap dimensions must have been previously defined by the SET_HTBMAP graphic order. As discussed above, during the processing of halftones, wrapping occurs at the edges of the bitmap; this results in horizontal and vertical replication, or "tiling", of the bitmap to cover the entire bitBLT frame area.

Halftone tiled patterns are typically anchored to the page. Thus, a bitBLT may need to take on the halftone pattern starting at various points in the halftone bitmap depending on where it is being positioned on the page. The halftone parameters HXR, HYR, and HA define the precise halftone pixel that corresponds to the upper left (or lower left, for backside bitBLTs) corners of the source and destination frames. HXR specifies the number of pixels remaining to the left edge of the bitmap, and HYR defines the number of pixels remaining to the bottom edge (or top edge, for backside bitBLTs). For example, for the front side of a page, if the starting pixel in the halftone bitmap is determined to be at the upper left, HXR must be set to HW, and HYR to HH; if instead the backside of the page is being rendered, HXR must still be set to HW, but HYR must be set to one.

The destination, source, and halftone physical bit addresses (DA, SA, and HA) must point to the upper left corners of their respective frames when printing the front side of a page, or to the lower left corners of their respective frames when printing the back side of a page.

TABLE 13

JUMP
JUMP to Graphic Order

| | |
|---|---|
| 0×01 | JUMP opcode (8 bits) |
| GOA | Graphic order physical byte address (29 of 32 bits) |

The JUMP graphic order indicates a new byte address where the display list is continued. The PBC updates its internal display list pointer with the address following the graphic order and resumes execution at this address when the JUMP graphic order is encountered.

TABLE 14

SET_BBMAP
Set Banded Bitmap Parameters

| | |
|---|---|
| 0×08 | SET_BBMAP opcode (8 bits) |
| CUR_BAND | Current band number (8 bits) |
| DUPLEX | Render direction for duplex printing (1 of 8 bits) |
| DWB | Destination banded bitmap warp in bits (46 bits) |
| SOBPA | Start of band physical bit address, byte aligned (32 bits) |
| SOBA | Start of band logical bit address (32 bits) |
| EOBPA | End of band physical bit address (32 bits) |

The SET_BBMAP graphic order specifies the structure of a banded bitmap. The current band number, render direction, warp, and physical base address of the bitmap are given, along with the logical address of the first bit inside, and outside, the bitmap. These parameters are used in all subsequent graphic orders which operate on a banded bitmap.

Note that the height of the banded bitmap is implied in the last logical address, in that it is calculated as the logical address of the first bit inside of the bitmap added to the product of the warp of the bitmap times the height of the bitmap.

The SET_BBMAP graphic order specifies a current band number; the current band number is used to compare against the band numbers found in subsequent bitBLT and scanline graphic orders. The result of each band number comparison determines whether a graphic order is executed during the current pass of the display list. Remember that a "banded" display list is executed several times, one pass for each band of the entire page.

The DUPLEX byte contains a one-bit flag to indicate render direction. When the least significant bit of the DUPLEX byte is set, all subsequent graphic or scanline orders that operate on banded bitmaps are to be rendered in a bottom to top fashion. In conjunction, a bottom to top render direction causes the PBC to assume that all starting pixel addresses in subsequent banding graphic and scanline orders point to the bottom or end of their respective operands instead of the top. (Orders that operate on frames or unbanded bitmaps are unaffected by the render direction, and are always rendered top to bottom.) By rendering in a reverse direction, the bands of a page can be created in opposite order to print the backside of duplex pages.

Additionally, each bitBLT or scanline operation contains a logical address which specifies where within the banded bitmap the upper left corner of the frame should be placed. This is converted to a physical address by the PBC by the following calculation:

frame physical address=SOBPA+(frame logical address−SOBA)

Figure 36:
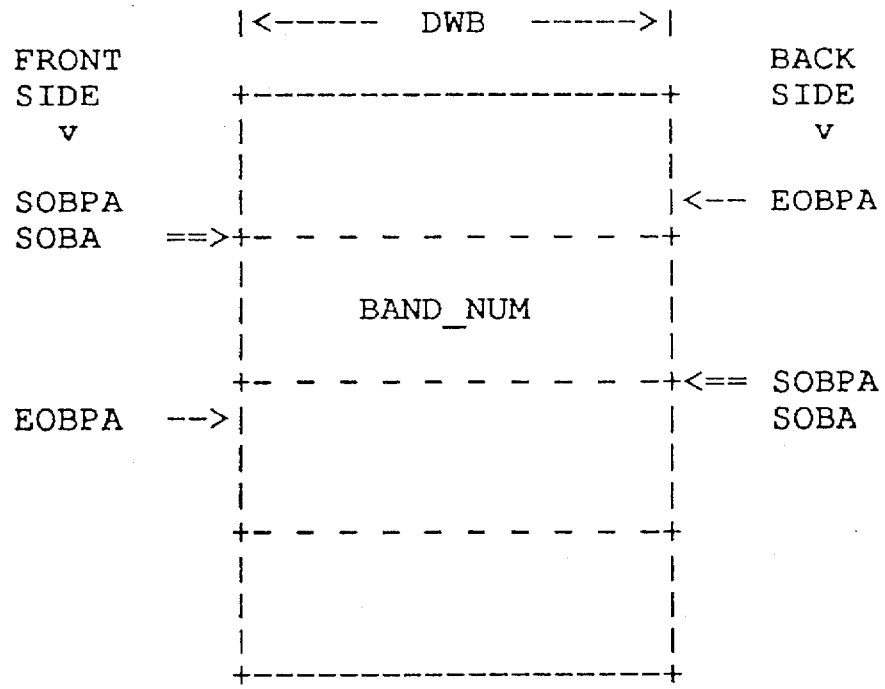
FIG. 36 shows Banded Bitmap Parameters.

As illustrated in FIG. 36, the three address parameters SOBPA, SOBA, and EOBPA vary depending on the side of the page (front or backside) to be generated. The parameters are referenced from the top of the band when printing the front side of a page, and from the bottom of the band when printing the back side of a page.

Finally, as a banded bitBLT or scanline operation proceeds, its frame logical address is compared with the logical address of the first bit outside of the banded bitmap. The frame logical address is modified by the banded bitmap warp after each scanline is completed. When the frame logical address becomes greater than or equal to the logical address of the first bit outside of the banded bitmap, a band fault occurs. The operation is prematurely terminated and the appropriate parameters are saved for later execution on the next band.

TABLE 15

| SET_BOOL_D/SET_BOOL_HD/SET_BOOL_SD/ SET_BOOL_SHD Set Boolean Code | |
|---|---|
| 0x0C | SET_BOOL_D opcode (8 bits) |
| BOOL_D | Destination-only boolean mask (8 bits) |
| 0x0D | SET_BOOL_HD opcode (8 bits) |
| BOOL_HD | Halftone/destination boolean mask (8 bits) |
| 0x0E | SET_BOOL_SD opcode (8 bits) |
| BOOL_SD | Source/destination boolean mask (8 bits) |
| 0x0F | SET_BOOL_SHD opcode (8 bits) |
| BOOL_SHD | Source/destination boolean mask (8 bits) |

The valid one and two operand boolean operations are listed in sections 3.9.1 and 3.9.2. A generalized algorithm for generating the mask values is given in section 3.9.4, Determining Boolean Code.

The SET_BOOL_D graphic order specifies the boolean mask to be used by all one operand graphic orders. The one operand graphic orders specify only the destination bitmap. Only the low two bits of the boolean mask are used by the PBC.

The SET_BOOL_HD graphic order specifies the boolean mask to be used by all two operand graphic orders which specify a halftone bitmap as one of their operands. Only the low two bits of each nibble of the boolean mask are used by the PBC (bits 5,4,1,0).

The SET_BOOL_SD graphic order specifies the boolean mask to be used by all two operand graphic orders which specify a source bitmap as one of their operands. Only the low four bits of the boolean mask are used by the PBC.

The SET_BOOL_SHD graphic order specifies the boolean mask to be used by all three operand graphic orders. Three operand graphic orders specify both a source and halftone bitmap as well as a destination bitmap as operands. All eight bits of the boolean mask are used by the PBC.

TABLE 16

| SET_HTBMAP Set Halftone Bitmap Parameters | |
|---|---|
| 0x0B | SET_HTBMAP opcode (8 bits) |
| HZ | Halftone bitmap total size in bits (32 bits) |
| HW | Halftone bitmap width in bits (16 bits) |
| HH | Halftone bitmap height in scanlines (16 bits) |

The SET_HTBMAP graphic order specifies the structure of a halftone bitmap. The total size, width, and height of the bitmap are given. These parameters are used in all subsequent graphic orders that operate with halftones. The parameters specified by the SET_HTBMAP are dimensional only; no physical base address is given in the parameters. Instead, each subsequent graphic order operating with the halftone defines its own physical starting address in the bitmap, along with addition positional parameters.

Figure 37A:
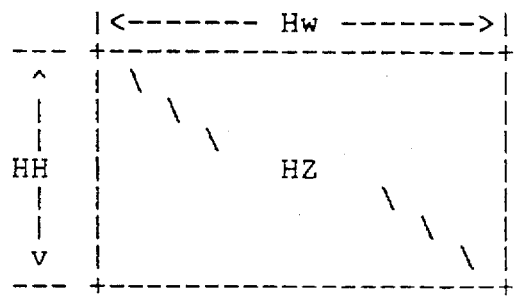
FIGS. 37A and 37B show Halftone Bitmap Parameters.
Figure 37B:
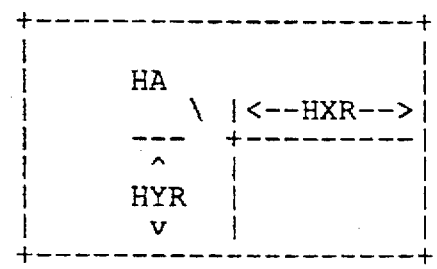

The SET_HTBMAP graphic order specifies the height HH, width HW, and total size in bits HZ of the halftone bitmap, as shown in FIG. 37a. These parameters are used in conjunction with additional parameters specified in individual graphic orders that operate with the halftone. FIG. 37b shows the additional parameters: HA, HXR, and HYR. Together, all six parameters allow the PBC to perform horizontal and vertical replication of the bitmap image during bitBLT and scanline operations. In effect, the halftone bitmap image is "tiled" across and down the transfer frames to cover the given framed area.

Note that the halftone bitmap width can be any value from 1 to 65,535 bits. While the PBC correctly handles widths less than 32 bits, it is strongly recommended that all halftone bitmaps be a minimum of 32 bits in order to minimize the cost of replicating small halftone patterns across large objects. (Halftone bitmaps do not need to be replicated in the Y direction.) Also be aware that 32- and 64-bit wide word-aligned halftones achieve optimum performance, since the PBC can cache these size patterns internally and minimize memory accesses.

TABLE 17

| SET_SBMAP Set Source Bitmap Parameters | |
|---|---|
| 0x0A | SET_SBMAP opcode (8 bits) |
| SW | Source bitmap warp in bits (16 bits) |

The SET_SBMAP graphic order specifies the structure of a source bitmap. The warp of the bitmap is given and, if non-zero, is used in all subsequent two and three operand bitBLT graphic orders.

If the source bitmap warp is set to zero, the width of the source frame specified by a subsequent bitBLT graphic order is used as the warp of the source bitmap. This feature is particularly useful when the source bitmap references an entire font or collection of source frames where each frame has a different width. By setting the source warp to zero, the SET_SBMAP graphic order need not be given for each transfer involving the collection of source data.

Figure 38:
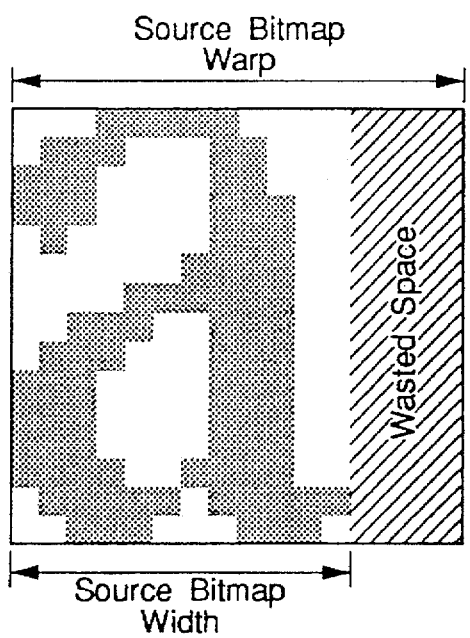
FIG. 38 shows Unpacked Source Bitmap.

The SW parameter is typically set to a non-zero value when it references a source which is not packed in memory. This a common occurrence in bitmapped fonts stored in font cartridges. Each scanline of each character in a font begins on a word boundary (0 mod 4 byte address). This is illustrated in FIG. 38.

TABLE 18

| SET_UBMAP Set Unbanded Bitmap Parameters | |
|---|---|
| 0x09 | SET_UBMAP opcode (8 bits) |
| DWU | Destination unbanded bitmap warp in bits (16 bits) |

The SET_UBMAP graphic order specifies the structure of an unbanded bitmap. The warp of the bitmap is given, and is used in all subsequent graphic orders which operate on an unbanded bitmap.

TABLE 19

| SL2F_D Destination Only Scanline Transfer to Frame | |
|---|---|
| 0x14 | SL2F_D opcode (8 bits) |
| DA | Destination physical bit address (32 bits) |
| FW | Frame width in bits (16 bits) |
| SLTA | Scanline table physical byte address, short word aligned (29 of 32 bits) |

The SL2F_D graphic order causes the PBC to render a scanline table image to a frame bitmap. The destination is manipulated as specified by the boolean code last set by the SET_BOOL_D graphic order. The destination frame warp is taken from the graphic order's FW parameter.

When printing the frontside of a page, SLTA points to the least significant byte of the first bitstring specifier in the table, and DA refers to the pixel to which the displacement of the first bitstring specifier will be added (not to the first bit of the run). For backside rendering, SLTA points to the least significant byte of the last short word of the last bitstring specifier in the table, and DA refers to the pixel that would lie just past the end of the last bitstring specifier run.

In neither case does SLTA point to the 0x0000 scanline table terminators. Since the scanline table's bitstring specifiers must be placed at short word boundaries, SLTA must be short word aligned.

TABLE 20

SL2F_HD
Halftone/Destination Scanline Transfer to Frame

| | |
|---|---|
| 0x15 | SL2F_HD opcode (8 bits) |
| DA | Destination physical bit address (32 bits) |
| FW | Frame width in bits (16 bits) |
| HXR | Halftone X remainder (16 bits) |
| HYR | Halftone Y remainder (16 bits) |
| HA | Halftone physical bit address of the starting pixel (32 bits) |
| SLTA | Scanline table physical byte address, short word aligned (29 of 32 bits) |
| HTTA | Halftone companion table physical byte address, short word aligned (29 of 32 bits) |

The SL2F_HD graphic order causes the PBC to render and halftone a scanline table image to a frame bitmap. The destination and halftone pixels are combined as specified by the boolean code last set by the SET_BOOL_HD graphic order. The destination frame warp is taken from the graphic order's FW parameter. The halftone bitmap dimensions must have been previously defined by the SET_HTBMAP graphic order.

Halftone tiled patterns are typically anchored to the page. Thus, the rendering of a scanline table may need to take on the halftone pattern starting at various points in the halftone bitmap depending on where it is being positioned on the page. The halftone parameters HXR, HYR, and HA define the precise halftone pixel that corresponds to the initial destination address given in the graphic order. Remember that the initial destination address is not where the first pixel is drawn; for frontside rendering, it is the point to which the first bitstring specifier's displacement is added, or for backside rendering, the point immediately to the right of the last bitstring specifier's run.

HXR specifies the number of pixels remaining to the left edge of the bitmap, and HYR defines the number of pixels remaining to the bottom edge (or top edge, for backside rendering). For example, for the front side of a page, if the starting pixel in the halftone bitmap is determined to be at the upper left, HXR must be set to HW, and HYR to HH; if instead the backside of the page is being rendered, HXR must still be set to HW, but HYR must be set to one.

When printing the frontside of a page, SLTA and HTTA point to the significant byte of the first specifier in their respective tables, and DA, HXR, HYR, and HA refer to the pixel to which the displacement of the first bitstring specifier will be added (not to the first bit of the first run). For backside rendering, SLTA and HTTA point least significant byte of the last short word of the last bitstring specifier in their respective tables, and DA, HXR, HYR, and HA refer to the pixel that would lie just past the end of the last bitstring specifier run.

In neither case does SLTA point to the 0x0000 scanline table terminators. Since both the scanline table and companion halftone table's specifiers must be placed at short word boundaries, SLTA and HTTA must be short word aligned.

TABLE 21

SL2UB_D
Destination Only Scanline Transfer to Unbanded Bitmap

| | |
|---|---|
| 0x24 | SL2UB_D opcode (8 bits) |
| DA | Destination physical bit address (32 bits) |
| SLTA | Scanline table physical byte address, short word aligned (29 of 32 bits) |

The SL2UB_D graphic order causes the PBC to render a scanline table image to an unbanded bitmap. The destination is manipulated as specified by the SET_BOOL_D graphic order. The destination unbanded bitmap warp must have been previously defined by the SET_UBMAP graphic order.

When printing the frontside of a page, SLTA points to the least significant byte of the first bitstring specifier in the table, and DA refers to the pixel to which the displacement of the first bitstring specifier will be added (not to the first bit of the first run). For backside rendering, SLTA points to the least significant byte of the last short word of the last bitstring specifier in the table, and DA refers to the pixel that would lie just past the end of the last bitstring specifier run.

In neither case does SLTA point to the 0x0000 scanline table terminators. Since the scanline table's bitstring specifiers must be placed at short word boundaries, SLTA must be short word aligned.

TABLE 22

SL2UB_HD
Halftone/Destination Scanline Transfer to Unbanded Bitmap

| | |
|---|---|
| 0x25 | SL2UB_HD opcode (8 bits) |
| DA | Destination physical bit address (32 bits) |
| HXR | Halftone X remainder (16 bits) |
| HYR | Halftone Y remainder (16 bits) |
| HA | Halftone physical bit address of the starting pixel (32 bits) |
| SLTA | Scanline table physical byte address, short word aligned (29 of 32 bits) |
| HTTA | Halftone companion table physical byte address, short word aligned (29 of 32 bits) |

The SL2UB_HD graphic order causes the PBC to render and halftone a scanline table image to an unbanded bitmap. The destination and halftone pixels are combined as specified by the boolean code last set by the SET_BOOL_HD graphic order. The destination unbanded bitmap warp must have been previously defined by the SET_UBMAP graphic order. The halftone bitmap dimensions must have been previously defined by the SET_HTBMAP graphic order.

Halftone tiled patterns are typically anchored to the page. Thus, the rendering of a scanline table may need to take on the halftone pattern starting at various points in the halftone bitmap depending on where it is being positioned on the page. The halftone parameters HXR, HYR, and HA define the precise halftone pixel that corresponds to the initial destination address given in the graphic order. Remember that the initial destination address is not where the first pixel is drawn; for frontside rendering, it is the point to which the first bitstring specifier's displacement is added, or for backside rendering, the point immediately to the right of the last bitstring specifier's run.

HXR specifies the number of pixels remaining to the left edge of the bitmap, and HYR defines the number of pixels remaining to the bottom edge (or top edge, for backside rendering). For example, for the front side of a page, if the starting pixel in the halftone bitmap is determined to be at the upper left, HXR must be set to HW, and HYR to HH; if instead the backside of the page is being rendered, HXR must still be set to HW, but HYR must be set to one.

When printing the frontside of a page, SLTA and HTTA point to the least significant byte of the first specifier in their respective tables, and DA, HXR, HYR, and HA refer to the pixel to which the displacement of the first bitstring specifier will be added (not to the first bit of the first run). For backside rendering, SLTA and HTTA point to the least significant byte of the last short word of the last bitstring specifier in their respective tables, and DA, HXR, HYR, and HA refer to the pixel that would lie just past the end of the last bitstring specifier run.

In neither case does SLTA point to the 0x0000 scanline table terminators. Since both the scanline table and companion halftone table's specifiers must be placed at short word boundaries, SLTA and HTTA must be short word aligned.

TABLE 23

SL2BB_D
Destination Only Scanline Transfer to Banded Bitmap

| 0x34 | SL2BB_D opcode (8 bits) |
|---|---|
| * BAND | Band number when graphic order is executed |
| * DA | Destination logical bit address (32 bits) |
| * SLTA | Scanline table physical byte address, short word aligned (29 of 32 bits) |

(*) These operands are updated by the PBC when the frame crosses a band boundary.

The SL2BB_D graphic order causes the PBC to render a scanline table image to a banded bitmap. The destination is manipulated as specified by the boolean code last set by the SET_BOOL_D graphic order. The destination banded bitmap parameters must have been previously defined by the SET_BBMAP graphic order.

When printing the frontside of a page, SLTA points to the least significant byte of the first bitstring specifier in the table, and DA refers to the pixel to which the displacement of the first bitstring specifier will be added (not to the first bit of the first run). For backside rendering, SLTA points to the least significant byte of the last short word of the last bitstring specifier in the table, and DA refers to the pixel that would lie just past the end of the last bitstring specifier run.

In neither case does SLTA point to the 0x0000 scanline table terminators. Since the scanline table's bitstring specifiers must be placed at short word boundaries, SLTA must be short word aligned.

When a band fault is detected, the PBC rewrites the scanline graphic order to update its parameters. The BAND number is incremented (or decremented, for backside printing). DA is written back corresponding to the pixel following the last run rendered (or for backside rendering, the pixel preceding the next bitstring specifier's run), and SLTA points to the next specifier to be executed when the rest of the scanline table is rendered to the next band.

TABLE 24

SL2BB_HD
Halftone/Destination Scanline Transfer to Banded Bitmap

| 0x35 | SL2BB_HD opcode (8 bits) |
|---|---|
| * BAND | Band number when graphic order is executed |
| * DA | Destination logical bit address (32 bits) |
| HXR | Halftone X remainder (16 bits) |

TABLE 24-continued

SL2BB_HD
Halftone/Destination Scanline Transfer to Banded Bitmap

| * HYR | Halftone Y remainder (16 bits) |
|---|---|
| * HA | Halftone physical bit address of the starting pixel (32 bits) |
| * SLTA | Scanline table physical byte address, short word aligned (29 of 32 bits) |
| * HTTA | Halftone companion table physical byte address, short word aligned (29 of 32 bits) |

(*) These operands are updated by the PBC when the frame crosses a band boundary.

The SL2BB_HD graphic order causes the PBC to render and halftone a scanline table image to a banded bitmap. The destination and halftone pixels are combined as specified by the boolean code last set by the SET_BOOL_HD graphic order. The destination banded bitmap parameters must have been previously defined by the SET_BBMAP graphic order. The halftone bitmap dimensions must have been previously defined by the SET_HTBMAP graphic order.

Halftone tiled patterns are typically anchored to the page. Thus, the rendering of a scanline table may need to take on the halftone pattern starting at various points in the halftone bitmap depending on where it is being positioned on the page. The halftone parameters HXR, HYR, and HA define the precise halftone pixel that corresponds to the initial destination address given in the graphic order. Remember that the initial destination address is not where the first pixel is drawn; for frontside rendering, it is the point to which the first bitstring specifier's displacement is added, or for backside rendering, the point immediately to the right of the last bitstring specifier's run.

HXR specifies the number of pixels remaining to the left edge of the bitmap, and HYR defines the number of pixels remaining to the bottom edge (or top edge, for backside rendering). For example, for the front side of a page, if the starting pixel in the halftone bitmap is determined to be at the upper left, HXR must be set to HW, and HYR to HH; if instead the backside of the page is being rendered, HXR must still be set to HW, but HYR must be set to one.

When printing the frontside of a page, SLTA and HTTA point to the least significant byte of the first specifier in their respective tables, and DA, HXR, HYR, and HA refer to the pixel to which the displacement of the first bitstring specifier will be added (not to the first bit of the first run). For backside rendering, SLTA and HTTA point to the least significant byte of the last short word of the last specifier in their respective tables, and DA, HXR, HYR, and HA refer to the pixel that would lie just past the end of the last bitstring specifier run.

In neither case does SLTA point to the 0x0000 scanline table terminators. Since both the scanline table and companion halftone table's specifiers must be placed at short word boundaries, SLTA and HTTA must be short word aligned.

When a band fault is detected, the PBC rewrites the scanline graphic order to update most of its parameters. The BAND number is incremented (or decremented, for backside printing). DA and HA are written back corresponding to the pixel following the last run rendered (or for backside rendering, the pixel preceding the next bitstring specifier's run), and FH and HYR are written back with the number of remaining scanlines in their respective frames to be transferred. Last, SLTA and HTTA point to the next specifier to be executed when the rest of the scanline table is rendered to the next band.

TABLE 25

| STOP | |
|---|---|
| Stop Display List Execution | |
| 0x00 | STOP opcode (8 bits) |

The STOP graphic order indicates the end of a display list. The PBC halts execution and generates an interrupt (assuming it is unmasked) when the STOP graphic order is encountered.

The following table 26 contains the 25 graphic orders that the PBC can execute, sorted by their opcode value.

TABLE 26

| GRAPHIC ORDER OPCODES | |
|---|---|
| 0x00 | STOP |
| 0x01 | JUMP |
| 0x08 | SET_BBMAP |
| 0x09 | SET_UBMAP |
| 0x0A | SET_SBMAP |
| 0x0B | SET_HTBMAP |
| 0x0C | SET_BOOL_D |
| 0x0D | SET_BOOL_HD |
| 0x0E | SET_BOOL_SD |
| 0x0F | SET_BOOL_SHD |
| 0x10 | BLT2F_D |
| 0x12 | BLT2F_SD |
| 0x13 | BLT2F_SHD |
| 0x14 | SL2F_D |
| 0x15 | SL2F_HD |
| 0x20 | BLT2UB_D |
| 0x22 | BLT2UB_SD |
| 0x23 | BLT2UB_SHD |
| 0x24 | SL2UB_D |
| 0x25 | SL2UB_HD |
| 0x30 | BLT2BB_D |
| 0x32 | BLT2BB_SD |
| 0x33 | BLT2BB_SHD |
| 0x34 | SL2BB_D |
| 0x35 | SL2BB_HD |

The following Table 27 (sorted by opcode) identifies each graphic order and its parameters. For more detail on the meaning and use of graphic orders and their parameters, see the sections above.

TABLE 27

| GRAPHIC ORDER FORMATS | | |
|---|---|---|
| STOP | 0x00 | STOP opcode (8 bits) |
| JUMP | 0x01 | JUMP opcode (8 bits) |
| | GOA | Graphic order physical byte address (29 of 32 bits) |
| SET_BBMAP | 0x08 | SET_BBMAP opcode (8 bits) |
| | CUR_BAND | Current band number (8 bits) |
| | DUPLEX | Render direction for duplex printing (1 of 8 bits) |
| | DWB | Destination banded bitmap warp in bits (16 bits) |
| | SOBPA | Start of band physical bit address, byte aligned (32 bits) |
| | SOBA | Start of band logical bit address (32 bits) |
| | EOBPA | End of band physical bit address (32 bits) |
| SET_UBMAP | 0x09 | SET_UBMAP opcode (8 bits) |
| | DWU | Destination unbanded bitmap warp in bits (16 bits) |
| SET_SBMAP | 0x0A | SET_SBMAP opcode (8 bits) |
| | SW | Source bitmap warp in bits (16 bits) |
| SET_HTBMAP | 0x0B | SET_HTBMAP opcode (8 bits) |

TABLE 27-continued

| GRAPHIC ORDER FORMATS | | |
|---|---|---|
| | HZ | Halftone bitmap total size in bits (32 bits) |
| | HW | Halftone bitmap width in bits (16 bits) |
| | HH | Halftone bitmap height in scanlines (16 bits) |
| SET_BOOL_D | 0x0C | SET_BOOL_D opcode (8 bits) |
| | BOOL_D | Destination-only boolean mask (8 bits) |
| SET_BOOL_HD | 0x0D | SET_BOOL_HD Opcode (8 bits) |
| | BOOL_HD | Halftone/destination boolean mask (8 bits) |
| SET_BOOL_SD | 0x0E | SET_BOOL_SD opcode (8 bits) |
| | BOOL_SD | Source/destination boolean mask (8 bits) |
| SET_BOOL_SHD | 0x0F | SET_BOOL_SHD opcode (8 bits) |
| | BOOL_SHD | Source/destination boolean mask (8 bits) |
| BLT2F_D | 0x10 | BLT2F_D opcode (8 bits) |
| | DA | Destination physical bit address (32 bits) |
| | FW | Frame width in bits (16 bits) |
| | FH | Frame height in scanlines (16 bits) |
| BLT2F_SD | 0x12 | BLT2F_SD opcode (8 bits) |
| | DA | Destination physical bit address (32 bits) |
| | FW | Frame width in bits (16 bits) |
| | FH | Frame height in scanlines (16 bits) |
| | SA | Source physical bit address (32 bits) |
| BLT2F_SHD | 0x13 | BLT2F_SHD opcode (8 bits) |
| | DA | Destination physical bit address (32 bits) |
| | FW | Frame width in bits (16 bits) |
| | FH | Frame height in scanlines (16 bits) |
| | SA | Source physical bit address (32 bits) |
| | HXR | Halftone X remainder (16 bits) |
| | HYR | Halftone Y remainder (16 bits) |
| | HA | Halftone physical bit address of the starting pixel (32 bits) |
| SL2F_D | 0x14 | SL2F_D opcode (8 bits) |
| | DA | Destination physical bit address (32 bits) |
| | FW | Frame width in bits (16 bits) |
| | SLTA | SLT physical byte address, short word aligned (29 of 32 bits) |
| SL2F_HD | 0x15 | SL2F_HD opcode (8 bits) |
| | DA | Destination physical bit address (32 bits) |
| | FW | Frame width in bits (16 bits) |
| | HXR | Halftone X remainder (16 bits) |
| | HYR | Halftone Y remainder (16 bits) |
| | HA | Halftone physical bit address of the starting pixel (32 bits) |
| | SLTA | SLT physical byte address, short word aligned (29 of 32 bits) |
| | HTTA | Halftone companion table physical byte address, short word aligned (29 of 32 bits) |
| BLT2UB_D | 0x20 | BLT2UB_D opcode (8 bits) |
| | DA | Destination physical bit address (32 bits) |
| | FW | Frame width in bits (16 bits) |
| | FH | Frame height in scanlines (16 bits) |
| BLT2UB_SD | 0x22 | BLT2UB_SD opcode (8 bits) |
| | DA | Destination physical bit address (32 bits) |
| | FW | Frame width in bits (16 bits) |
| | FH | Frame height in scanlines (16 bits) |
| | SA | Source physical bit address (32 bits) |
| BLT2UB_SHD | 0x23 | BLT2UB_SHD opcode (8 bits) |
| | DA | Destination physical bit address (32 bits) |
| | FW | Frame width in bits (16 bits) |
| | FH | Frame height in scanlines (16 bits) |

TABLE 27-continued

GRAPHIC ORDER FORMATS

| | | |
|---|---|---|
| | SA | Source physical bit address (32 bits) |
| | HXR | Halftone X remainder (16 bits) |
| | HYR | Halftone Y remainder (16 bits) |
| | HA | Halftone physical bit address of the starting pixel (32 bits) |
| SL2UB_D | 0x24 | SL2UB_D opcode (8 bits) |
| | DA | Destination physical bit address (32 bits) |
| | SLTA | SLT physical byte address, short word aligned (29 of 32 bits) |
| SL2UB_HD | 0x25 | SL2UB_HD opcode (8 bits) |
| | DA | Destination physical bit address (32 bits) |
| | HXR | Halftone X remainder (16 bits) |
| | HYR | Halftone Y remainder (16 bits) |
| | HA | Halftone physical bit address of the starting pixel (32 bits) |
| | SLTA | SLT physical byte address, short word aligned (29 of 32 bits) |
| | HTTA | Halftone companion table physical byte address, short word aligned (29 of 32 bits) |
| BLT2BB_D | 0x30 | BLT2BB_D opcode (8 bits) |
| | *BAND | Band number when graphic order is executed |
| | *DA | Destination logical bit address (29 bits) |
| | FW | Frame width in bits (16 bits) |
| | *FH | Frame height in scanlines (16 bits) |
| BLT2BB_SD | 0x32 | BLT2BB_SD opcode (8 bits) |
| | *BAND | Band number when graphic order is executed |
| | *DA | Destination logical bit address (32 bits) |
| | FW | Frame width in bits (16 bits) |
| | *FH | Frame height in scanlines (16 bits) |
| | *SA | Source physical bit address (32 bits) |
| BLT2BB_SHD | 0x33 | BLT2BB_SHD opcode (8 bits) |
| | *BAND | Band number when graphic order is executed |
| | *DA | Destination logical bit address (32 bits) |
| | FW | Frame width in bits (16 bits) |
| | *FH | Frame height in scanlines (16 bits) |
| | *SA | Source physical bit address (32 bits) |
| | HXR | Halftone X remainder (16 bits) |
| | *HYR | Halftone Y remainder (16 bits) |
| | *HA | Halftone physical bit address of the starting pixel (32 bits) |
| SL2BB_D | 0x34 | SL2BB_D opcode (8 bits) |
| | *BAND | Band number when graphic order is executed |
| | *DA | Destination logical bit address (32 bits) |
| | *SLTA | Bitstring Specifier physical short word address (28 of 32 bits) |
| SL2BB_HD | 0x35 | SL2BB_HD opcode (8 bits) |
| | *BAND | Band number when graphic order is executed |
| | *DA | Destination logical bit address (32 bits) |
| | HXR | Halftone X remainder (16 bits) |
| | *HYR | Halftone Y remainder (16 bits) |
| | *HA | Halftone physical bit address of the starting pixel (32 bits) |
| | *SLTA | SLT physical byte address, short word aligned (29 of 32 bits) |
| | *HTTA | Halftone companion table physical byte address, short word aligned (29 of 32 bits) |

(*)These operands are updated by the PBC when the frame crosses a band boundary.

In the preferred embodiment the various elements of FIG. 4 comprising the present invention are implemented as follows.

In the preferred embodiment the various elements of FIG. 4 comprising the present invention are implemented as follows.

Graphics interface subsystem 23

All service requests from the PDL interpreter enter the graphics interface module. These service requests are: New Page, End Page, All Blits With User Destinations, and All Blits With Page Image Destinations.

New Page

The New Page call performs initialization for a new page:

---

Determine page image memory requirements from input arguments
Call the Memory Manager to allocate band buffers for the page image
    If Memory Manager cannot supply required memory
        Then if application passed NO_PGWAIT flag or no output in progress
            Return with error
        Wait for memory to become available
Initialize memory and control structure for page
Return with no error

---

End Page

End Page starts image printing if the page is not banded or starts the Realtime Blit if the image is banded.

---

Save the address of the application completion function
Set initial parameters such as current band number and copy number in the control structure for this page
If the page is not banded
    Call Output Interface to deliver the image buffer for output
    Return
Else
    Call the Realtime Blit routine, Start Next Page
    Return

---

All Blits With User Destinations

---

If the page is not banded or the application called with the DO_ONCE flag
    Call Immediate Blit to perform the pixel drawing service
    Return
Else
    Call Order Construction to create Stored Order for the blit
    Return

---

All Blits With Page Image Destinations

---

If the page is not banded
    Call Immediate Blit to perform the pixel drawing service
    Return
Else
    Call Order Construction to create Stored Order for the blit
    Return

---

Immediate Blit Processor 29

The immediate blit function draws pixels in memory. Each type of blit has a set of arguments that determine the size of the image to be drawn, its location in memory, and the particular blit function.

Two Operand Blit

The two operand blit performs a two dimensional bit block transfer operation between two bitmaps. The source and destination bitmaps are defined by the passed bitmap descriptors.

Three Operand Blit

The Three Operand Blit performs a two dimensional bit block transfer operation using three bitmaps. The destination is a user defined bitmap. Each source, halftone, and destination pixel is combined according to the pixop parameter and then rewritten to the same pixel in the destination bitmap.

The third bitmap is a halftone (or inking) bitmap typically used to write an arbitrary pattern into the destination frame. The halftone bitmap and its origin in the destination bitmap are specified via halftone parameters. The halftone bitmap is used in a wraparound fashion: pixel use off the end of a scanline continues from the beginning of the same scanline; scanline use off the end of the bitmap continues with the first scanline in the bitmap.

Scanline Blit

Scanline writes pixel groups on a contiguous block of scanlines within a destination bitmap. The user passes a table defining the pixel groups. A pixel group consists of a contiguous sequence of pixels on a single scanline. The table structure allows for multiple groups per scanline.

Draw Scanline Halftone

Draw Scanline Halftone writes pixel groups to the destination bitmap according to the contents of the halftone bitmap and the pixop Boolean. The user passes a halftone bitmap descriptor as well as a destination bitmap descriptor and a table defining the pixel groups. A pixel group consists of a contiguous sequence of pixels on a single scanline. The table structure allows for multiple groups per scanline and for the skipping of scanlines.

Draw Vertical Line

Draw Vertical Line performs a service analogous to Draw Scanline except that the pixel groups represent a vertical line or lines. The user passes a table defining the pixel groups. A pixel group consists of a contiguous sequence of pixels. The table structure allows for multiple pixel groups.

Draw Pixels

Draw Pixels processes the specified pixel table, writing the affected pixels according to the destination only Boolean, pixop. The destination is defined by the destination bitmap descriptor. The pixel table consists of the number of xy pairs.

Draw Pixels Halftone

Draw Pixels Halftone processes the specified pixel table, writing the affected pixels according to the halftone bitmap and the Boolean, pixop. The destination is defined by the destination bitmap descriptor. The pixel table consists of the number of xy pairs specified in the count parameter.

Logical Pixel Operations

The value of each pixel written is determined by a logical combination of the pixel(s) involved in a particular operation. Some operations such as scanline involve only a destination pixel at each coordinate. Others such as 2blit involve a source and destination pixel at each coordinate while yet others such as 3blit involve halftone, source, and destination pixels. There are 256 possible combinations of three pixels and the four Boolean operators: NOT, AND, OR, XOR. All such combinations can be expressed using bitwise logical combinations of the following definitions:

Logical Pixel Operations

The value of each pixel written is determined by a logical combination of the pixel(s) involved in a particular operation. Some operations such as scanline involve only a destination pixel at each coordinate. Others such as 2blit involve a source and destination pixel at each coordinate while yet others such as 3blit involve halftone, source, and destination pixels.

There are 256 possible combinations of three pixels and the four Boolean operators: NOT, AND, OR, XOR. All such combinations can be expressed using bitwise logical combinations of the following definitions:

GRS_DST=10101010

GRS_SRC=11001100

GRS_HT=11110000

GRS_WHITE=00000000

GRS_BLACK=11111111

The WHITE and BLACK are used when the written pixels are to have the corresponding value without regard to prior pixel values. The other three values can be combined to produce all other possible unique Boolean combinations of three pixels with four operators. Not all combinations necessarily produce useful effects.

For example:
to copy source pixels to destination pixop=GRS_SRC    11001100 to complement destination pixels pixop=NOT GRS_DST    01010101 to superimpose a source bitmap onto the destination bitmap pixop=GRS_SRC OR GRS_DST    11101110 to superimpose a negative of a source bitmap onto the destination bit map pixop=(NOT GRS_SRC) OR GRS_DST    10111011 to white destination pixels corresponding to an image in a source bitmap pixop=(NOT GRS_SRC) AND GRS_DST    00100010 to halftone all destination pixels which are black in the source bitmap leaving other destination pixels unchanged pixop=(GRS_SRC AND GRS_HT) OR ((NOT GRS_SRC)

AND GRS_DST)    11100010

All immediate blits proceed as follows:

```
Check user arguments
If argument error
        Return error
If clipping required
        Adjust parameters for low level blit call
If blit hardware available
        Set up hardware command/order
        If hardware busy
                Add order to queue for start by interrupt handler
                Return
Else
```

```
Call appropriate low level blit function
Return
```

Order Construction 31

Order construction builds stored orders for the realtime blit software for hardware to use in building the page image. Each stored order includes the information needed by the immediate blit routines and information used by the realtime blit routines such as the first page image band affected by the order.

```
Build a stored order from the blit arguments passed
If the application called with the VOLATILE flag for the source bitmap
    Call the memory manager to get space to copy the bitmap
    If there is not enough memory available
        Return with error code
    Else copy the source bitmap
If the requested blit is not subject to compaction
    Call order compaction terminate data structure routine
Else
    Call order compaction add order routine
Return
```

Order Compaction 33

Order compaction attempts to combine multiple orders into a single order, eliminating redundancy for multiple orders operating on the same destination pixel groups. The compaction routine keeps track of pixel groups in an internal data structure. It continues adding to the structure until Order Construction calls with a request to terminate the current set. When this happens, the current data structure is converted to an order and placed in order storage. The next call to order compaction begins a new data structure. A number of commonly used data structures can be used to keep track of the orders subject to compaction, including a linked list, an array, or a binary tree. If a fixed length, non-extensible structure such as an array is used, the size of the array limits the number of orders which may be combined. This does not defeat the compaction scheme; If the data structure becomes full, the Add Orders function can call the Terminate routine to terminate the current set and start a new one. This may reduce the level of compaction somewhat.

Add Order

```
If there is no current data structre
    Call Memory Manager to allocate space for data structure
    If error
        Return error
    Initialize new data structure
    Place input pixel groups in the new data structure
    Return
Set "current input goup" to the first pixel group in the input
Set "current existing group" to the first pixel group in the
existing data structure
While a "current input group" remains to process ("current
input group" less than or equal to number of input pixel groups)
{
    Compare "current input group" y position with "current
    existing group" y position
    If equal
        Compare starting x (horizontal) positoin of
        "current input group" with x of "current existing
        group"
        If "input" x_start greater than or equal to "existing"
        x_start and "input" x_end less than or equal to
        "existing" x_end
            Alter "existing" pixel group to include "input"
            pixel group
            Increment "current input group"
    Increment "current existing group"
    If "curent existing group" greater than last existing
    group (no more existing groups)
        Add remaining input groups
        Return
}
Return
```

Terminate Data Structure

Convert data structure to order

Attach new order to realtime orders

Call Memory Manager to deallocate temporary data structure

Return

Realtime Blit Processor 37

The realtime blit routine begins by generating as many bands as it has available band buffers. It then delivers these initial bands to the output interface 47 in order and returns to the caller. When interrupt handler 49 determines that a band has been printed, realtime blit processing is restarted via an "extended interrupt thread" to generate the next band in the available band buffer.

Start Next Page:

```
If this page has a pre-allocated band buffer
    If Band Generation is busy
        Queue the page control structure
        Return
    Call Band Generation passing the page control structure
    Return
Else
Return
```

Band Generation Entry Point:

```
While image generation not done
{
    If all image band buffers are busy
        Return
    While an order in the list of Stored Orders has its band
    number equal to the current band number
    {
        Extract information from the order to define the blit
        required to draw the indicated pixels or the portion of them that
        fit in the currrent band
            Call the low level blit function
            If the order cannot be completed in the current band
                Update the band number in the order to current band + 1
                Update other parameters as necessary
            Else
                Mark the order as complete
    }
    If this is the first band of the page
        Set first band flag to pass to Output Interface
        Also set completion routine address
    If this is the last band of the page
        Set last band flag to pass to Output Interface
    Call Output Interface passing output structure
    If last band of image was generated
        If another image copy required
            Decrement copy count
            Reset band number to 1 in current control structure
        Else
            If another image is queued
                Get its control structure from queue
```

```
        Else
            Set band generation done
}
Return
```

Completion Function: (Called by Interrupt Handler)

```
Mark band buffer idle
If more bands in current image and Band Generation is idle
        Start Band Generation via "extended interrupt thread"
Else
        Call PDL interpreter completion function if there is one
Return
```

Memory Manager 43

The Memory Manager provides RAM allocation and deallocation services such that the other functions can request and release variable size blocks of memory.

Allocate Block

```
Search internal data structures for a free memory block equal or
greater in size than the size requested
        If a block equal to the size requested is found
            Mark block as in use
            Return to caller with address of block
        Else
            Divide free block into two
            Mark the new block for the caller as in use
            Return to caller with address of block
```

Free Block

```
Verify address of block
If address invalid
        Return with error code
Mark block as free
Return with no error
```

Output Interface 47

The Output Interface receives arguments defining the size of the band buffer, a completion function address, left and top margin information, a count of the number of times to print the band, and flags indicating first and last band. In the non-banded case the band is a full memory image of the page and both first and last band flags are set.

```
If the output device is busy
        Place band information on internal queue
        Return
Else
        Initialize internal data structures
        Start the output device
        Wait for synchronization signal
        Copy the first scanline or multiple scanlines to FIFO or start
        DMA device to begin image delivery
        Return
```

Output Interface Handler 49

The hardware interrupts when more data must be delivered to the FIFO or DMA device.

```
Check internal information to determine whether more scanlines
in the current band buffer must be delivered
        If no more scanlines in current band
            Call Realtime Blit Completion Function
```

```
        Dequeue next band
        If no more bands
            Return
        Else
            Initilize internal information for this band
        Copy to FIFO or start DMA
        Return
```

DISPLAY INTERFACE

The foregoing description relates particularly to a technique for interfacing with a relatively slow output device, such as a laser printer. In the case of a raster scanned display which requires a much higher output data rate, the above-described banding techniques cannot be practically implemented. However, the remainder of the apparatus and techniques described above are advantageously applied to create a display interface that dramatically reduces the number of CPU cycles required to drive a video display which significantly increases performance of Graphics User Interface (GUI) based computer systems.

Figure 5:
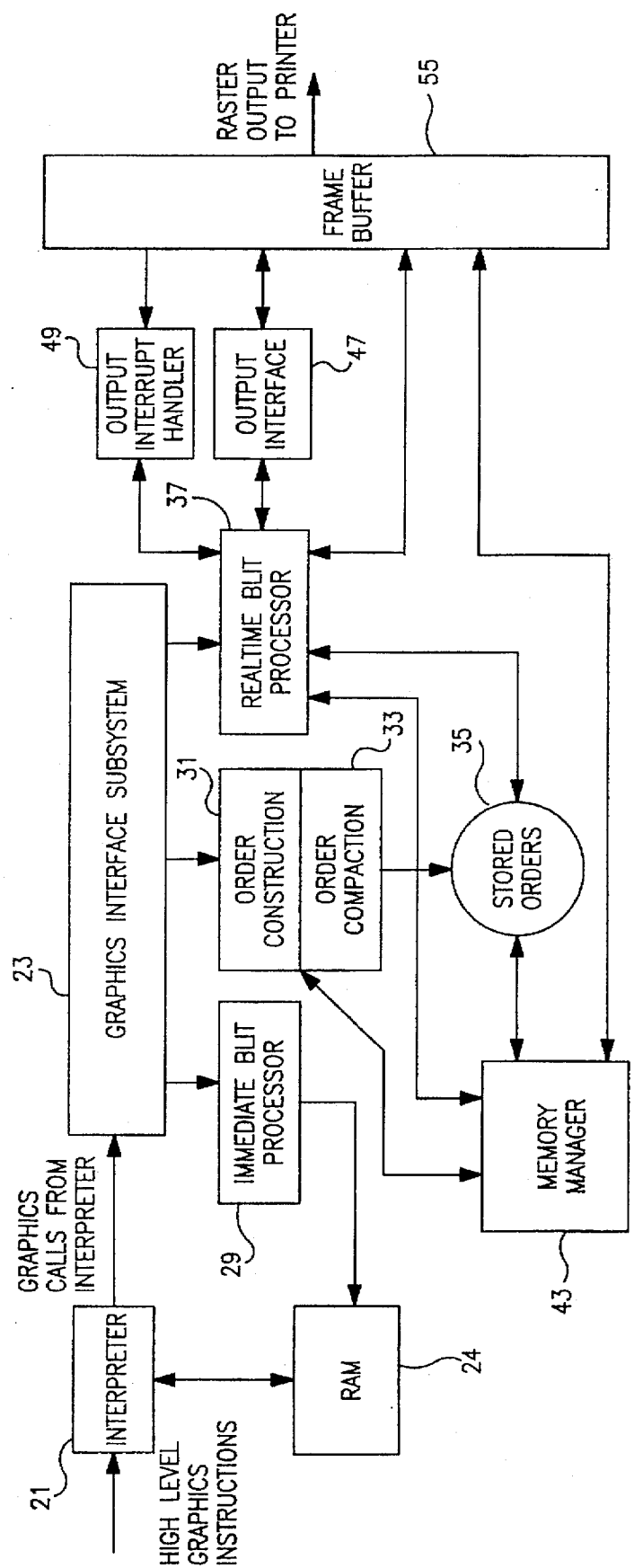
FIG. 5 is a functional diagram of an implementation of output controller 15 and bit map image generator 17 for display applications according to the present invention.

FIG. 5 is a functional block diagram of the present invention adapted for driving a video display. Each of the units shown functions in identically the same manner as described above in connection with FIG. 4 except that an entire display page is processed as a single band. Output interface 47 and realtime blit processor 37 exchange bitmap image data with frame buffer 55 which then provides a raster output to the display in a conventional manner.

Interpreter 21 receives high level graphics instructions from the CPU. As discussed above, these instructions may be in an industry standard Page Description Language. However, particularly for purposes of driving a video display, other high level graphics description language that do not have the constraints of a standard PDL may be employed.

The apparatus illustrated in FIG. 5 differs from the graphics operations provided by current XGA display controllers which provide straight line drawing and screen-to-screen transfers in that it accesses image data in motherboard DRAM when required via bus mastership to provide both memory-to-screen and screen-to-screen memory operations. As many glyphs to be displayed are not available within the current display image, the ability to access glyphs from other memory locations is an important feature of the invention.

The apparatus expects a list of the display changes as required by the application which is being executed by the motherboard's processor to be provided either within memory directly accessible by the apparatus or available to it through the previously mentioned bus mastership mode. When operating in bus mastership mode, it is expected that a certain number of potential processor bus cycles will be consumed in accessing the requisite data. This is mitigated by two factors. First, the current processor architectures embody a cache subsystem that protects the processor from other uses of its bus subsystem. Second, the equivalent number of processor cycles is reduced by at least two thirds, the first third being the accessing of a source pattern, the second third being the accessing of the corresponding screen destination area to retrieve its existing pattern, and the third being the accessing of the corresponding screen destination area to place the resulting pattern.

The present invention is relatively immune to its location within the processor motherboard architecture due to the relatively few CPU cycles that are required to update the display frame buffer contents. Thus, the invention is compatible with both existing and proposed motherboard bus standards.

We claim:

1. An apparatus for creating an image which includes graphics information for display on a continuous synchronous raster output device, said apparatus comprising:
   a) means for receiving commands in a graphics language which define the image to be output;
   b) means for generating a set of graphics orders from the graphics language commands, wherein a graphics order is a graphics function represented as a low level primitive;
      wherein said set of graphics orders comprises initialization orders, flow control orders, bitmap transfer orders, and scanline orders;
   c) means for generating a bitmap image from said graphics orders;
   d) means for outputting said bitmap image to said output device at a speed required by the output device, said graphics orders representing a complete page image and using an amount of memory which is less than the amount of memory which would be needed to store the complete page image as a bitmap image;
   wherein said graphics orders generation means comprises:
      a) graphics interface subsystem means for receiving said graphics language commands and passing said received commands to at least one of a memory manager means, an immediate image data transfer means and an order construction means;
      b) said memory manager means for allocating and deallocating blocks of a memory in response to calls from said graphics interface subsystem means, and said order construction means;
      c) said immediate image data transfer means for drawing pixels in a user memory based upon pixel drawing commands passed by said graphics interface subsystem means;
      d) said order construction means for building stored orders based upon blit arguments passed by said graphics interface subsystem means.

2. The apparatus defined by claim 1 wherein said bitmap image generation means comprises a realtime image data transfer means for traversing said stored orders and converting the stored orders into bitmap images corresponding to sections of said image to be output.

3. The apparatus defined by claim 1 wherein said image outputting means comprises a display frame buffer.

4. The apparatus defined by claim 3 further comprising scanline table storage means for storing bitmap image data in a scanline run format and wherein said realtime image data transfer means retrieves said scanline run formatted bitmap image data to generate at least one of said sections of said image.

5. A method for creating an image which includes graphics information for display on a continuous synchronous raster output device, said method comprising the steps of:
   a) receiving commands in a graphics language which define the page image to be output;
   b) generating a set of graphics orders from the graphics language commands, wherein a graphics order is a graphics function represented as a low level primitive such that:
      i) said graphics orders are processed into bands of bitmap images which are delivered to the output device at a speed required by the output device, said graphics orders representing a complete page image and using an amount of memory which is less than the amount of memory which would be needed to store the complete page image as a bitmap image; and
      ii) while the graphics information in a first one of said band is being output by said output device, the bitmap images for a second one of said bands are being generated;
   c) generating said bands of bitmap images from said graphic orders;
   d) outputting said generated bands of bitmap images to said output device;
   e) declaring a band fault if one of said graphics orders produces only a partial bitmap image within one of said bands;
   f) modifying said one graphics order for processing in a next of said bands so as to produce only a remaining part of said partial bitmap image.

6. A method for creating an image which includes graphics information for display on a continuous synchronous raster output device, said method comprising the steps of:
   a) receiving commands in a high level graphics language which define the image to be output;
   b) generating a set of graphics orders from the graphics language commands, wherein a graphics order is a graphics function represented as a low level primitive, wherein said graphics orders are processed into bands of bitmap images for delivery to the output device at a speed required by the output device, said graphics orders representing a complete page image and using an amount of memory which is less than the amount of memory which would be needed to store the complete page image as a bitmap image, wherein said set of graphics orders comprises initialization orders, flow control orders, bitmap transfer orders, and scanline orders;
   c) generating said bitmap image from said graphic orders;
   d) outputting said bitmap image to said output device;
   e) declaring a band fault if one of said graphics orders produces only a partial bitmap image within one of said bands;
   f) modifying said one graphics order for processing in a next of said bands so as to produce only a remaining part of said partial bitmap image.

7. The method of claim 6 wherein step (c) further comprises the steps of retrieving bitmap image data in a compressed format from a scanline table;
   wherein the compressed format comprises a list of bit-string specifiers each of which specifies a displacement from an origin and a run length of a scanline.

* * * * *

UNITED STATES PATENT AND TRADEMARK OFFICE
CERTIFICATE OF CORRECTION

PATENT NO. : 5,754,750
DATED : May 19, 1998
INVENTOR(S) : Butterfield et al.

It is certified that error appears in the above-identified patent and that said Letters Patent is hereby corrected as shown below:

<u>Title page,</u>
Iem [56], References Cited, U.S. PATENT DOCUMENTS, at the third entry, delete "382/48" and insert -- 382/46 --.
Item [57], ABSTRACT,
    Delete "An apparatus and method used to perform image rendering is capable of producing complex, high resolution images for a continuous synchronous raster image output device, such as a laser printer or a video display, using a minimum of random access memory. High level graphics instructions defining an image to be displayed or printed are provided by a processor executing an applications program. These instructions are interpreted to generate a set of graphics orders that are subsequently processed to create a bitmap image for output to a display or printer device. The graphics order processing system is independent of the central processor and thereby significantly reduces the central processor's image output overhead."

And replace with -- An apparatus and method used to perform image rendering in a manner which is capable of producing complex, high resolution page images where a continuous synchronous raster image output device, such as a lasser printer, using a minimum of random access memory. The invented technique decomposes basic graphics functions into a compact series of orders commands suitable for real time processing and then generates the output page image in real time. The graphic content of a page is defined in much less memory then the rendered image would otherwise require, but is in a form that can be processed and delivered to the output device at the speed required by the output device. This is accomplished by the use of graphics functions which are represented as low level primitives which can be converted to bit mapped images in real time. Additionally, the

UNITED STATES PATENT AND TRADEMARK OFFICE
CERTIFICATE OF CORRECTION

PATENT NO. : 5,754,750
DATED : May 19, 1998
INVENTOR(S) : Butterfield et al.

It is certified that error appears in the above-identified patent and that said Letters Patent is hereby corrected as shown below:

number of commands which need to be processed and delivered is reduced by eliminating redundant or overlapping graphics functions to minimize the memory used by the commands. --

Signed and Sealed this

Twenty-third Day of April, 2002

Attest:

JAMES E. ROGAN
Director of the United States Patent and Trademark Office

Attesting Officer